US010741160B1

(12) United States Patent
Gibbons et al.

(10) Patent No.: US 10,741,160 B1
(45) Date of Patent: Aug. 11, 2020

(54) ACOUSTICALLY RESISTIVE SUPPORTED MEMBRANE ASSEMBLIES

(71) Applicant: W. L. Gore & Associates, Inc., Newark, DE (US)

(72) Inventors: Wayne Gibbons, Newark, DE (US); Zachary Lampert, Newark, DE (US); Yitian Zhang, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

(21) Appl. No.: 16/582,609

(22) Filed: Sep. 25, 2019

(51) Int. Cl.
| | |
|---|---|
| *G10K 11/168* | (2006.01) |
| *B01D 69/02* | (2006.01) |
| *B01D 69/06* | (2006.01) |
| *B01D 69/10* | (2006.01) |
| *B01D 71/36* | (2006.01) |
| *B01D 69/00* | (2006.01) |
| *H04R 1/02* | (2006.01) |
| *H04R 1/08* | (2006.01) |
| *B29K 27/18* | (2006.01) |

(52) U.S. Cl.
CPC ............ *G10K 11/168* (2013.01); *B01D 69/02* (2013.01); *B01D 69/06* (2013.01); *B01D 69/10* (2013.01); *B01D 71/36* (2013.01); *B29K 2027/18* (2013.01)

(58) Field of Classification Search
CPC .... G10K 11/168; G10K 11/162; B01D 69/02; B01D 69/06; B01D 69/10; B01D 71/36; H04R 1/023; H04R 1/086; H04R 2499/11
See application file for complete search history.

(56) References Cited

U.S. PATENT DOCUMENTS

| | | | | | |
|---|---|---|---|---|---|
| 3,951,293 | A | * | 4/1976 | Schulz | B65D 51/1616 215/261 |
| 3,953,566 | A | * | 4/1976 | Gore | B01D 71/36 264/505 |
| 4,902,423 | A | * | 2/1990 | Bacino | B01D 39/1692 210/500.36 |
| 4,949,386 | A | | 8/1990 | Hill | |
| 5,828,012 | A | | 10/1998 | Repolle et al. | |
| 6,018,585 | A | * | 1/2000 | Akino | H04R 1/086 128/201.19 |
| 6,932,187 | B2 | * | 8/2005 | Banter | H04R 1/023 181/149 |
| 8,663,530 | B2 | * | 3/2014 | Horie | B29C 55/005 264/288.8 |
| 8,685,198 | B2 | * | 4/2014 | Mietta | B32B 3/266 156/291 |
| 8,695,812 | B2 | * | 4/2014 | Horie | B29C 55/005 210/500.36 |

(Continued)

FOREIGN PATENT DOCUMENTS

| | | |
|---|---|---|
| CN | 208029093 U | 10/2018 |
| EP | 2481462 A1 | 8/2012 |
| JP | 2017071131 A | 4/2017 |

*Primary Examiner* — Edgardo San Martin
(74) *Attorney, Agent, or Firm* — Greenberg Traurig, LLP

(57) ABSTRACT

Water impermeable, air permeable membrane assemblies are described herein. In some embodiments, the assemblies include a polymer membrane and at least one support layer. Certain assemblies are configured to provide an acoustic impedance having phase angle of +45 degrees to −45 over a frequency range of 50 to 20,000 Hz.

28 Claims, 30 Drawing Sheets

(56) References Cited

U.S. PATENT DOCUMENTS

| | | | |
|---|---|---|---|
| 8,739,926 B1* | 6/2014 | Mori | G10K 11/18 |
| | | | 181/286 |
| 9,875,733 B2 | 1/2018 | Sanders | |
| 2010/0247857 A1 | 9/2010 | Sanami et al. | |
| 2011/0188247 A1* | 8/2011 | Huang | B01D 39/1692 |
| | | | 362/249.02 |
| 2013/0083528 A1 | 4/2013 | Huang et al. | |
| 2013/0099411 A1 | 4/2013 | Horie et al. | |
| 2013/0156985 A1 | 6/2013 | Karube et al. | |
| 2013/0308809 A1* | 11/2013 | Thompson | H04R 1/2834 |
| | | | 381/332 |
| 2014/0079268 A1 | 3/2014 | Karube et al. | |
| 2014/0283691 A1 | 9/2014 | Furuuchi | |
| 2015/0165386 A1 | 6/2015 | Mori et al. | |
| 2015/0304750 A1 | 10/2015 | Mori | |
| 2015/0373439 A1* | 12/2015 | Mori | B32B 5/30 |
| | | | 381/334 |
| 2016/0247499 A1 | 8/2016 | Sanders | |
| 2016/0301998 A1* | 10/2016 | Abe | H04R 1/086 |
| 2017/0157573 A1 | 6/2017 | Mori et al. | |
| 2017/0325011 A1 | 11/2017 | Kuki et al. | |
| 2019/0268679 A1 | 8/2019 | Kurihara et al. | |

\* cited by examiner

FIGURE 8
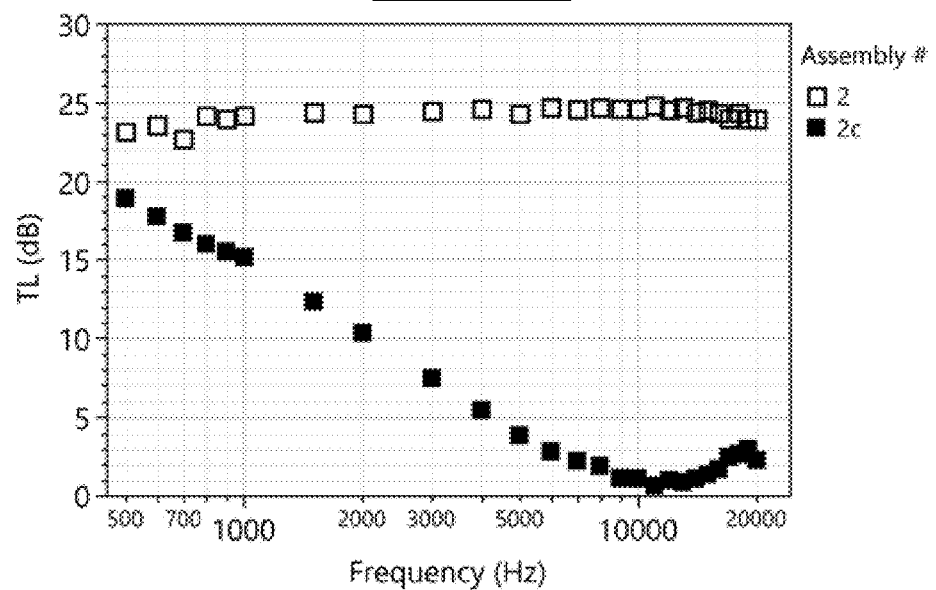
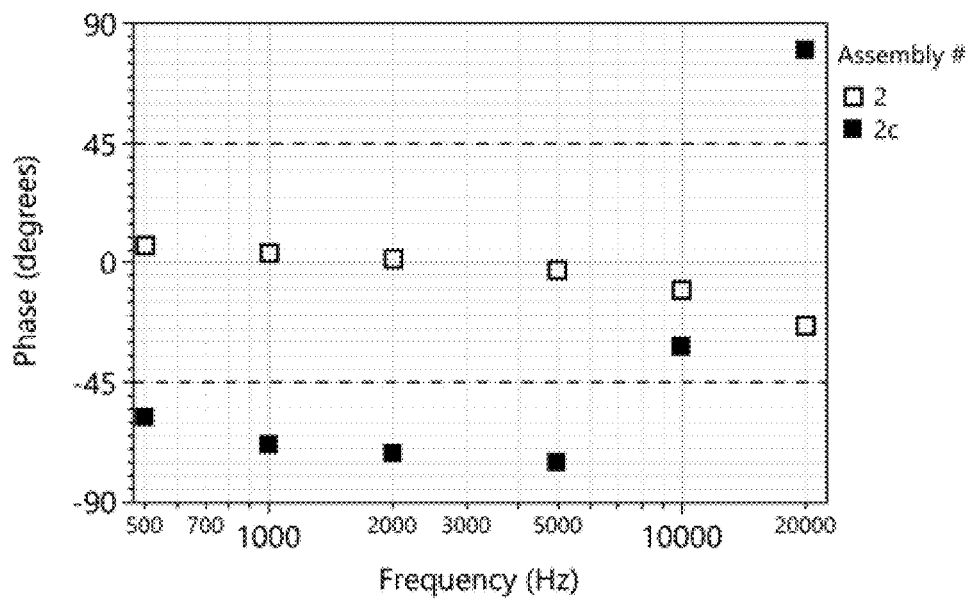

FIGURE 9
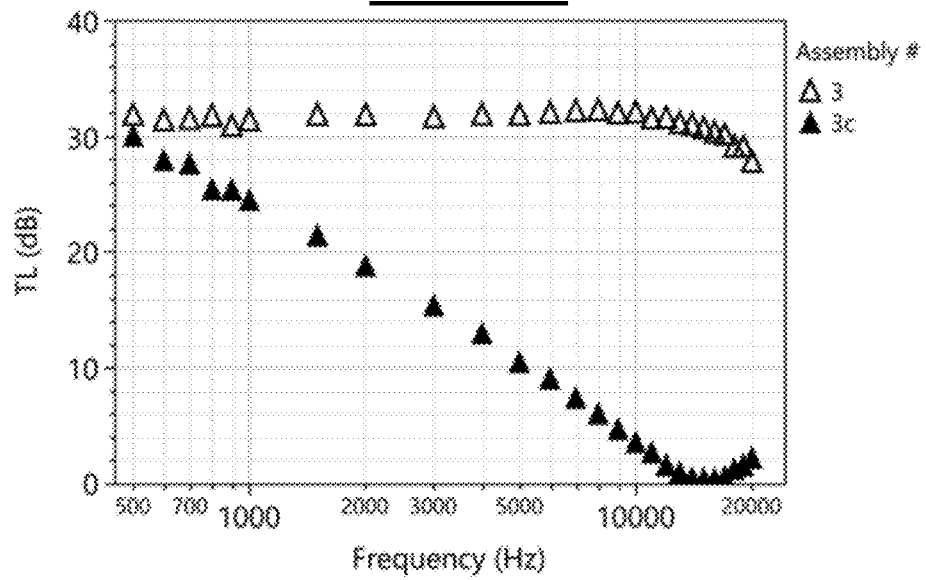
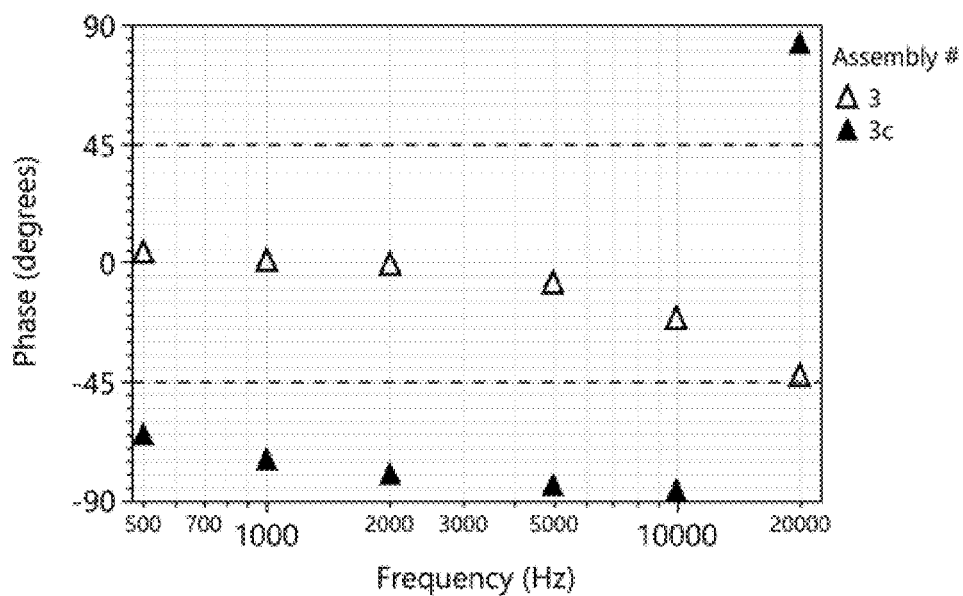

FIGURE 11
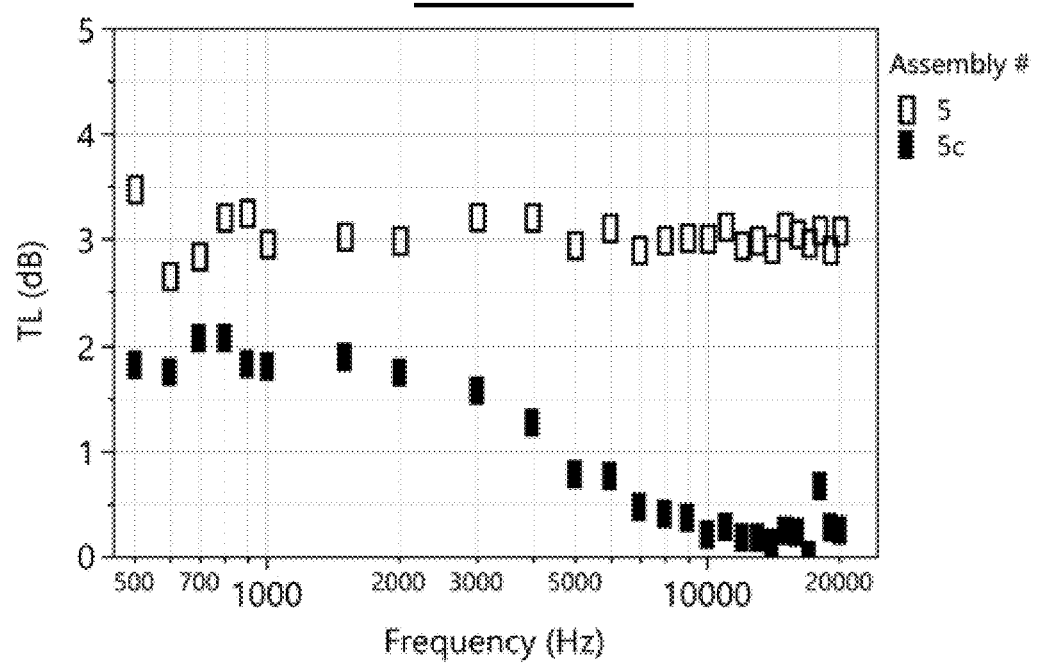
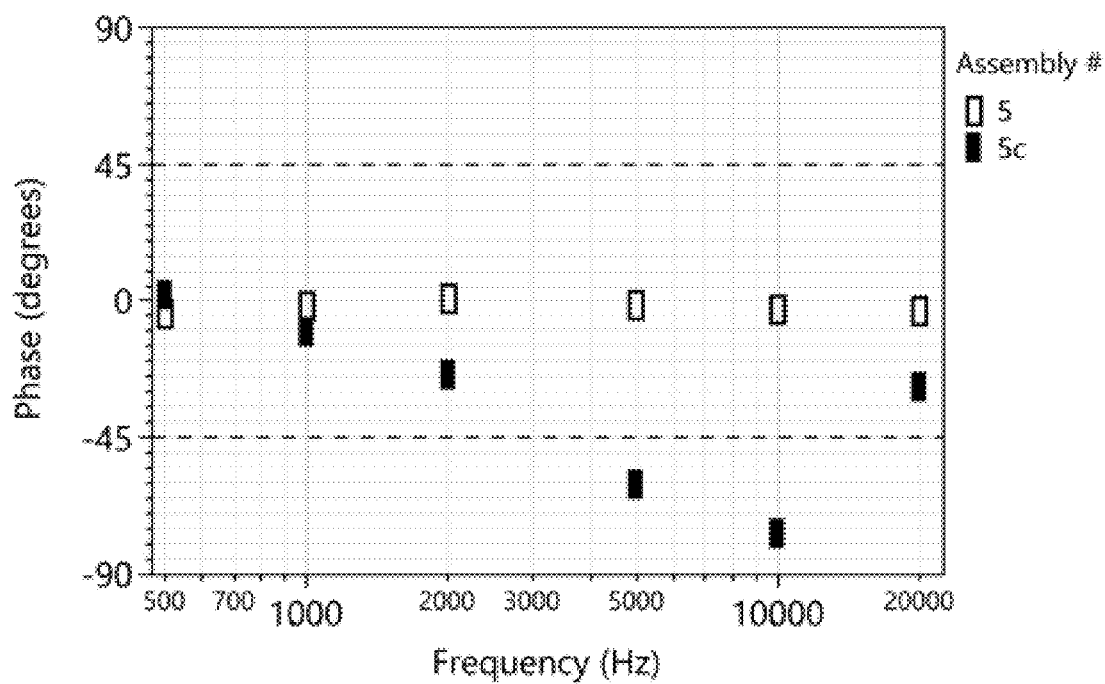

FIGURE 12
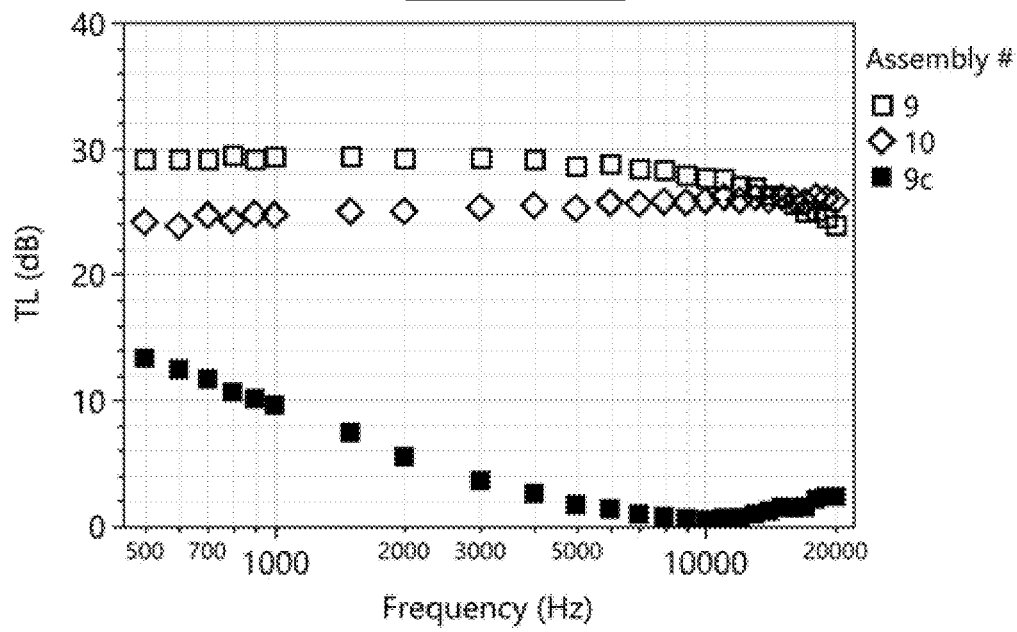
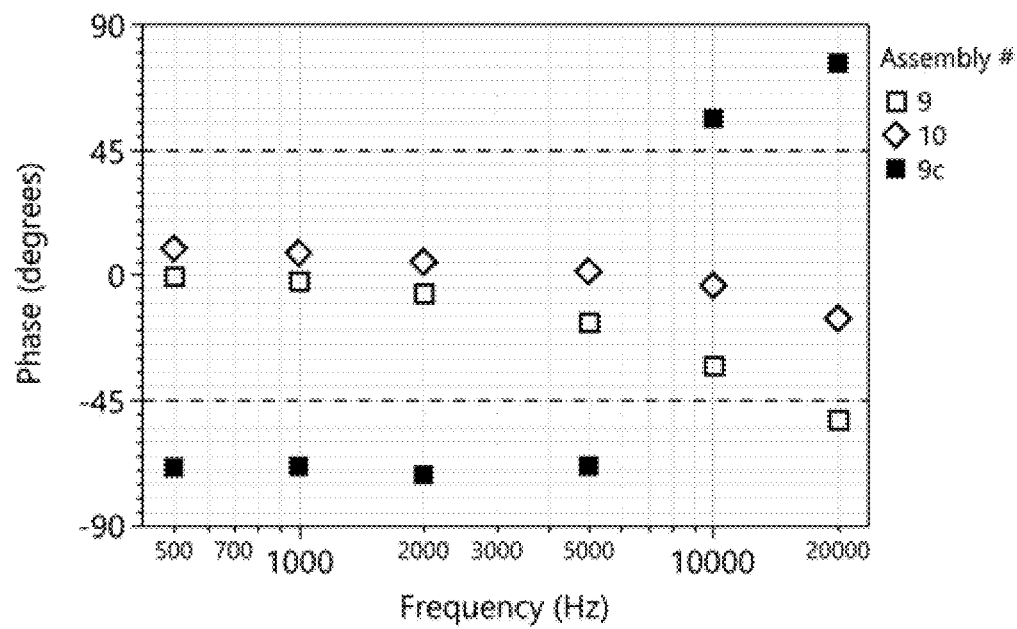

FIGURE 13
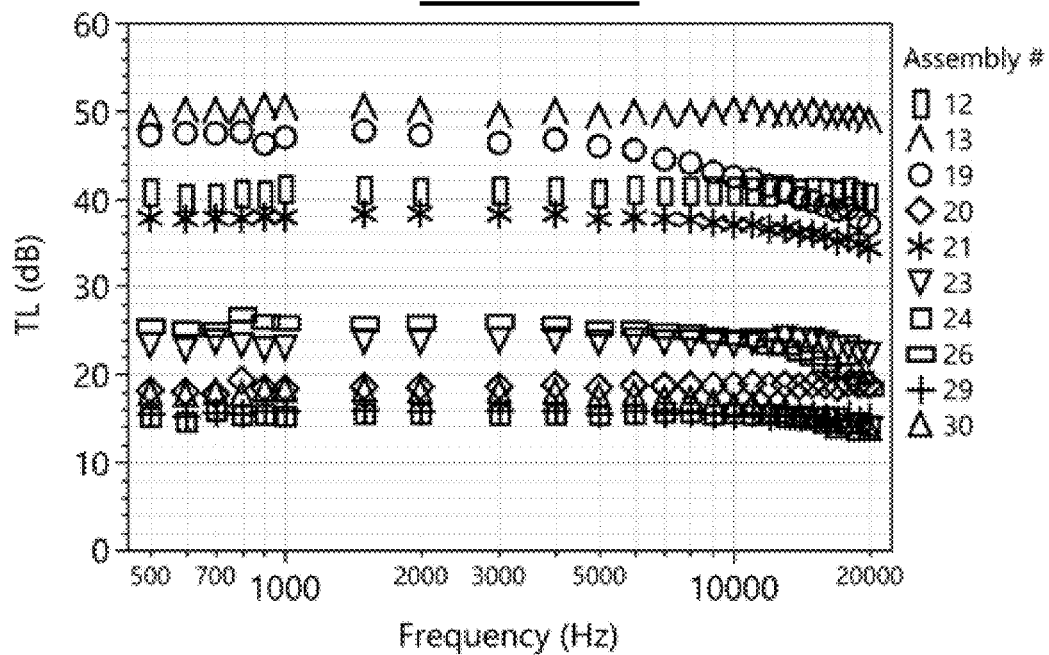
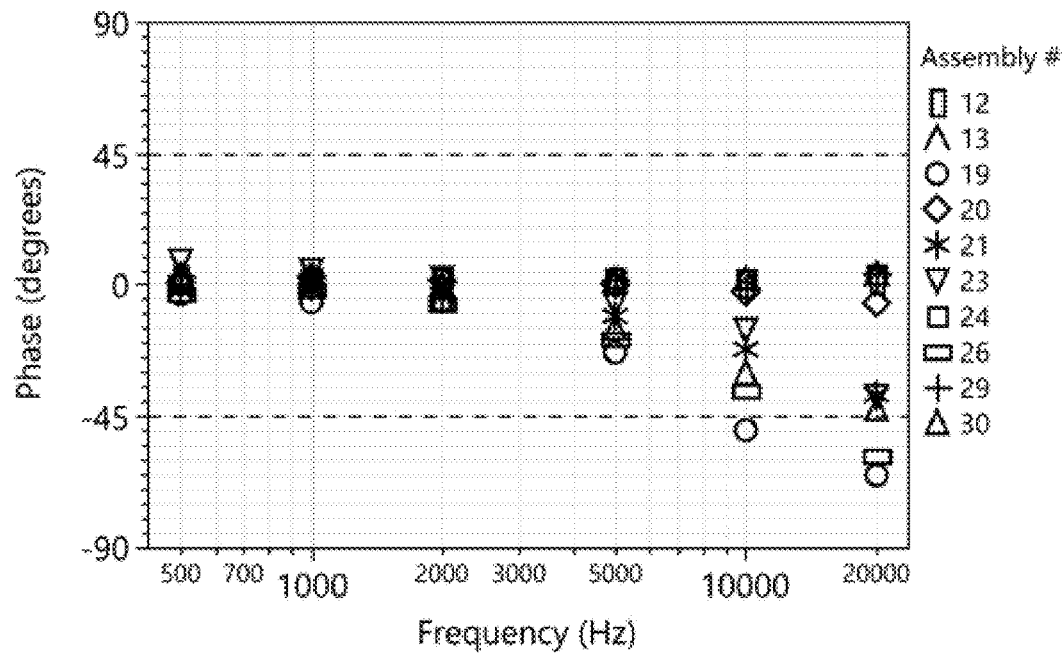

FIGURE 14
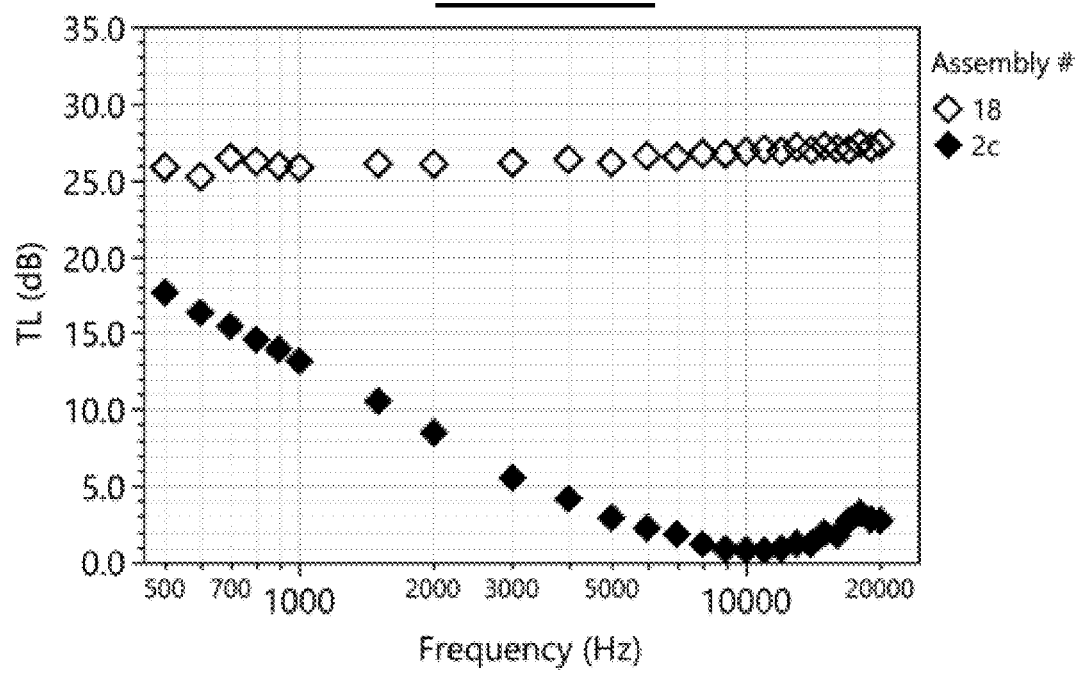
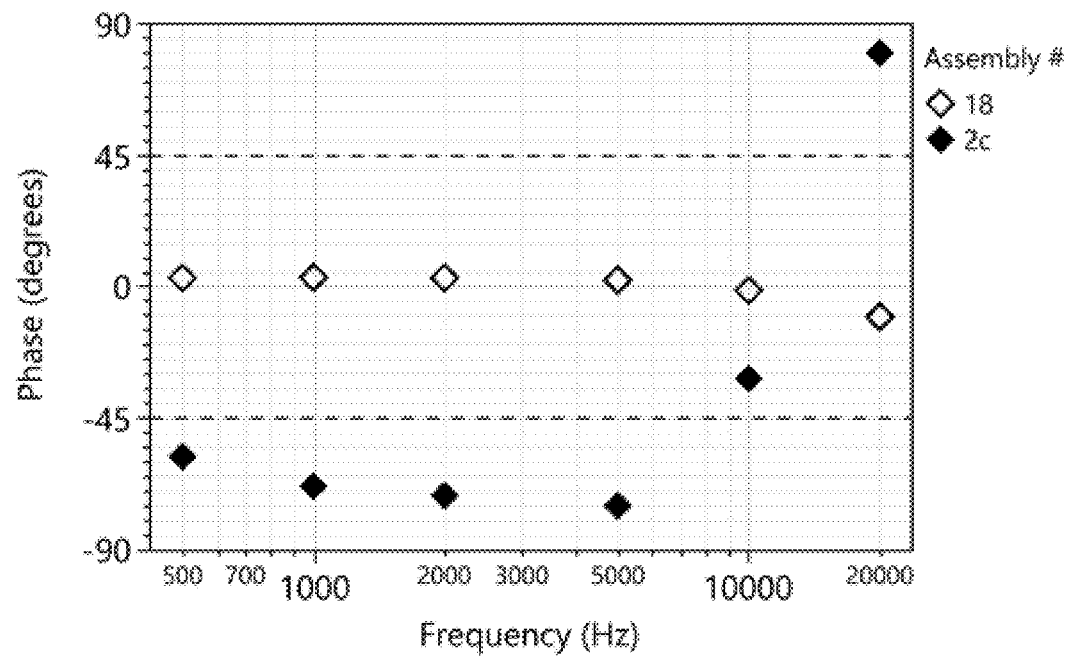

FIGURE 15
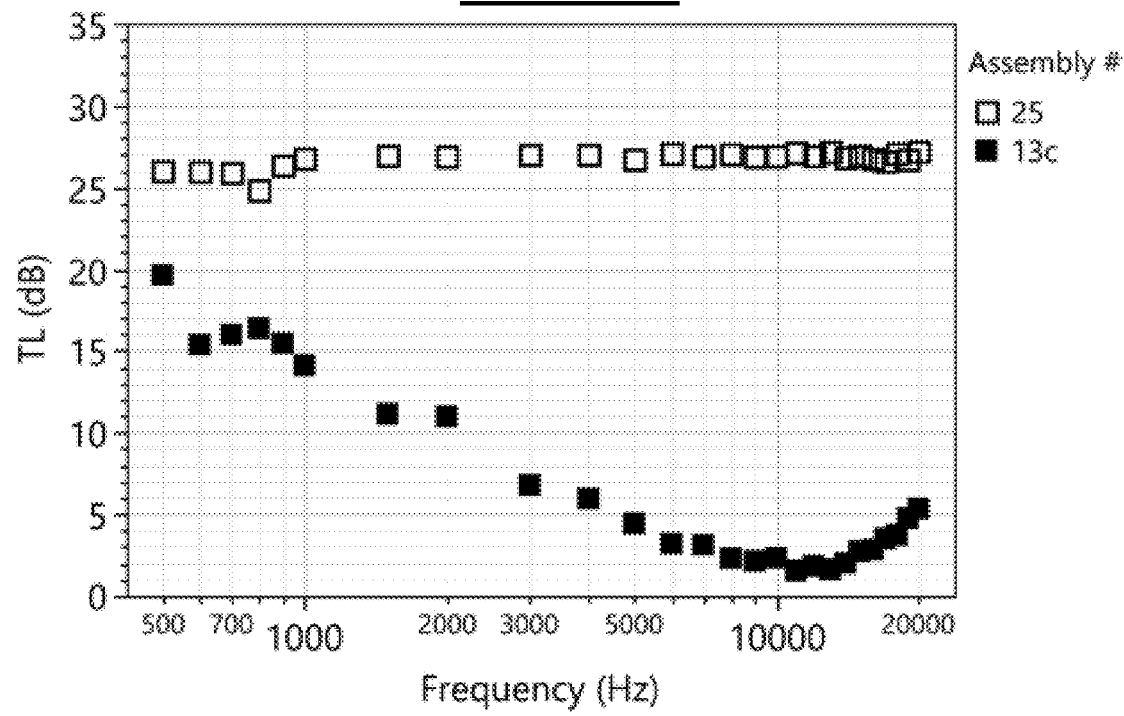
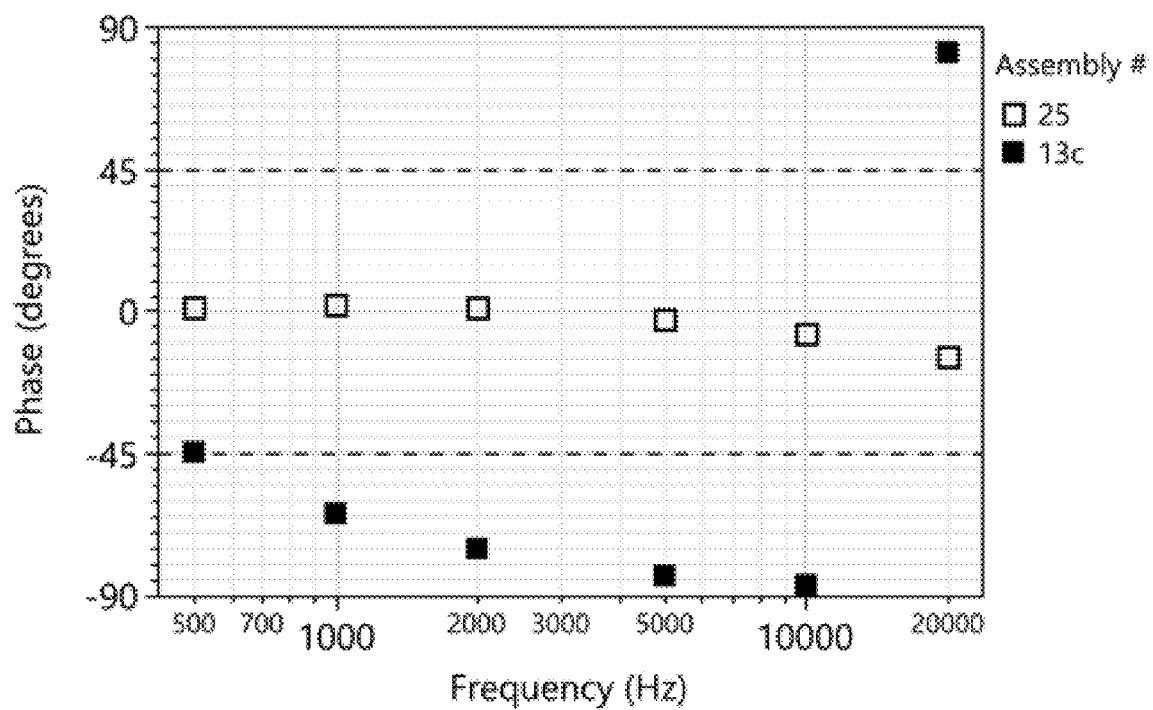

FIGURE 16
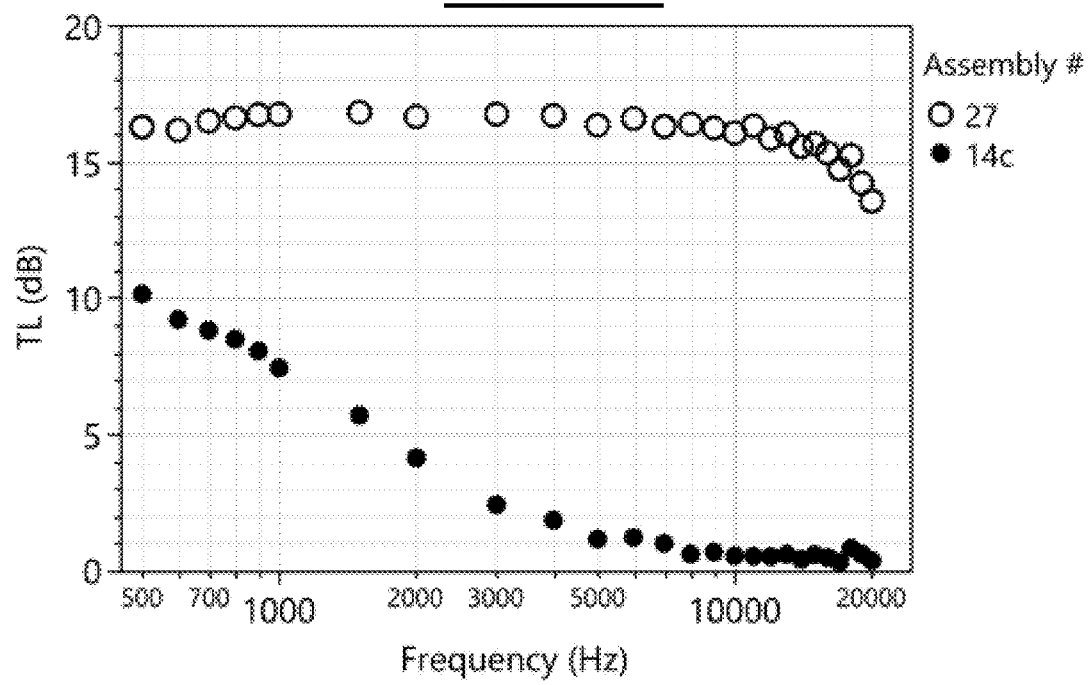
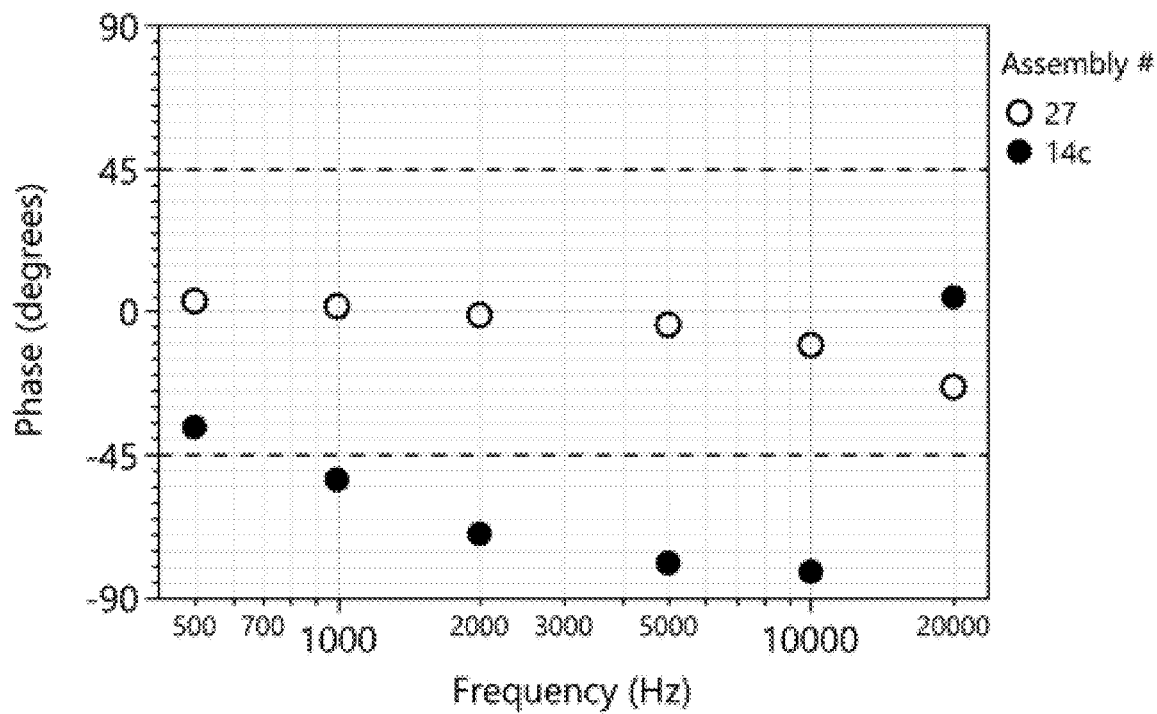

FIGURE 17
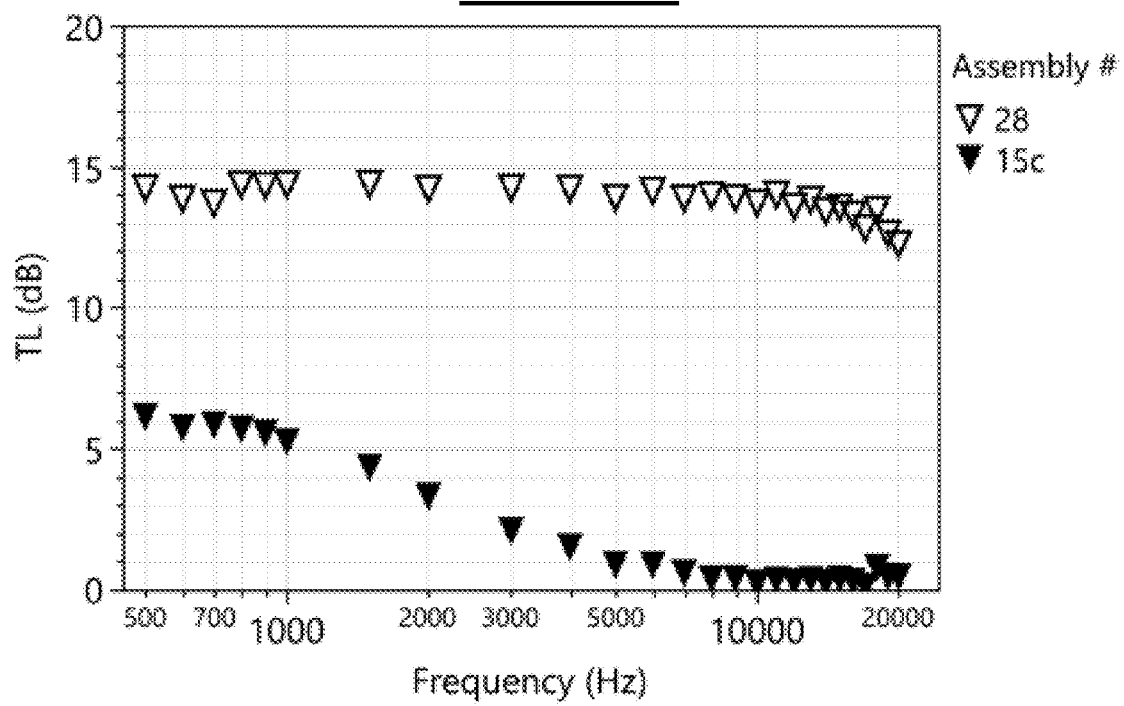
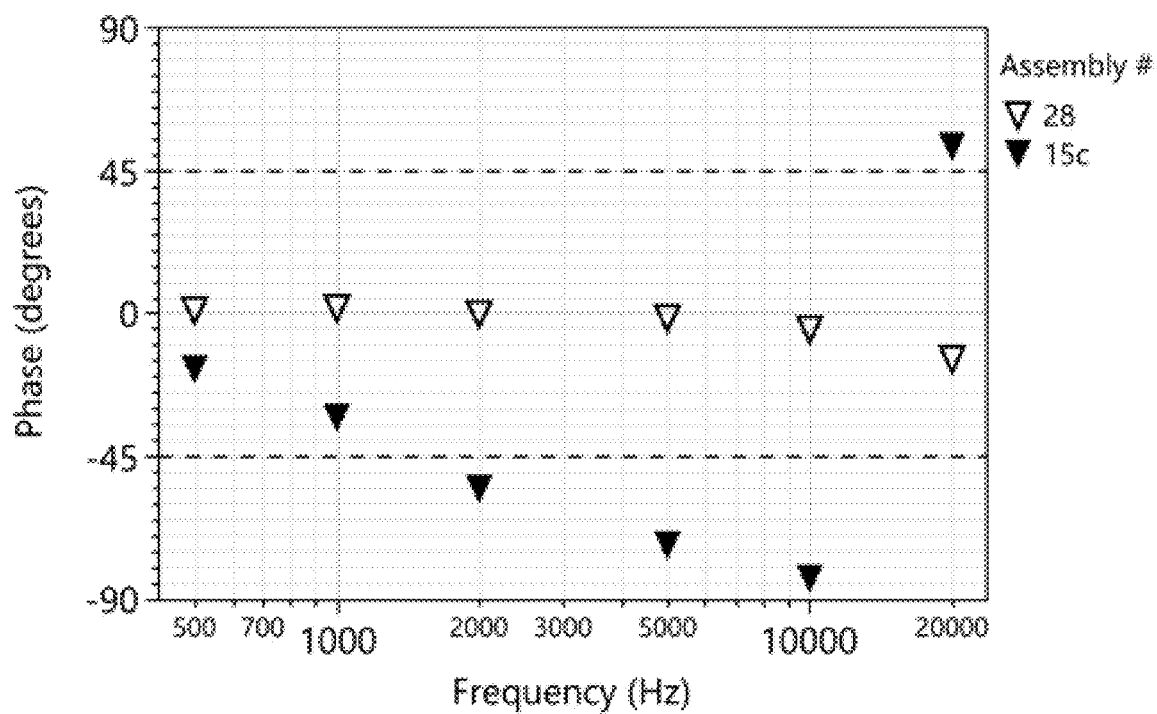

FIGURE 18
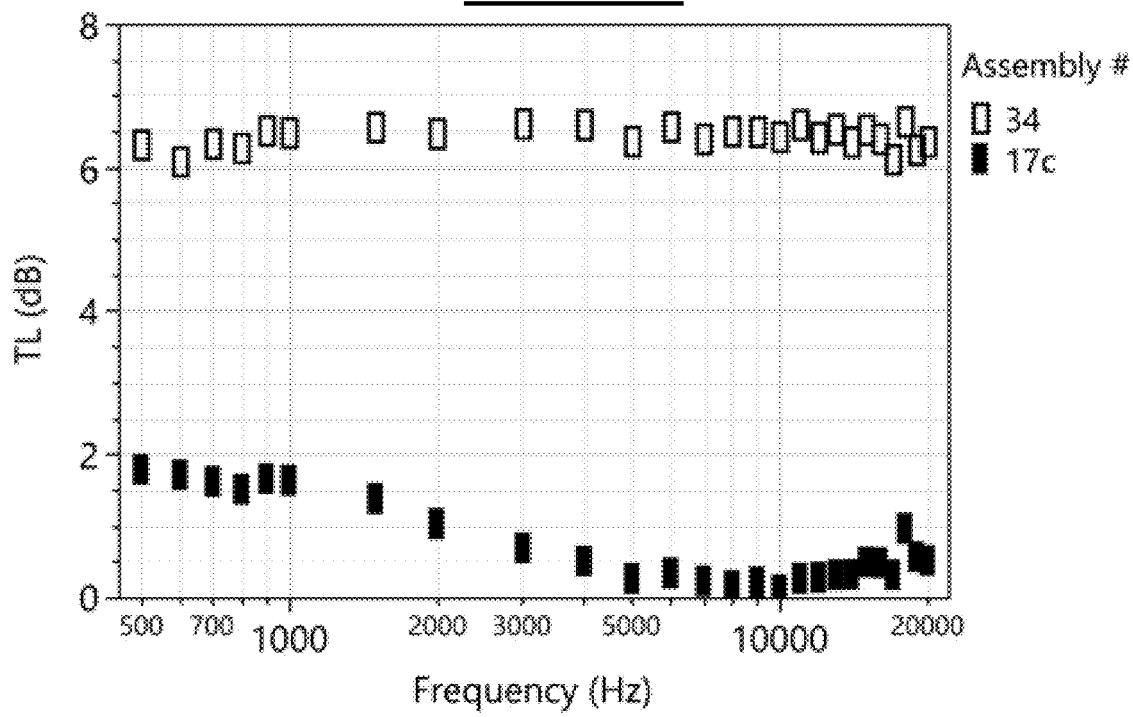
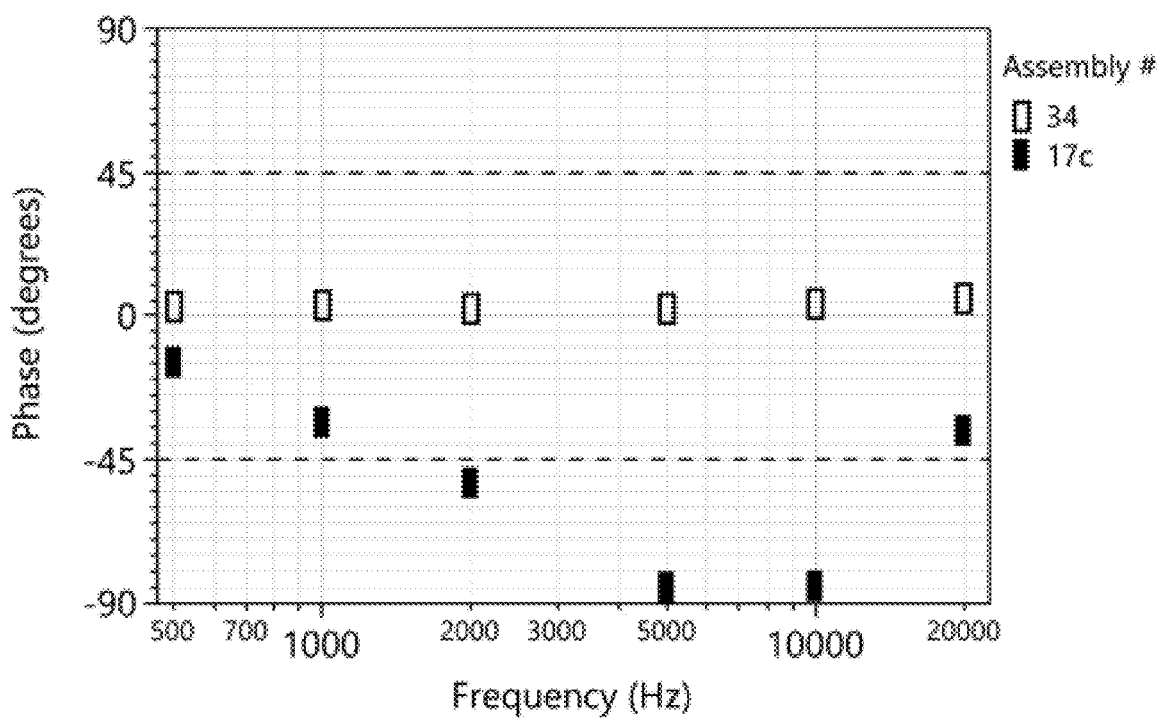

FIGURE 20
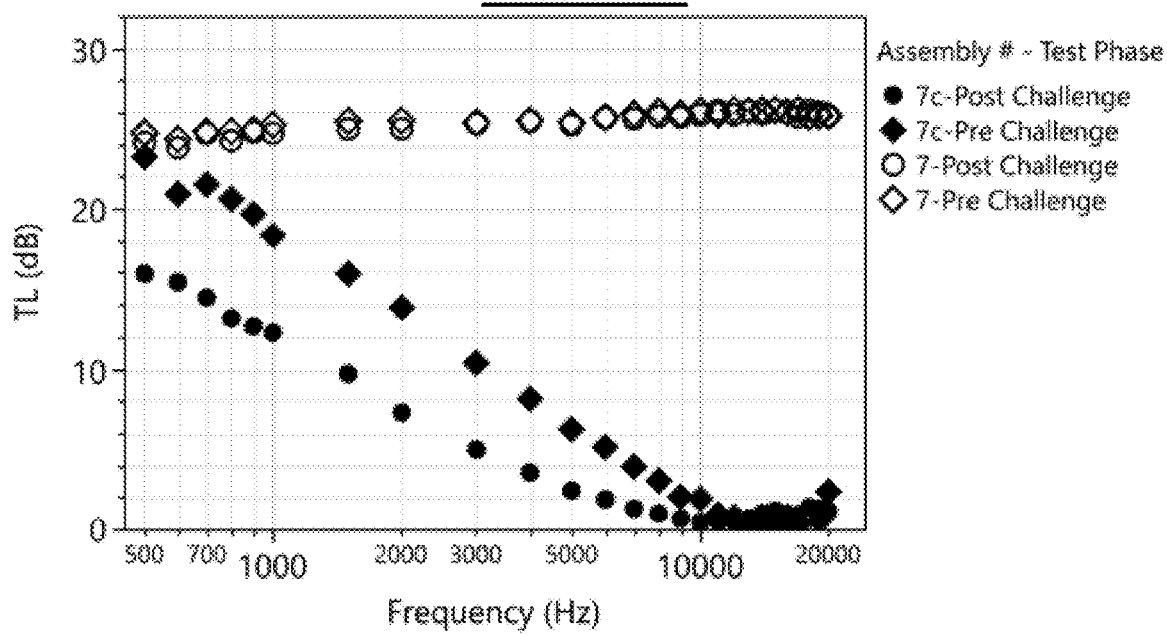
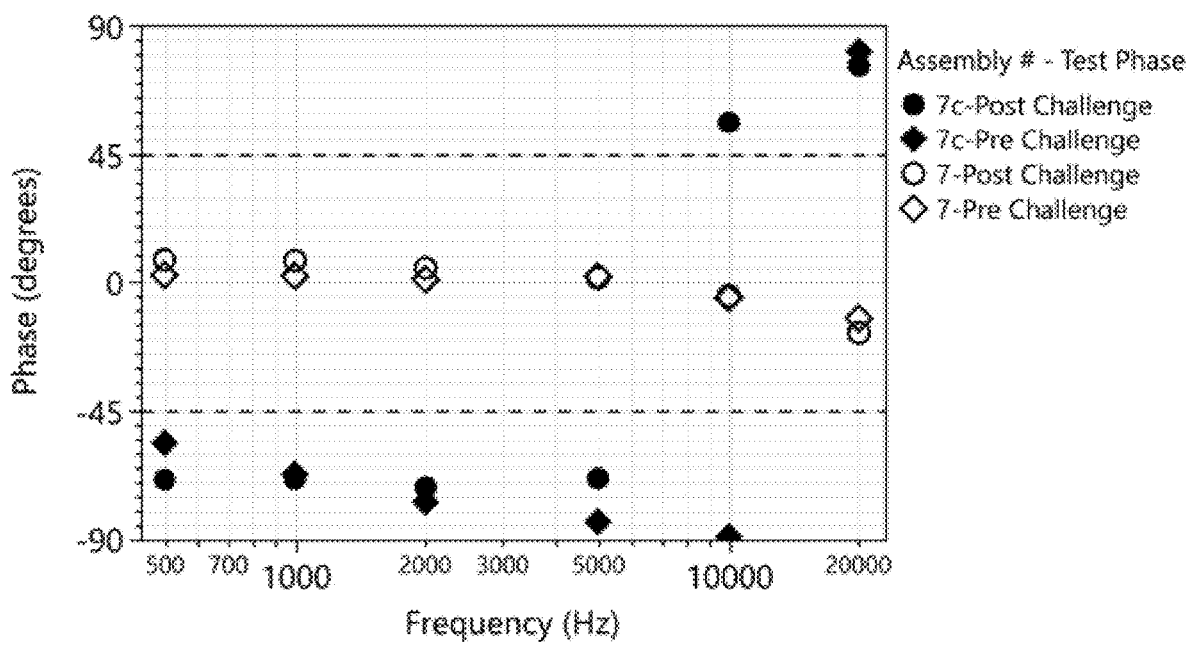

FIGURE 23
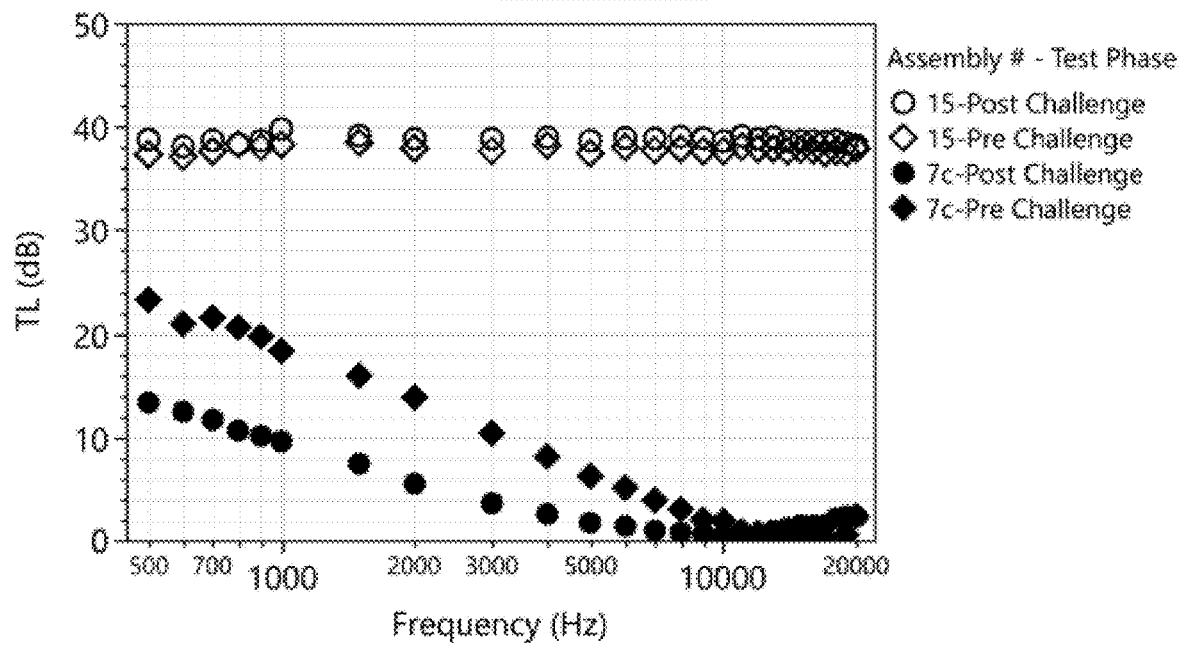
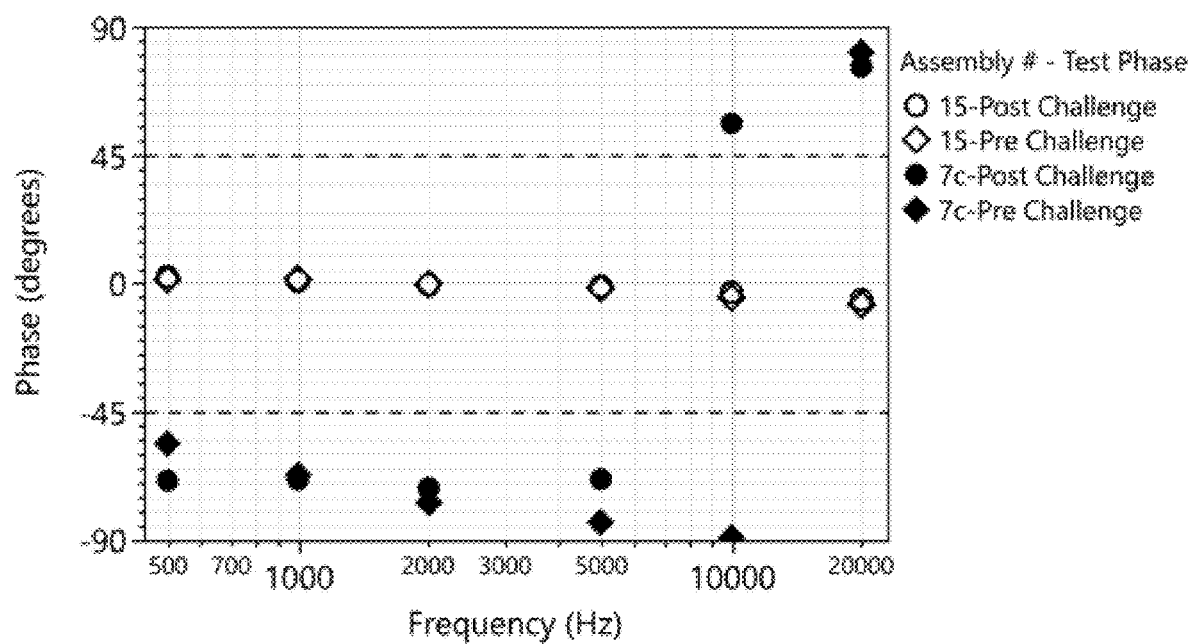

FIGURE 26
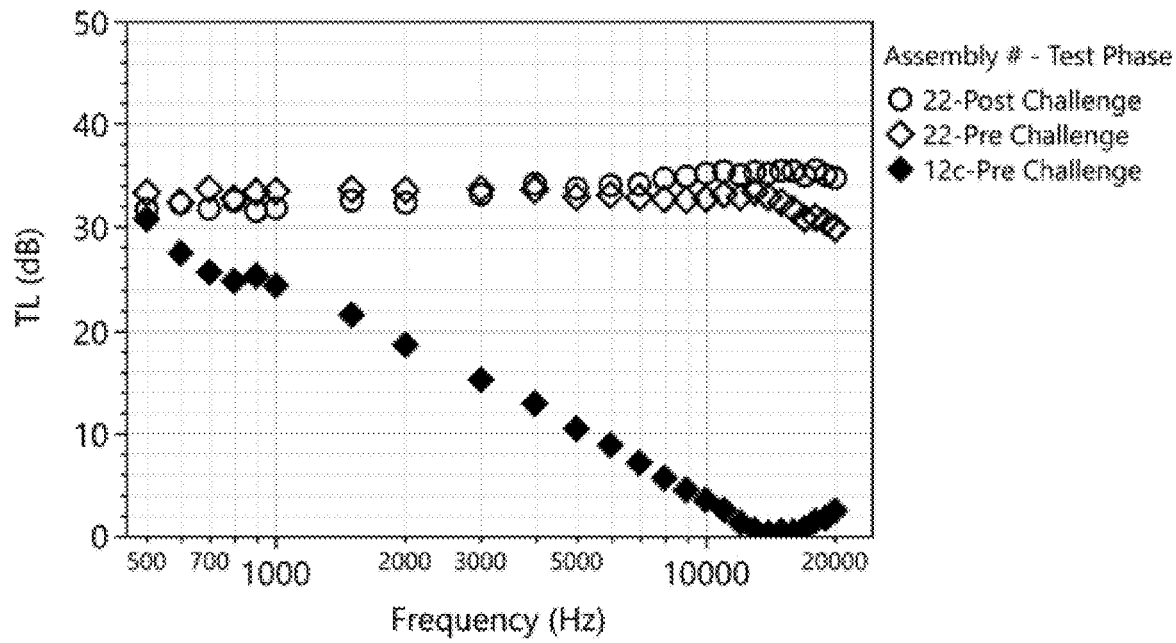
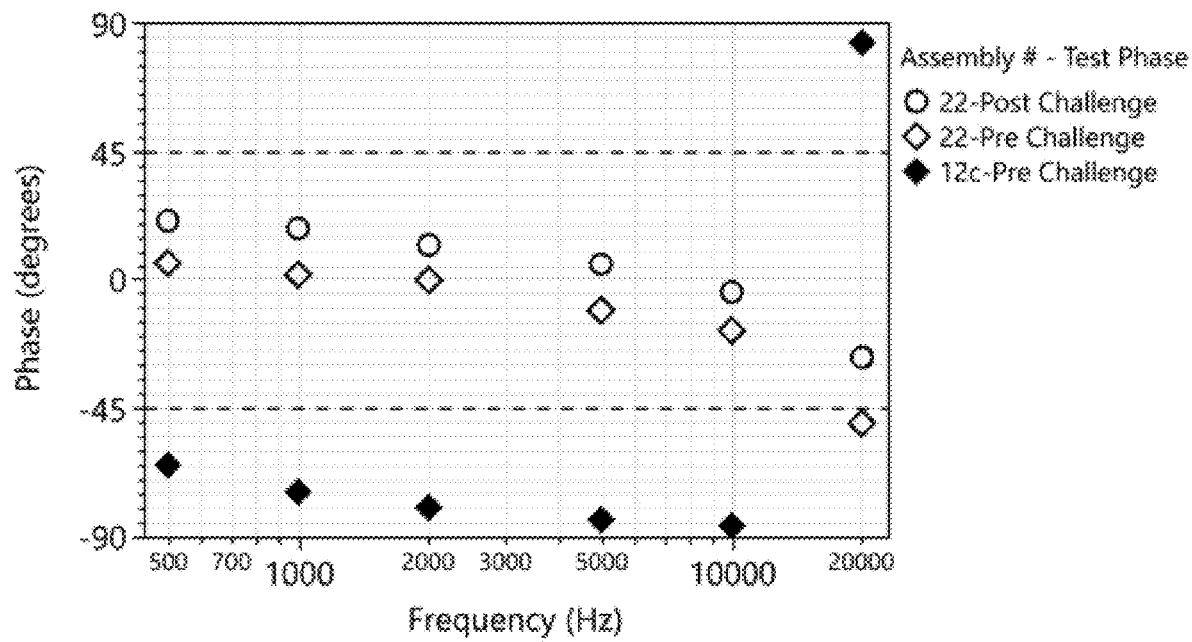

FIGURE 27
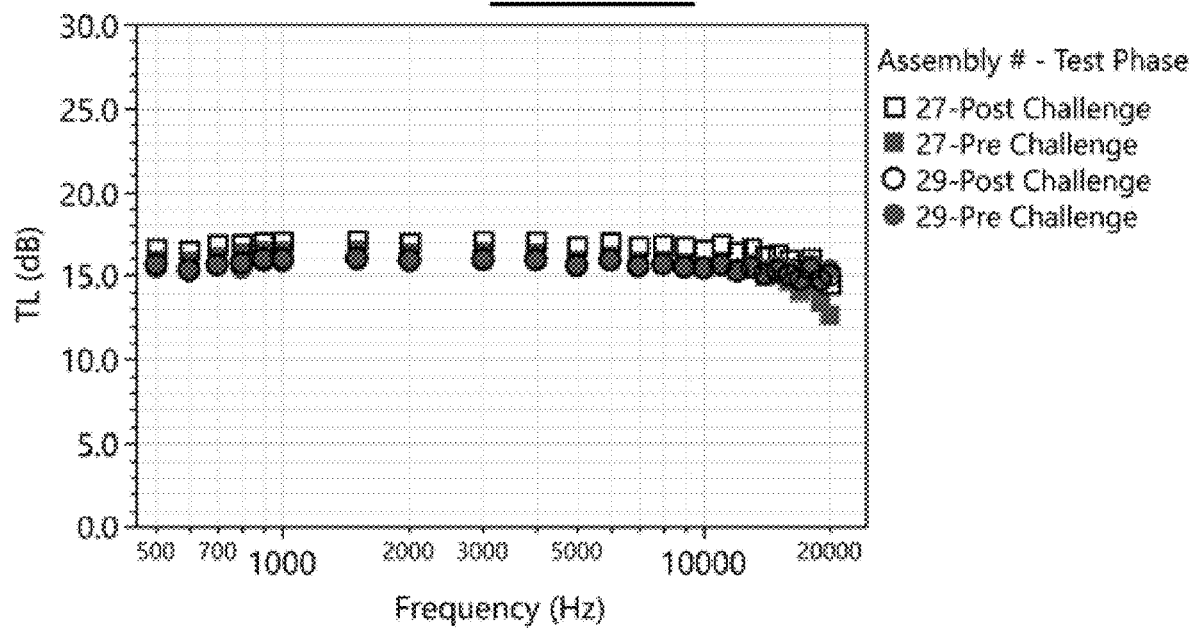
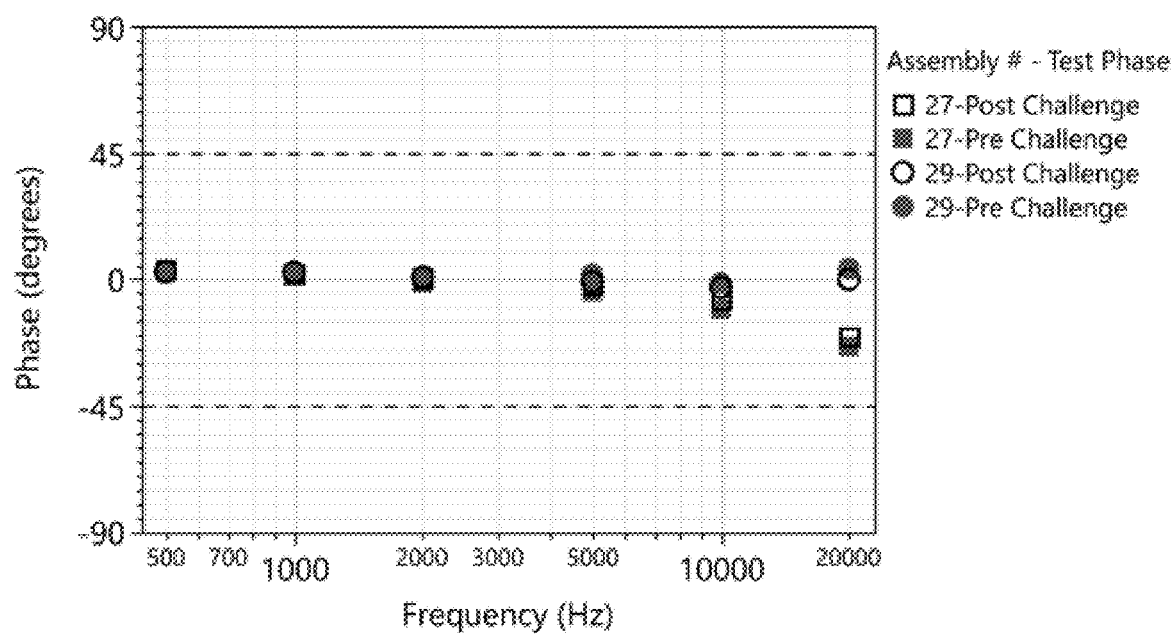

FIGURE 28
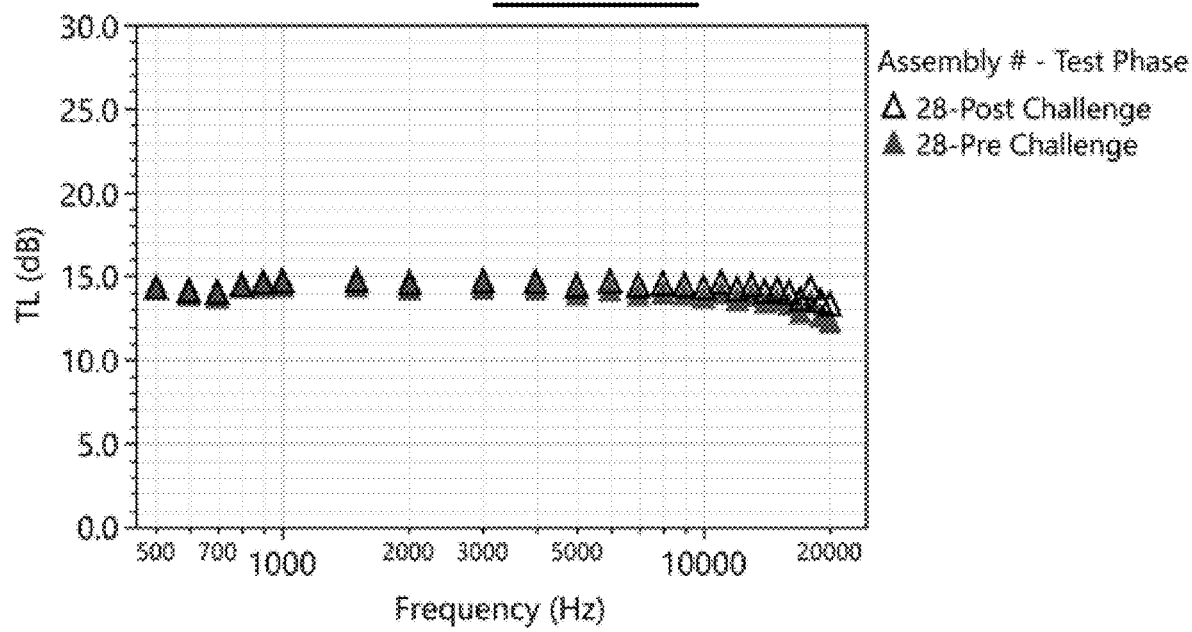
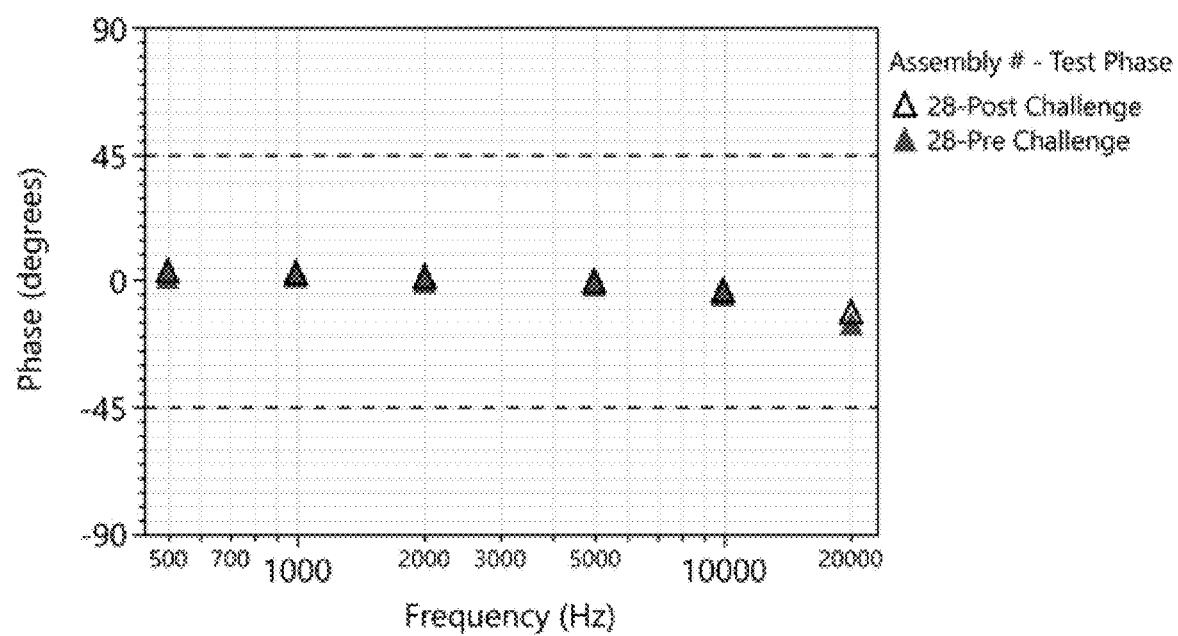

FIGURE 29
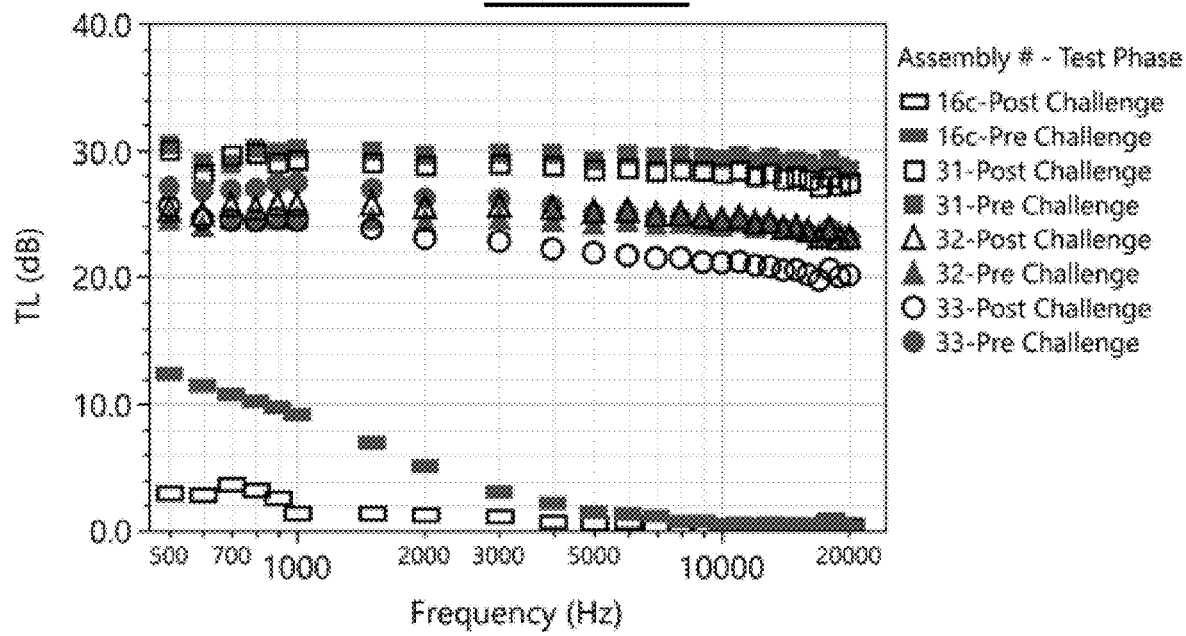
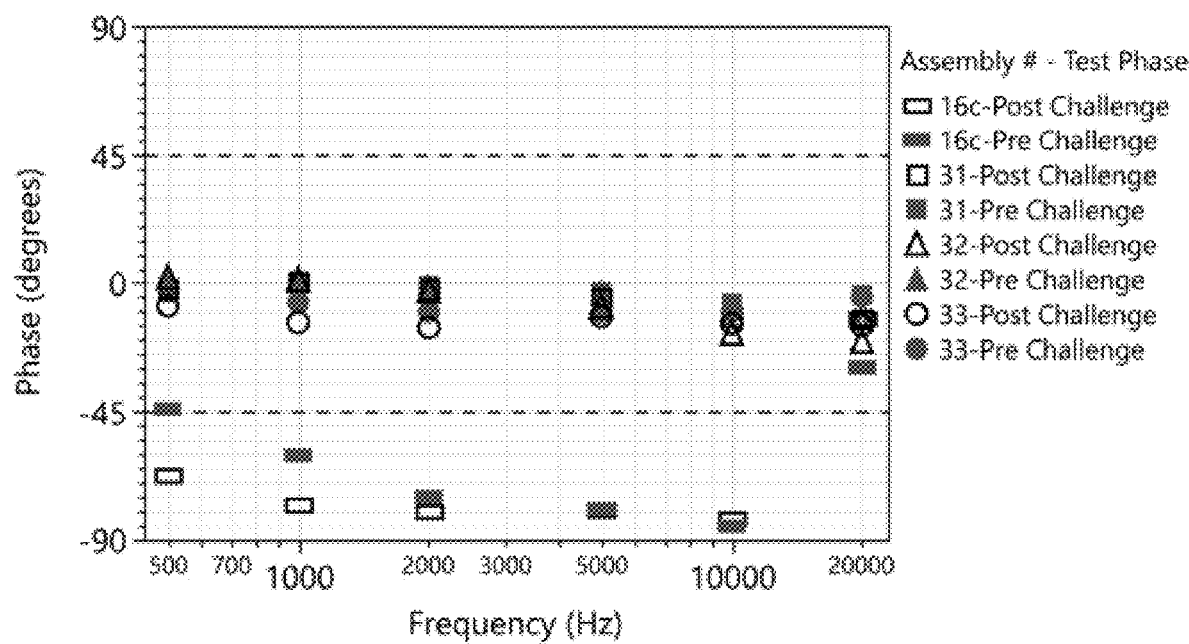

FIGURE 30
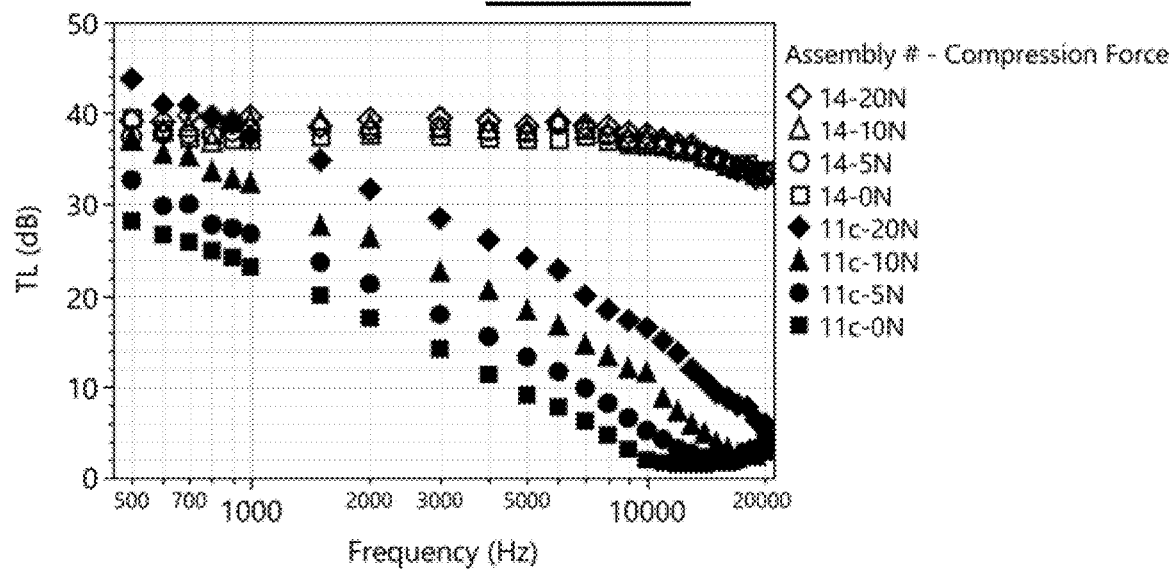
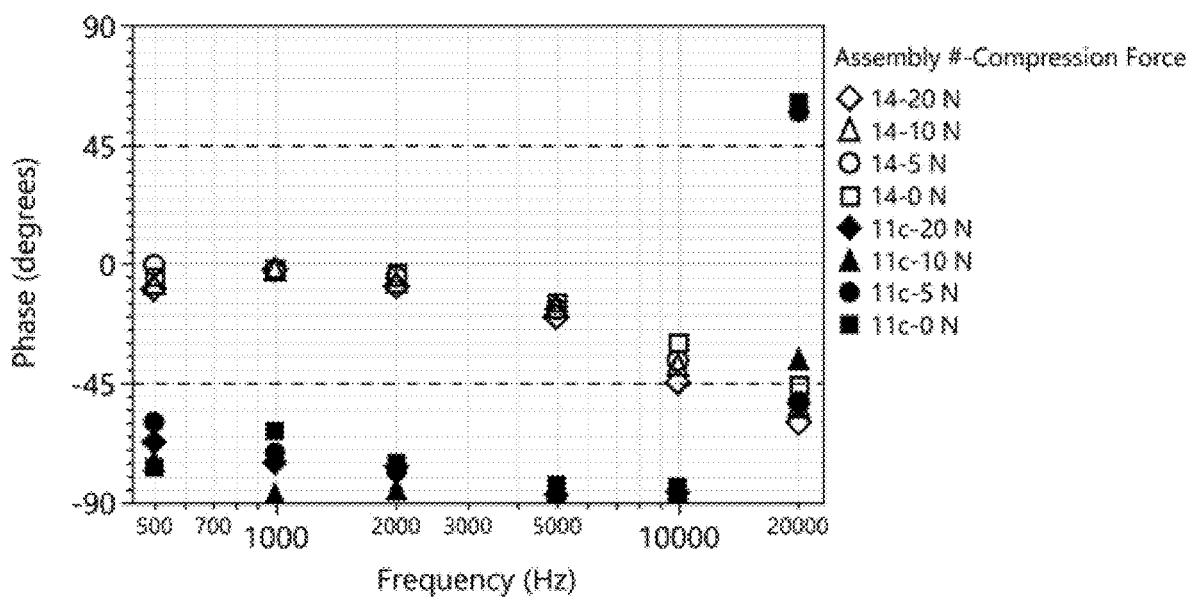

FIGURE 33
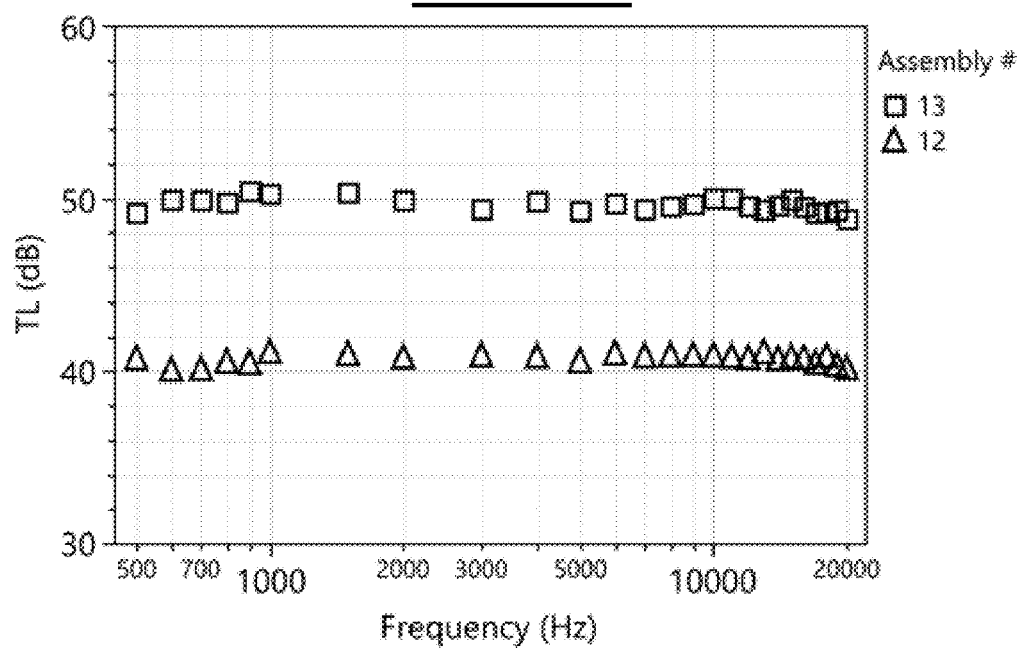
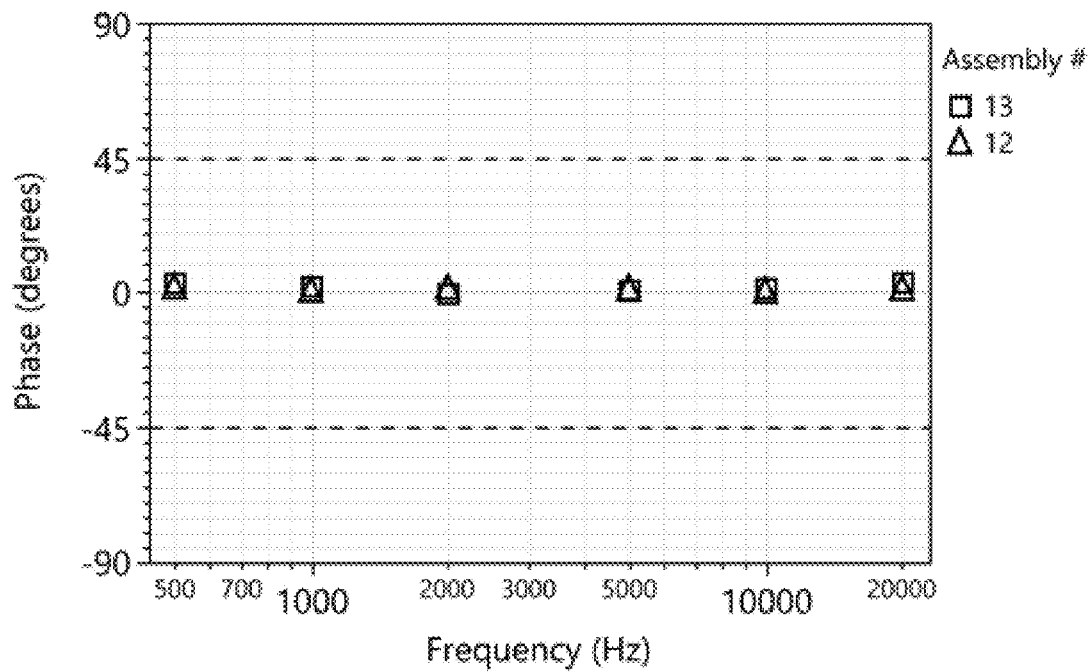

ACOUSTICALLY RESISTIVE SUPPORTED MEMBRANE ASSEMBLIES

FIELD

The field of the present disclosure relates to acoustic membrane assemblies.

BACKGROUND

Acoustic membrane assemblies can allow sound to propagate through and past a membrane and to and from a device. Acoustic membranes can also prevent ingress of water, dust and other contaminants. There is an ongoing need in the art for improved acoustic membranes.

SUMMARY

Covered embodiments are defined by the claims, not this summary. This summary is a high-level overview of various aspects and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The present disclosure relates to an assembly comprising a polymer membrane and at least one support layer that includes a plurality of openings.

In some embodiments, the assembly comprises: a polymer membrane having an air flow resistance ranging from 75 to 50,000 Rayls; and at least one support layer; at least a portion of the at least one support layer is in contact with the polymer membrane, the at least one support layer has an airflow resistance of from 10 to 5000 Rayls; the assembly has an effective stiffness that ranges from 0.0002 Pa/nm to 3,000 Pa/nm when measured using the Vibrational Displacement Test ("VDT"); and the assembly has an acoustic impedance with a phase angle of +45 degrees to −45 degrees over a frequency range of 50 to 20,000 Hz as measured by the Impedance Tube Transfer Matrix Test ("ITTMT").

In some embodiments, the assembly comprises: a polymer membrane having an air flow resistance ranging from 75 Rayls to 50,000 Rayls; at least one support layer; at least a portion of the at least one support layer is in contact with the at least one polymer membrane, the at least one support layer has an airflow resistance ranging from 10 Rayls to 5000 Rayls; and the at least one support layer has an effective stiffness that: ranges from 0.05 Pa/nm to 25 Pa/nm measured using the Vibrational Displacement Test ("VDT"); and the assembly has an acoustic impedance with a phase angle of +45 degrees to −45 degrees over a frequency range of 50 to 20,000 Hz as measured by the Impedance Tube Transfer Matrix Test ("ITTMT").

In some embodiments, the assembly comprises an airflow resistance of from 100 to 50,000 Rayls; an effective stiffness from 0.0002 Pa/nm to 3,000 Pa/nm when measured using the Vibrational Displacement Test ("VDT"); and an acoustic impedance with a phase angle of +45 degrees to −45 degrees over a frequency range of 50 to 20,000 Hz as measured by the Impedance Tube Transfer Matrix Test ("ITTMT").

In some embodiments, the assembly has a water entry pressure ranging from 10 psi to 350 psi ("WEP") measured in accordance with the Capillary Piston Test ("CPT").

In some embodiments, the assembly exhibits a transmission loss of from 3 dB to 48 dB when measured by the Impedance Tube Transfer Matrix Test ("ITTMT") over the frequency range of 50 to 20,000 Hz.

In some embodiments, the assembly comprises an airflow resistance of from 100 to 50,000 Rayls; an effective stiffness from 0.0002 Pa/nm to 3,000 Pa/nm when measured using the Vibrational Displacement Test ("VDT"); and a transmission loss that does not vary by more than 1.5 dB/octave over the frequency range of 50 to 20,000 Hz when measured by the Impedance Tube Transfer Matrix Test ("ITTMT").

In some embodiments, the polymer membrane has a thickness ranging from 0.025 microns to 300 microns.

In some embodiments, the polymer membrane comprises a plurality of pores with different pore sizes.

In some embodiments, the plurality of pores has a maximum pore size ranging from 0.1 to 30 microns.

In some embodiments, the polymer membrane has a bubble point ranging from 0.4 psi to 120 psi.

In some embodiments, the at least one support layer comprises a plurality of openings.

In some embodiments, the largest dimension of a single opening of the plurality of openings is 1 to 500 microns.

In some embodiments, the at least one support layer has a thickness of 10 to 1000 microns In some embodiments, the at least one support layer has an effective open area of from 5% to 98%.

In some embodiments, the polymer membrane comprises expanded polytetrafluoroethylene (ePTFE).

In some embodiments, the polymer membrane has a Young's Modulus ranging from 1 MPa to 1000 MPa.

In some embodiments, the assembly comprises a single support layer.

In some embodiments, the assembly comprises at least two support layers.

In some embodiments, the assembly comprises a first support layer and a second support layer, and the polymer membrane is sandwiched between the first support layer the second support layer.

In some embodiments, the first and second support layers comprise the same material.

In some embodiments, the first and second support layers comprise a different material.

In some embodiments, there is an adhesive between the polymer membrane and the at least one support layer.

In some embodiments, the at least one support layer comprises fiberglass.

In some embodiments, the at least one support layer comprises a metal.

In some embodiments, the metal is brass.

In some embodiments, the one or more support layers comprises a mesh.

In some embodiments, the mesh is woven polyethylene terephthalate (PET) mesh.

In some embodiments, the mesh is extruded plastic nonwoven mesh.

BRIEF DESCRIPTION OF THE DRAWINGS

Some embodiments of the disclosure are herein described, by way of example only, with reference to the accompanying drawings. With specific reference now to the drawings in detail, the embodiments shown are by way of example and for purposes of illustrative discussion of embodiments of the disclosure. In this regard, the description taken with the drawings makes apparent to those skilled in the art how embodiments of the disclosure may be practiced.

FIGS. 7-18 depict exemplary acoustic characteristics of exemplary assemblies.

FIGS. 19-29 depict exemplary acoustic characteristics of exemplary assemblies before and after air pressure test.

FIG. 30 depicts exemplary acoustic characteristics of exemplary assemblies under compression force.

FIG. 33 depicts exemplary tunable acoustic characteristics of non-limiting assemblies.

DETAILED DESCRIPTION

Figure 1:
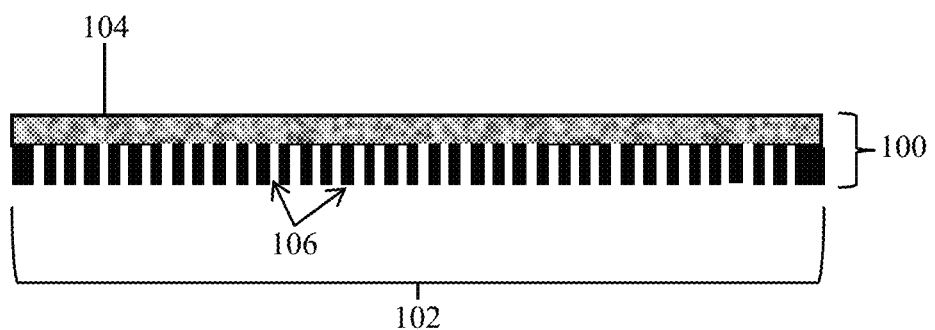
FIG. 1 depicts an exemplary assembly in accordance with the present disclosure and having a single support layer.

Among those benefits and improvements that have been disclosed, other objects and advantages of this disclosure will become apparent from the following description taken in conjunction with the accompanying figures. Detailed embodiments of the present disclosure are disclosed herein; however, the disclosed embodiments are merely illustrative of the disclosure that may be embodied in various forms. In addition, each of the examples given regarding the various embodiments of the disclosure are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

All prior patents, publications, and test methods referenced herein are incorporated by reference in their entireties.

Some embodiments of the present disclosure are directed to a predominantly resistive supported acoustic membrane assembly that comprises a polymer membrane and at least one support layer.

In some embodiments, the polymer membrane in the assembly includes a plurality of pores. In some embodiments, the plurality of pores can have a maximum pore size. As used herein, "maximum pore size," is the size of the largest pore of the plurality of pores.

In some embodiments, the plurality of pores can have a maximum pore size of 0.1 to 30 microns. In some embodiments, the plurality of pores can have a maximum pore size of 0.3 to 30 microns. In some embodiments, the plurality of pores can have a maximum pore size of 0.5 to 30 microns. In some embodiments, the plurality of pores can have a maximum pore size of 10 to 30 microns. In some embodiments, the plurality of pores can have a maximum pore size of 20 to 30 microns. In some embodiments, the plurality of pores can have a maximum pore size of 25 to 30 microns.

In some embodiments, the plurality of pores can have a maximum pore size of 0.2 to 8 microns. In some embodiments, the plurality of pores can have a maximum pore size of 0.4 to 4 microns. In some embodiments, the plurality of pores can have a maximum pore size of 0.8 to 2 microns. In some embodiments, the plurality of pores can have a maximum pore size of 1 to 1.6 microns.

In some embodiments, the plurality of pores can have a maximum pore size of 0.2 to 4 microns. In some embodiments, the plurality of pores can have a maximum pore size of 0.2 to 2 microns. In some embodiments, the plurality of pores can have a maximum pore size of 0.2 to 1.6 microns. In some embodiments, the plurality of pores can have a maximum pore size of 0.2 to 1 microns. In some embodiments, the plurality of pores can have a maximum pore size of 0.2 to 0.8 microns. In some embodiments, the plurality of pores can have a maximum pore size of 0.2 to 0.4 microns.

In some embodiments, the plurality of pores can have a maximum pore size of 0.4 to 8 microns. In some embodiments, the plurality of pores can have a maximum pore size of 0.8 to 8 microns. In some embodiments, the plurality of pores can have a maximum pore size of 1 to 8 microns. In some embodiments, the plurality of pores can have a maximum pore size of 1.6 to 8 microns. In some embodiments, the plurality of pores can have a maximum pore size of 2 to 8 microns. In some embodiments, the plurality of pores can have a maximum pore size of 4 to 8 microns.

In some embodiments, the polymer membrane has a thickness ranging from 0.06 microns to 130 microns. In some embodiments, the polymer membrane has a thickness ranging from 0.12 microns to 65 microns. In some embodiments, the polymer membrane has a thickness ranging from 0.24 microns to 30 microns. In some embodiments, the polymer membrane has a thickness ranging from 0.5 microns to 15 microns. In some embodiments, the polymer membrane has a thickness ranging from 1 micron to 8 microns. In some embodiments, the polymer membrane has a thickness ranging from 2 microns to 4 microns.

In some embodiments, the polymer membrane has a thickness ranging from 0.025 microns to 300 microns. In some embodiments, the polymer membrane has a thickness ranging from 0.061 microns to 126 microns. In some embodiments, the polymer membrane has a thickness ranging from 0.025 microns to 150 microns.

In some embodiments, the polymer membrane has a thickness ranging from 0.025 microns to 150 microns. In some embodiments, the polymer membrane has a thickness ranging from 0.025 microns to 100 microns. In some embodiments, the polymer membrane has a thickness ranging from 0.025 microns to 50 microns. In some embodiments, the polymer membrane has a thickness ranging from 0.025 microns to 25 microns. In some embodiments, the polymer membrane has a thickness ranging from 0.025 microns to 10 microns. In some embodiments, the polymer membrane has a thickness ranging from 0.025 microns to 5 microns. In some embodiments, the polymer membrane has a thickness ranging from 0.025 microns to 2.5 microns. In some embodiments, the polymer membrane has a thickness ranging from 0.025 microns to 1 microns. In some embodiments, the polymer membrane has a thickness ranging from 0.025 microns to 0.3 microns.

In some embodiments, the polymer membrane has a thickness ranging from 0.06 microns to 65 microns. In some embodiments, the polymer membrane has a thickness ranging from 0.06 microns to 30 microns. In some embodiments, the polymer membrane has a thickness ranging from 0.06 microns to 15 microns. In some embodiments, the polymer membrane has a thickness ranging from 0.06 microns to 8 microns. In some embodiments, the polymer membrane has a thickness ranging from 0.06 micron to 4 microns. In some embodiments, the polymer membrane has a thickness ranging from 0.06 microns to 2 microns. In some embodiments, the polymer membrane has a thickness ranging from 0.06 microns to 1 micron. In some embodiments, the polymer membrane has a thickness ranging from 0.06 microns to 0.5 microns. In some embodiments, the polymer membrane has a thickness ranging from 0.06 microns to 0.24 microns. In some embodiments, the polymer membrane has a thickness ranging from 0.06 microns to 0.12 microns.

In some embodiments, the polymer membrane has a thickness ranging from 0.12 microns to 130 microns. In some embodiments, the polymer membrane has a thickness ranging from 0.24 microns to 130 microns. In some embodiments, the polymer membrane has a thickness ranging from 0.5 microns to 130 microns. In some embodiments, the polymer membrane has a thickness ranging from 1 micron to 130 microns. In some embodiments, the polymer membrane has a thickness ranging from 2 microns to 130 microns. In some embodiments, the polymer membrane has a thickness ranging from 4 microns to 130 microns. In some embodiments, the polymer membrane has a thickness ranging from 8 microns to 130 microns. In some embodiments, the polymer membrane has a thickness ranging from 15 microns to 130 microns. In some embodiments, the polymer membrane has a thickness ranging from 30 microns to 130 microns. In some embodiments, the polymer membrane has a thickness ranging from 65 microns to 130 microns.

In some embodiments, the polymer membrane comprises at least one of: polyolefins, polyurethanes, polyesters, polyamides, polyketones, polysulfones, or polycarbonates. In some embodiments, the polymer membrane can comprise a fluoropolymer. In some embodiments, the fluoropolymer comprises one or more of PVDF, polyvinylidene diflouride, poly(tetrafluoroethylene-co-hexafluoropropylene) (FEP), poly(ethylene-alt-tetrafluoroethylene) (ETFE), polychlorotrifluoroethylene (PCTFE), poly(tetrafluoroethylene-co-perfluoropropyl vinyl ether) (PFA), poly(vinylidene fluoride-co-hexafluoropropylene) (PVDF-co-HFP), polyvinyl fluoride (PVF), or any combination thereof.

In some embodiments, the fluoropolymer is polytetrafluoroethylene (PTFE). In some embodiments, the PTFE is expanded polytetrafluoroethylene (ePTFE). In some embodiments, the ePTFE comprises the same microstructure, characterized by nodes interconnected by fibrils, as one of the ePTFE compositions disclosed in U.S. Pat. No. 3,953,566 to Gore or U.S. Pat. No. 4,902,423 to Bacino.

In a non-limiting example, the polymer is a lightweight ePTFE membrane having high intrinsic strength, prepared according to the general methodology described in U.S. Pat. No. 3,953,566 to Gore. The non-limiting example polymer membrane can be a biaxially oriented membrane that is highly crystalline (i.e., having a crystallinity index of at least 94%) and has a matrix tensile strength in both the longitudinal and transverse directions of at least 600 MPa. The non-limiting example polymer membrane may be comprised of a plurality of stacked ePTFE layers, where each layer has a mass per area of less than 0.1 g/m$^2$.

In some embodiments, the polymer membrane has an air flow resistance ranging from 75 to 50,000 Rayls. In some embodiments, the polymer membrane has an air flow resistance ranging from 100 to 50,000 Rayls. In some embodiments, the polymer membrane has an air flow resistance ranging from 200 to 25,000 Rayls. In some embodiments, the polymer membrane has an air flow resistance ranging from 800 to 12,500 Rayls. In some embodiments, the polymer membrane has an air flow resistance ranging from 1600 to 6000 Rayls. In some embodiments, the polymer membrane has an air flow resistance ranging from 3000 to 4000 Rayls.

In some embodiments, the polymer membrane has an air flow resistance ranging from 200 to 25,000 Rayls. In some embodiments, the polymer membrane has an air flow resistance ranging from 200 to 12,500 Rayls. In some embodiments, the polymer membrane has an air flow resistance ranging from 200 to 6000 Rayls. In some embodiments, the polymer membrane has an air flow resistance ranging from 200 to 4000 Rayls. In some embodiments, the polymer membrane has an air flow resistance ranging from 200 to 3000 Rayls. In some embodiments, the polymer membrane has an air flow resistance ranging from 200 to 1600 Rayls. In some embodiments, the polymer membrane has an air flow resistance ranging from 200 to 800 Rayls. In some embodiments, the polymer membrane has an air flow resistance ranging from 400 to 800 Rayls.

In some embodiments, the polymer membrane has an air flow resistance ranging from 400 to 50,000 Rayls. In some embodiments, the polymer membrane has an air flow resistance ranging from 800 to 50,000 Rayls. In some embodiments, the polymer membrane has an air flow resistance ranging from 1600 to 50,000 Rayls. In some embodiments, the polymer membrane has an air flow resistance ranging from 3000 to 50,000 Rayls. In some embodiments, the polymer membrane has an air flow resistance ranging from 6000 to 50,000 Rayls. In some embodiments, the polymer membrane has an air flow resistance ranging from 12,500 to 50,000 Rayls. In some embodiments, the polymer membrane has an air flow resistance ranging from 25,000 to 50,000 Rayls.

In some embodiments, the polymer membrane has a Young's Modulus ranging from 1 MPa to 1000 MPa. In some embodiments, the polymer membrane has a Young's Modulus ranging from 2 MPa to 1000 MPa. In some embodiments, the polymer membrane has a Young's Modulus ranging from 5 MPa to 1000 MPa. In some embodiments, the polymer membrane has a Young's Modulus ranging from 10 MPa to 1000 MPa. In some embodiments, the polymer membrane has a Young's Modulus ranging from 25 MPa to 1000 MPa. In some embodiments, the polymer membrane has a Young's Modulus ranging from 50 MPa to 1000 MPa. In some embodiments, the polymer membrane has a Young's Modulus ranging from 100 MPa to 1000 MPa. In some embodiments, the polymer membrane has a Young's Modulus ranging from 250 MPa to 1000 MPa. In some embodiments, the polymer membrane has a Young's Modulus ranging from 500 MPa to 1000 MPa. In some embodiments, the polymer membrane has a Young's Modulus ranging from 750 MPa to 1000 MPa.

In some embodiments, the polymer membrane has a Young's Modulus ranging from 4 MPa to 360 MPa. In some embodiments, the polymer membrane has a Young's Modulus ranging from 8 MPa to 180 MPa. In some embodiments, the polymer membrane has a Young's Modulus ranging from 16 MPa to 90 MPa. In some embodiments, the polymer membrane has a Young's Modulus ranging from 32 MPa to 45 MPa.

In some embodiments, the polymer membrane has a Young's Modulus ranging from 4 MPa to 360 MPa. In some embodiments, the polymer membrane has a Young's Modulus ranging from 4 MPa to 180 MPa. In some embodiments, the polymer membrane has a Young's Modulus ranging from 4 MPa to 90 MPa. In some embodiments, the polymer membrane has a Young's Modulus ranging from 4 MPa to 45 MPa. In some embodiments, the polymer membrane has a Young's Modulus ranging from 4 MPa to 32 MPa. In some embodiments, the polymer membrane has a Young's Modulus ranging from 4 MPa to 16 MPa. In some embodiments, the polymer membrane has a Young's Modulus ranging from 4 MPa to 8 MPa.

In some embodiments, the polymer membrane has a Young's Modulus ranging from 8 MPa to 360 MPa. In some embodiments, the polymer membrane has a Young's Modulus ranging from 16 MPa to 360 MPa. In some embodiments, the polymer membrane has a Young's Modulus ranging from 32 MPa to 360 MPa. In some embodiments, the polymer membrane has a Young's Modulus ranging from 45 MPa to 360 MPa. In some embodiments, the polymer membrane has a Young's Modulus ranging from 90 MPa to 360 MPa. In some embodiments, the polymer membrane has a Young's Modulus ranging from 180 MPa to 360 MPa.

In some embodiments, the polymer membrane has a bubble point ranging from 0.4 to 120 psi. In some embodiments, the polymer membrane has a bubble point ranging from 0.4 to 100 psi. In some embodiments, the polymer membrane has a bubble point ranging from 0.4 to 80 psi. In some embodiments, the polymer membrane has a bubble point ranging from 0.4 to 60 psi. In some embodiments, the polymer membrane has a bubble point ranging from 0.4 to 40 psi. In some embodiments, the polymer membrane has a bubble point ranging from 0.4 to 20 psi. In some embodiments, the polymer membrane has a bubble point ranging from 0.4 to 10 psi. In some embodiments, the polymer membrane has a bubble point ranging from 0.4 to 5 psi. In some embodiments, the polymer membrane has a bubble point ranging from 0.4 to 2 psi. In some embodiments, the polymer membrane has a bubble point ranging from 0.4 to 1 psi. In some embodiments, the polymer membrane has a bubble point ranging from 0.4 to 0.5 psi.

In some embodiments, the polymer membrane has a bubble point ranging from 1.5 to 56 psi. In some embodiments, the polymer membrane has a bubble point ranging from 1.5 to 60 psi. In some embodiments, the polymer membrane has a bubble point ranging from 3 to 28 psi. In some embodiments, the polymer membrane has a bubble point ranging from 6 to 16 psi.

In some embodiments, the polymer membrane has a bubble point ranging from 1.5 to 28 psi. In some embodiments, the polymer membrane has a bubble point ranging from 1.5 to 14 psi. In some embodiments, the polymer membrane has a bubble point ranging from 1.5 to 7 psi. In some embodiments, the polymer membrane has a bubble point ranging from 1.5 to 3.5 psi.

In some embodiments, the polymer membrane has a bubble point ranging from 3 to 56 psi. In some embodiments, the polymer membrane has a bubble point ranging from 3 to 28 psi. In some embodiments, the polymer membrane has a bubble point ranging from 3 to 14 psi. In some embodiments, the polymer membrane has a bubble point ranging from 3 to 7 psi.

In some embodiments, the polymer membrane can have a homogeneous pore size distribution. A homogenous pore size distribution is where the pore size distribution remains the same as a function of thickness within the membrane. an inhomogeneous pore size distribution is where the pore size distribution changes as a function of thickness within the membrane. In some embodiments, the pore size distribution is homogeneous. In other embodiments, the pore size distribution is inhomogeneous.

In some embodiments, the polymer membrane has a mass per unit area ranging from 0.01 to 7.5 g/m$^2$. In some embodiments, the polymer membrane has a mass per unit area ranging from 0.05 to 5 g/m$^2$. In some embodiments, the polymer membrane has a mass per unit area ranging from 0.1 to 2 g/m$^2$. In some embodiments, the polymer membrane has a mass per unit area ranging from 0.2 to 1 g/m$^2$. In some embodiments, the polymer membrane has a mass per unit area ranging from 0.4 to 1 g/m$^2$.

In some embodiments, the polymer membrane has a mass per unit area ranging from 0.01 to 5 g/m$^2$. In some embodiments, the polymer membrane has a mass per unit area ranging from 0.01 to 2 g/m$^2$. In some embodiments, the polymer membrane has a mass per unit area ranging from 0.01 to 1 g/m$^2$. In some embodiments, the polymer membrane has a mass per unit area ranging from 0.01 to 0.5 g/m$^2$. In some embodiments, the polymer membrane has a mass per unit area ranging from 0.01 to 0.4 g/m$^2$. In some embodiments, the polymer membrane has a mass per unit area ranging from 0.01 to 0.2 g/m$^2$. In some embodiments, the polymer membrane has a mass per unit area ranging from 0.01 to 0.05 g/m$^2$.

In some embodiments, the polymer membrane has a mass per unit area ranging from 0.05 to 7.5 g/m$^2$. In some embodiments, the polymer membrane has a mass per unit area ranging from 0.1 to 7.5 g/m$^2$. In some embodiments, the polymer membrane has a mass per unit area ranging from 0.2 to 7.5 g/m$^2$. In some embodiments, the polymer membrane has a mass per unit area ranging from 0.4 to 7.5 g/m$^2$. In some embodiments, the polymer membrane has a mass per unit area ranging from 0.5 to 7.5 g/m$^2$. In some embodiments, the polymer membrane has a mass per unit area ranging from 1 to 7.5 g/m$^2$. In some embodiments, the polymer membrane has a mass per unit area ranging from 2 to 7.5 g/m$^2$. In some embodiments, the polymer membrane has a mass per unit area ranging from 5 to 7.5 g/m$^2$.

In some embodiments, the polymer membrane exhibits a Water Entry Pressure ("WEP") of 0.5 to 450 psi. In some embodiments, the polymer membrane exhibits a WEP of 0.5 psi to 200 psi. In some embodiments, the polymer membrane exhibits a WEP of 1 psi to 150 psi. In some embodiments, the polymer membrane exhibits a WEP of 1.0 psi to 100 psi. In some embodiments, the polymer membrane exhibits a WEP of 1 psi to 50 psi. In some embodiments, the polymer membrane exhibits a WEP of 25 psi to 150.0 psi. In some embodiments, the polymer membrane exhibits a WEP of 50.0 psi to 150.0 psi. In some embodiments, the polymer membrane exhibits a WEP of 1.0 psi to 110.8 psi.

In some embodiments, the polymer membrane exhibits a Water Entry Pressure ("WEP") of 1.4 to 432 psi. In some embodiments, the polymer membrane exhibits a Water Entry Pressure ("WEP") of 0.95 to 432 psi. In some embodiments, the polymer membrane exhibits a Water Entry Pressure ("WEP") of 0.95 to 111 psi.

In some embodiments, at least a portion of the at least one support layer comprises a portion that is in contact with the polymer membrane. "Contact" includes but does not limit to direct physical contact and bond through adhesive, lamination and static. Contact is measured using the procedure defined herein in the Test Procedures section.

The % contact between the polymer membrane and support layer can be determined using the method described in the Test Procedures section. In some embodiments, 0.1% to 99.6% of the at least one support layer is in contact with the polymer membrane. In some embodiments, 1% to 50% of the at least one support layer is in contact with the polymer membrane. In some embodiments, 2% to 25% of the at least one support layer is in contact with the polymer membrane. In some embodiments, 4% to 12% of the at least one support layer is in contact with the polymer membrane.

In some embodiments, 0.5% to 80% of the at least one support layer is in contact with the polymer membrane. In some embodiments, 1% to 40% of the at least one support layer is in contact with the polymer membrane. In some embodiments, 2% to 20% of the at least one support layer is in contact with the polymer membrane. In some embodiments, 5% to 10% of the at least one support layer is in contact with the polymer membrane.

In some embodiments, 12% to 91% of the at least one support layer is in contact with the polymer membrane. In some embodiments, 24% to 76% of the at least one support layer is in contact with the polymer membrane. In some embodiments, 36% to 48% of the at least one support layer is in contact with the polymer membrane.

The "% open area" is the portion of the at least one support layer that does not contact the polymer membrane. In some embodiments, the % open area of the at least one support layer ranges from 5% to 98%. In some embodiments, the % open area of the at least one support layer ranges from 10% to 49%. In some embodiments, the % open area of the at least one support layer ranges from 20% to 24%. In some embodiments, the % open area of the at least one support layer ranges from 12% to 40%. In some embodiments, the % open area of the at least one support layer ranges from 24% to 80%.

In some embodiments, the largest dimension of a single opening of the plurality of openings of the at least one support layer ranges from 1 to 500 microns. In some embodiments, the largest dimension of a single opening of the plurality of openings of the at least one support layer ranges from 5 to 500 microns. In some embodiments, the largest dimension of a single opening of the plurality of openings of the at least one support layer ranges from 2 to 250 microns. In some embodiments, the largest dimension of a single opening of the plurality of openings of the at least one support layer ranges from 4 to 125 microns. In some embodiments, the largest dimension of a single opening of the plurality of openings of the at least one support layer ranges from 8 to 75 microns. In some embodiments, the largest dimension of a single opening of the plurality of openings of the at least one support layer ranges from 16 to 50 microns. In some embodiments, the largest dimension of a single opening of the plurality of openings of the at least one support layer ranges from 25 to 32 microns.

In some embodiments, the largest dimension of a single opening of the plurality of openings of the at least one support layer ranges from 10 to 350 microns. In some embodiments, the largest dimension of a single opening of the plurality of openings of the at least one support layer ranges from 20 to 180 microns. In some embodiments, the largest dimension of a single opening of the plurality of openings of the at least one support layer ranges from 40 to 90 microns.

In some embodiments, the largest dimension of a single opening of the plurality of openings of the at least one support layer ranges from 20 to 40 microns. In some embodiments, the largest dimension of a single opening of the plurality of openings of the at least one support layer ranges from 20 to 80 microns. In some embodiments, the largest dimension of a single opening of the plurality of openings of the at least one support layer ranges from 20 to 90 microns. In some embodiments, the largest dimension of a single opening of the plurality of openings of the at least one support layer ranges from 20 to 180 microns.

In some embodiments, the largest dimension of a single opening of the plurality of openings of the at least one support layer ranges from 40 to 350 microns. In some embodiments, the largest dimension of a single opening of the plurality of openings of the at least one support layer ranges from 80 to 350 microns. In some embodiments, the largest dimension of a single opening of the plurality of openings of the at least one support layer ranges from 90 to 350 microns. In some embodiments, the largest dimension of a single opening of the plurality of openings of the at least one support layer ranges from 180 to 350 microns.

In some embodiments, the at least one support layer has a thickness of 1 to 1000 microns. In some embodiments, the at least one support layer has a thickness of 2 to 500 microns. In some embodiments, the at least one support layer has a thickness of 4 to 250 microns. In some embodiments, the at least one support layer has a thickness of 8 to 125 microns. In some embodiments, the at least one support layer has a thickness of 16 to 75 microns. In some embodiments, the at least one support layer has a thickness of 32 to 50 microns.

In some embodiments, the at least one support layer has a thickness of 10 to 1000 microns. In some embodiments, the at least one support layer has a thickness of 30 to 600 microns. In some embodiments, the at least one support layer has a thickness of 60 to 300 microns. In some embodiments, the at least one support layer has a thickness of 80 to 200 microns. In some embodiments, the at least one support layer has a thickness of 90 to 100 microns.

In some embodiments, the at least one support layer has a thickness of 40 to 200 microns. In some embodiments, the at least one support layer has a thickness of 40 to 300 microns. In some embodiments, the at least one support layer has a thickness of 40 to 100 microns. In some embodiments, the at least one support layer has a thickness of 40 to 90 microns. In some embodiments, the at least one support layer has a thickness of 40 to 80 microns. In some embodiments, the at least one support layer has a thickness of 40 to 60 microns.

In some embodiments, the at least one support layer has a thickness of 40 to 410 microns. In some embodiments, the at least one support layer has a thickness of 60 to 410 microns. In some embodiments, the at least one support layer has a thickness of 80 to 410 microns. In some embodiments, the at least one support layer has a thickness of 90 to 410 microns. In some embodiments, the at least one support layer has a thickness of 100 to 410 microns. In some embodiments, the at least one support layer has a thickness of 200 to 410 microns. In some embodiments, the at least one support layer has a thickness of 300 to 410 microns. In some embodiments, the at least one support layer has a thickness of 20 to 750 microns.

In some embodiments, the at least one support layer has an air flow resistance ranging from 10 to 5000 Rayls. In some embodiments, the at least one support layer has an air flow resistance ranging from 20 to 4000 Rayls. In some embodiments, the at least one support layer has an air flow resistance ranging from 20 to 3000 Rayls. In some embodiments, the at least one support layer has an air flow resistance ranging from 40 to 3000 Rayls. In some embodiments, the at least one support layer has an air flow resistance ranging from 80 to 2500 Rayls. In some embodiments, the at least one support layer has an air flow resistance ranging from 160 to 2000 Rayls. In some embodiments, the at least one support layer has an air flow resistance ranging from 300 to 1800 Rayls. In some embodiments, the at least one support layer has an air flow resistance ranging from 600 to 1600 Rayls. In some embodiments, the at least one support layer has an air flow resistance ranging from 800 to 1200 Rayls. In some embodiments, the at least one support layer has an air flow resistance ranging from 900 to 1000 Rayls.

In some embodiments, the at least one support layer has an air flow resistance ranging from 10 to 1500 Rayls. In some embodiments, the at least one support layer has an air flow resistance ranging from 20 to 750 Rayls. In some embodiments, the at least one support layer has an air flow resistance ranging from 40 to 400 Rayls. In some embodiments, the at least one support layer has an air flow resistance ranging from 80 to 200 Rayls. In some embodiments, the at least one support layer has an air flow resistance ranging from 90 to 100 Rayls.

In some embodiments, the at least one support layer has an air flow resistance ranging from 40 to 1500 Rayls. In some embodiments, the at least one support layer has an air flow resistance ranging from 43 to 1458 Rayls. In some embodiments, the at least one support layer has an air flow resistance ranging from 80 to 750 Rayls. In some embodiments, the at least one support layer has an air flow resistance ranging from 160 to 500 Rayls. In some embodiments, the at least one support layer has an air flow resistance ranging from 250 to 320 Rayls.

In some embodiments, the at least one support layer has an air flow resistance ranging from 40 to 750 Rayls. In some embodiments, the at least one support layer has an air flow resistance ranging from 40 to 500 Rayls. In some embodiments, the at least one support layer has an air flow resistance ranging from 40 to 320 Rayls. In some embodiments, the at least one support layer has an air flow resistance ranging from 40 to 250 Rayls. In some embodiments, the at least one support layer has an air flow resistance ranging from 40 to 160 Rayls. In some embodiments, the at least one support layer has an air flow resistance ranging from 40 to 80 Rayls.

In some embodiments, the at least one support layer has an air flow resistance ranging from 80 to 1500 Rayls. In some embodiments, the at least one support layer has an air flow resistance ranging from 160 to 1500 Rayls. In some embodiments, the at least one support layer has an air flow resistance ranging from 250 to 1500 Rayls. In some embodiments, the at least one support layer has an air flow resistance ranging from 320 to 1500 Rayls. In some embodiments, the at least one support layer has an air flow resistance ranging from 750 to 1500 Rayls.

As used herein, "effective stiffness" is defined as the ratio between an applied force and the displacement that results from the applied force. Effective stiffness is measured herein using the Vibration Displacement Test ("VDT").

In some embodiments, the at least one support layer has an effective stiffness of 0.01 Pa/nm to 15 Pa/nm. In some embodiments, the at least one support layer has an effective stiffness of 0.5 Pa/nm to 5 Pa/nm when measured using the VDT. In some embodiments, the at least one support layer has an effective stiffness of 1 Pa/nm to 2 Pa/nm when measured using the VDT.

In some embodiments, the at least one support layer has an effective stiffness of 0.05 Pa/nm to 0.1 Pa/nm when measured using the VDT. In some embodiments, the at least one support layer has an effective stiffness of 0.05 Pa/nm to 0.5 Pa/nm when measured using the VDT. In some embodiments, the at least one support layer has an effective stiffness of 0.05 Pa/nm to 1 Pa/nm when measured using the VDT. In some embodiments, the at least one support layer has an effective stiffness of 0.05 Pa/nm to 2 Pa/nm when measured using the VDT. In some embodiments, the at least one support layer has an effective stiffness of 0.05 Pa/nm to 5 Pa/nm when measured using the VDT. In some embodiments, the at least one support layer has an effective stiffness of 0.05 Pa/nm to 15 Pa/nm when measured using the VDT. In some embodiments, the at least one support layer has an effective stiffness of 0.05 Pa/nm to 25 Pa/nm when measured using the VDT.

In some embodiments, the at least one support layer has an effective stiffness of 0.1 Pa/nm to 25 Pa/nm when measured using the VDT. In some embodiments, the at least one support layer has an effective stiffness of 0.5 Pa/nm to 25 Pa/nm when measured using the VDT. In some embodiments, the at least one support layer has an effective stiffness of 1 Pa/nm to 25 Pa/nm when measured using the VDT. In some embodiments, the at least one support layer has an effective stiffness of 2 Pa/nm to 25 Pa/nm when measured using the VDT. In some embodiments, the at least one support layer has an effective stiffness of 5 Pa/nm to 25 Pa/nm when measured using the VDT. In some embodiments, the at least one support layer has an effective stiffness of 15 Pa/nm to 25 Pa/nm when measured using the VDT.

In some embodiments, the at least one support layer comprises at least one metal. In some embodiments, the at least one support layer comprises at least one polymer. In some embodiments, the at least one support layer comprises fiberglass. In some embodiments, the at least one support layer comprises at least one or more metals, one or more polymers, or fiberglass. In some embodiments, there is a single support layer. In some embodiments there are at least two support layers. In some embodiments each support layer is the same material. In some embodiments each support layer is a different material. In some embodiments, the first support layer type is a first metal and the second support layer type is a second metal. In some embodiments, the first support layer type is a metal and the second support layer type is a polymer or fiberglass. In some embodiments the first support layer type is a first polymer and the second support layer type is a second polymer. In some embodiments, the first support layer and the second support layers are both fiberglass.

In some embodiments the at least one metal comprises one or more of zinc, nickel, chromium, vanadium, molybdenum, manganese, copper, iron, aluminum, titanium, combinations and alloys thereof. In some embodiments, the metal comprises an alloy such as carbon steel, stainless steel, bronze, brass, combinations thereof, or composite alloys thereof.

In some embodiments, the at least one polymer of the support layer is in the form of a woven or nonwoven material. In some embodiments, the at least one polymer of the support layer comprises one or more of: extruded plastic, polyethylene terephthalate (PET), polyphenylene sulfide (PPS), polybutylene terephthalate (PBT), polyether ether ketone (PEEK); polypthalamides (PPA), acetal homopolymers; polyethylene terephthalate (PET), one or more thermoset epoxies, or one or more thermoset elastomers. In some embodiments, the support layer might include multiple components with different melting temperature.

In some embodiments, the at least one support layer is adhered to the polymer membrane by one or more adhesives. In some embodiments, the adhesive comprises one or more high melt thermoplastics. In one embodiment, the high melt thermoplastic material may include poly(ethylene-co-tetra-fluoroethylene-co-hexafluoropropylene) (EFEP), tetrafluoroethylene hexafluoropropylene vinylidene fluoride (THV), poly(tetrafluoroethylene-co-hexafluoro-propylene) (FEP), perfluoroalkoxy (PFA), Ethylene tetrafluoroethylene (ETFE), PVC resins, nitrile rubber, or combinations thereof.

In some embodiments, the polymer membrane is laminated to the at least one support layer. In some embodiments the lamination is laser lamination. In some embodiments the lamination is thermal lamination. In some embodiments, the polymer membrane is sandwiched between one surface of a first support layer and one surface of a second support layer.

In some embodiments, the assembly has an effective stiffness of 0.0002 Pa/nm to 3000 Pa/nm when measured using the VDT. In some embodiments, the assembly has an effective stiffness of 0.0002 Pa/nm to 1000 Pa/nm when measured using the VDT. In some embodiments, the assembly has an effective stiffness of 0.0002 Pa/nm to 100 Pa/nm when measured using the VDT. In some embodiments, the assembly has an effective stiffness of 0.198 Pa/nm to 29.8 Pa/nm when measured using the VDT. In some embodiments, the assembly has an effective stiffness of 0.001 Pa/nm to 500 Pa/nm when measured using the VDT. In some embodiments, the assembly has an effective stiffness of 0.01 Pa/nm to 250 Pa/nm when measured using the VDT. In some embodiments, the assembly has an effective stiffness of 0.05 Pa/nm to 100 Pa/nm when measured using the VDT. In some embodiments, the assembly has an effective stiffness of 0.1 Pa/nm to 50 Pa/nm when measured using the VDT. In some embodiments, the assembly has an effective stiffness of 1 Pa/nm to 25 Pa/nm when measured using the VDT. In some embodiments, the assembly has an effective stiffness of 5 Pa/nm to 10 Pa/nm when measured using the VDT. In some embodiments, the assembly has an effective stiffness of 0.0002 Pa/nm to 100 Pa/nm when measured using the VDT. In some embodiments, the assembly has an effective stiffness of 0.0006 Pa/nm to 29.8 Pa/nm when measured using the VDT.

In some embodiments, the assembly has an effective stiffness of 0.0005 Pa/nm to 30 Pa/nm when measured using the VDT. In some embodiments, the assembly has an effective stiffness of 0.005 Pa/nm to 25 Pa/nm when measured using the VDT. In some embodiments, the assembly has an effective stiffness of 0.05 Pa/nm to 20 Pa/nm when measured using the VDT. In some embodiments, the assembly has an effective stiffness of 0.1 Pa/nm to 15 Pa/nm when measured using the VDT. In some embodiments, the assembly has an effective stiffness of 1 Pa/nm to 10 Pa/nm when measured using the VDT.

In some embodiments, the assembly has an effective stiffness of 0.15 Pa/nm to 32 Pa/nm when measured using the VDT. In some embodiments, the assembly has an effective stiffness of 0.3 Pa/nm to 16 Pa/nm. In some embodiments, the assembly has an effective stiffness of 0.6 Pa/nm to 8 Pa/nm when measured using the VDT. In some embodiments, the assembly has an effective stiffness of 1 Pa/nm to 4 Pa/nm when measured using the VDT. In some embodiments, the assembly has an effective stiffness of 2 Pa/nm to 3 Pa/nm when measured using the VDT.

In some embodiments, the assembly has an effective stiffness of 0.15 Pa/nm to 16 Pa/nm when measured using the VDT. In some embodiments, the assembly has an effective stiffness of 0.15 Pa/nm to 8 Pa/nm when measured using the VDT. In some embodiments, the assembly has an effective stiffness of 0.15 Pa/nm to 4 Pa/nm when measured using the VDT. In some embodiments, the assembly has an effective stiffness of 0.15 Pa/nm to 3 Pa/nm when measured using the VDT. In some embodiments, the assembly has an effective stiffness of 0.15 Pa/nm to 2 Pa/nm when measured using the VDT. In some embodiments, the assembly has an effective stiffness of 0.15 Pa/nm to 1 Pa/nm when measured using the VDT. In some embodiments, the assembly has an effective stiffness of 0.15 Pa/nm to 0.6 Pa/nm. when measured using the VDT. In some embodiments, the assembly has an effective stiffness of 0.15 Pa/nm to 0.3 Pa/nm when measured using the VDT.

In some embodiments, the assembly has an air flow resistance ranging from 100 to 800,000 Rayls. In some embodiments, the assembly has an air flow resistance ranging from 200 to 400,000 Rayls. In some embodiments, the assembly has an air flow resistance ranging from 400 to 200,000 Rayls. In some embodiments, the assembly has an air flow resistance ranging from 800 to 100,000 Rayls. In some embodiments, the assembly has an air flow resistance ranging from 1600 to 50,000 Rayls. In some embodiments, the assembly has an air flow resistance ranging from 3200 to 25,000 Rayls. In some embodiments, the assembly has an air flow resistance ranging from 6400 to 10,000 Rayls. In some embodiments, the assembly has an air flow resistance ranging from 8000 to 9000 Rayls.

In some embodiments, the assembly has an air flow resistance ranging from 100 to 50,000 Rayls. In some embodiments, the assembly has an air flow resistance ranging from 200 to 20,000 Rayls. In some embodiments, the assembly has an air flow resistance ranging from 400 to 10,000 Rayls. In some embodiments, the assembly has an air flow resistance ranging from 800 to 5000 Rayls. In some embodiments, the assembly has an air flow resistance ranging from 1600 to 2500 Rayls.

In some embodiments, the assembly has an air flow resistance ranging from 100 to 20,000 Rayls. In some embodiments, the assembly has an air flow resistance ranging from 100 to 10,000 Rayls. In some embodiments, the assembly has an air flow resistance ranging from 100 to 5000 Rayls. In some embodiments, the assembly has an air flow resistance ranging from 100 to 2500 Rayls. In some embodiments, the assembly has an air flow resistance ranging from 100 to 1600 Rayls. In some embodiments, the assembly has an air flow resistance ranging from 100 to 800 Rayls. In some embodiments, the assembly has an air flow resistance ranging from 100 to 400 Rayls. In some embodiments, the assembly has an air flow resistance ranging from 100 to 200 Rayls.

In some embodiments, the assembly has an air flow resistance ranging from 10,000 to 800,000 Rayls. In some embodiments, the assembly has an air flow resistance ranging from 20,000 to 400,000 Rayls. In some embodiments, the assembly has an air flow resistance ranging from 40,000 to 200,000 Rayls. In some embodiments, the assembly has an air flow resistance ranging from 80,000 to 100,000 Rayls.

In some embodiments, the assembly has an air flow resistance ranging from 50,000 to 800,000 Rayls. In some embodiments, the assembly has an air flow resistance ranging from 100,000 to 800,000 Rayls. In some embodiments, the assembly has an air flow resistance ranging from 200,000 to 800,000 Rayls. In some embodiments, the assembly has an air flow resistance ranging from 400,000 to 800,000 Rayls.

In some embodiments, the predominantly resistive acoustic behavior is a result of the effective stiffness (as described herein) of the at least one support layer of the assembly. The phase angle of the acoustic impedance of the assembly is measured herein by the Impedance Tube Transfer Matrix Test ("ITTMT") that is described in Test Procedures section.

As used herein, the term "predominantly resistive" means that the assembly is configured to provide a phase angle of +45 degrees to −45 degrees over a frequency range of 50 to 20,000 Hz as measured by the ITTMT. In some embodiments, the assembly is configured to provide a phase angle of +30 degrees to −30 degrees over a frequency range of 500 to 20,000 Hz as measured by the ITTMT. In some embodiments, the assembly is configured to provide a phase angle of +15 degrees to −15 degrees over a frequency range of 50 to 20,000 Hz as measured by the ITTMT. In some embodiments, the assembly is configured to provide a phase angle of +5 degrees to −5 degrees over a frequency range of 500 to 20,000 Hz as measured by the ITTMT. In some embodiments, the assembly is configured to provide a phase angle of +1 degree to −1 degree over a frequency range of 50 to 20,000 Hz as measured by the ITTMT.

In some embodiments, the assembly is configured to provide a phase angle of +45 degrees to −45 degrees over a frequency range of 100 to 20,000 Hz as measured by the ITTMT. In some embodiments, the assembly is configured to provide a phase angle of +45 degrees to −45 degrees over a frequency range of 200 to 20,000 Hz as measured by the ITTMT. In some embodiments, the assembly is configured to provide a phase angle of +45 degrees to −45 degrees over a frequency range of 300 to 20,000 Hz as measured by the ITTMT. In some embodiments, the assembly is configured to provide a phase angle of +45 degrees to −45 degrees over a frequency range of 400 to 20,000 Hz as measured by the ITTMT. In some embodiments, the assembly is configured to provide a phase angle of +45 degrees to −45 degrees over a frequency range of 500 to 20,000 Hz as measured by the ITTMT.

In some embodiments, the assembly is configured to provide a phase angle of +45 degrees to −45 degrees over a frequency range of 1000 to 10,000 Hz as measured by the ITTMT. In some embodiments, the assembly is configured to provide a phase angle of +45 degrees to −45 degrees over a frequency range of 2000 to 8000 Hz as measured by the ITTMT. In some embodiments, the assembly is configured to provide a phase angle of +45 degrees to −45 degrees over a frequency range of 4000 to 5000 Hz as measured by the ITTMT In some embodiments, the assembly is configured to provide a phase angle of +45 degrees to −45 degrees over a frequency range of 500 to 10,000 Hz as measured by the ITTMT. In some embodiments, the assembly is configured to provide a phase angle of +45 degrees to −45 degrees over a frequency range of 500 to 8000 Hz as measured by the ITTMT. In some embodiments, the assembly is configured to provide a phase angle of +45 degrees to −45 degrees over a frequency range of 500 to 4000 Hz as measured by the ITTMT. In some embodiments, the assembly is configured to provide a phase angle of +45 degrees to −45 degrees over a frequency range of 500 to 4000 H as measured by the ITTMT. In some embodiments, the assembly is configured to provide a phase angle of +45 degrees to −45 degrees over a frequency range of 500 to 2000 Hz. In some embodiments, the assembly is configured to provide a phase angle of +45 degrees to −45 degrees over a frequency range of 500 to 1000 Hz as measured by the ITTMT.

In some embodiments, the assembly is configured to provide a phase angle of +45 degrees to −45 degrees over a frequency range of 1000 to 20,000 Hz as measured by the ITTMT. In some embodiments, the assembly is configured to provide a phase angle of +45 degrees to −45 degrees over a frequency range of 2000 to 20,000 Hz as measured by the ITTMT. In some embodiments, the assembly is configured to provide a phase angle of +45 degrees to −45 degrees over a frequency range of 4000 to 20,000 Hz as measured by the ITTMT. In some embodiments, the assembly is configured to provide a phase angle of +45 degrees to −45 degrees over a frequency range of 8000 to 20,000 Hz as measured by the ITTMT. In some embodiments, the assembly is configured to provide a phase angle of +45 degrees to −45 degrees over a frequency range of 10,000 to 20,000 Hz as measured by the ITTMT.

In some embodiments, the assembly is configured to provide a certain water entry pressure ("WEP") as measured in accordance with the Capillary Piston Test ("CPT"). The CPT is described herein in the section titled "Test Procedures." In some embodiments, the WEP described herein is a result of the effective stiffness (as described herein) of the at least one support layer or the assembly.

In some embodiments, the assembly is configured to provide a water entry pressure ranging from 1 psi to 450 psi when measured in accordance with the CPT. In some embodiments, the assembly is configured to provide a water entry pressure ranging from 2 psi to 200 psi when measured in accordance with the CPT. In some embodiments, the assembly is configured to provide a water entry pressure ranging from 5 psi to 100 psi when measured in accordance with the CPT. In some embodiments, the assembly is configured to provide a water entry pressure ranging from 10 psi to 50 psi when measured in accordance with the CPT. In some embodiments, the assembly is configured to provide a water entry pressure ranging from 20 psi to 25 psi when measured in accordance with the CPT.

In some embodiments, the assembly is configured to provide a water entry pressure ranging from 10 psi to 350 psi when measured in accordance with the CPT. In some embodiments, the assembly is configured to provide a water entry pressure ranging from 20 psi to 200 psi when measured in accordance with the CPT. In some embodiments, the assembly is configured to provide a water entry pressure ranging from 40 psi to 100 psi when measured in accordance with the CPT. In some embodiments, the assembly is configured to provide a water entry pressure ranging from 50 psi to 80 psi when measured in accordance with the CPT. In some embodiments, the assembly is configured to provide a water entry pressure ranging from 60 psi to 70 psi when measured in accordance with the CPT.

In some embodiments, the assembly is configured to provide a water entry pressure ranging from 10 psi to 200 psi when measured in accordance with the CPT. In some embodiments, the assembly is configured to provide a water entry pressure ranging from 10 psi to 100 psi when measured in accordance with the CPT. In some embodiments, the assembly is configured to provide a water entry pressure ranging from 10 psi to 80 psi when measured in accordance with the CPT. In some embodiments, the assembly is configured to provide a water entry pressure ranging from 10 psi to 70 psi when measured in accordance with the CPT. In some embodiments, the assembly is configured to provide a water entry pressure ranging from 10 psi to 60 psi when measured in accordance with the CPT. In some embodiments, the assembly is configured to provide a water entry pressure ranging from 10 psi to 50 psi when measured in accordance with the CPT. In some embodiments, the assembly is configured to provide a water entry pressure ranging from 10 psi to 40 psi when measured in accordance with the CPT. In some embodiments, the assembly is configured to provide a water entry pressure ranging from 10 psi to 20 psi when measured in accordance with the CPT.

In some embodiments, the assembly is configured to provide a water entry pressure ranging from 20 psi to 350 psi when measured in accordance with the CPT. In some embodiments, the assembly is configured to provide a water entry pressure ranging from 40 psi to 350 psi when measured in accordance with the CPT. In some embodiments, the assembly is configured to provide a water entry pressure ranging from 50 psi to 350 psi when measured in accordance with the CPT. In some embodiments, the assembly is configured to provide a water entry pressure ranging from 60 psi to 350 psi when measured in accordance with the CPT. In some embodiments, the assembly is configured to provide a water entry pressure ranging from 70 psi to 350 psi when measured in accordance with the CPT. In some embodiments, the assembly is configured to provide a water entry pressure ranging from 80 psi to 350 psi when measured in accordance with the CPT. In some embodiments, the assembly is configured to provide a water entry pressure ranging from 100 psi to 350 psi when measured in accordance with the CPT. In some embodiments, the assembly is configured to provide a water entry pressure ranging from 1.4 psi to 432 psi when measured in accordance with the CPT. In some embodiments, the assembly is configured to provide a water entry pressure ranging from 2.5 psi to 336 psi when measured in accordance with the CPT. In some embodiments, the assembly is configured to provide a water entry pressure ranging from 0.95 psi to 142 psi when measured in accordance with the CPT.

In some embodiments, the assembly is configured to provide a water entry pressure ranging from 200 psi to 350 psi when measured in accordance with the CPT.

In some embodiments, the assembly is configured to provide a transmission loss of from 3 dB to 50 dB over the frequency range of 50 to 20,000 Hz as measured by the ITTMT. In some embodiments, the assembly is configured to provide a transmission loss of from 3 dB to 50 dB over the frequency range of 100 to 20,000 Hz as measured by the ITTMT. In some embodiments, the assembly is configured to provide a transmission loss of from 3 dB to 50 dB over the frequency range of 200 to 20,000 Hz as measured by the ITTMT. In some embodiments, the assembly is configured to provide a transmission loss of from 3 dB to 50 dB over the frequency range of 500 to 20,000 Hz as measured by the ITTMT.

In some embodiments, the assembly is configured to provide a transmission loss of from 6 dB to 24 dB over the frequency range of 50 to 20,000 Hz as measured by the ITTMT. In some embodiments, the assembly is configured to provide a transmission loss of from 11 dB to 13 dB over the frequency range of 50 to 20,000 Hz as measured by the ITTMT.

In some embodiments, the assembly is configured to provide a transmission loss of from 3 dB to 6 dB over the frequency range of 50 to 20,000 Hz as measured by the ITTMT. In some embodiments, the assembly is configured to provide a transmission loss of from 3 dB to 11 dB over the frequency range of 50 to 20,000 Hz as measured by the ITTMT. In some embodiments, the assembly is configured to provide a transmission loss of from 3 dB to 13 dB over the frequency range of 50 to 20,000 Hz as measured by the ITTMT. In some embodiments, the assembly is configured to provide a transmission loss of from 3 dB to 24 dB over the frequency range of 50 to 20,000 Hz as measured by the ITTMT.

In some embodiments, the assembly is configured to provide a transmission loss of from 6 dB to 48 dB over the frequency range of 50 to 20,000 Hz as measured by the ITTMT. In some embodiments, the assembly is configured to provide a transmission loss of from 11 dB to 48 dB over the frequency range of 50 to 20,000 Hz as measured by the ITTMT. In some embodiments, the assembly is configured to provide a transmission loss of from 13 dB to 48 dB over the frequency range of 50 to 20,000 Hz as measured by the ITTMT. In some embodiments, the assembly is configured to provide a transmission loss of from 13 dB to 48 dB over the frequency range of 50 to 20,000 Hz as measured by the ITTMT. In some embodiments, the assembly is configured to provide a transmission loss of from 24 dB to 48 dB over the frequency range of 50 to 20,000 Hz as measured by the ITTMT.

In some embodiments, the transmission loss of the assembly is substantially constant as a function of frequency. As used herein, "substantially constant as a function of frequency" means that the transmission loss does not vary by more than 1.5 dB/octave over the frequency range of 50 to 20,000 Hz. The variance of transmission loss as a function of frequency can be determined by plotting transmission loss as a function of frequency. Frequencies on an x-axis of a plot of transmission loss versus frequency can be scaled to octaves using logarithmic scaling. An example of a scaling procedure according to the present disclosure is described herein in the "Test Procedures" section.

In some embodiments, the transmission loss of the assembly is substantially constant as a function of frequency, such that the transmission loss does not vary by more than 1.5 dB/octave over the frequency range of 50 to 20,000 Hz when measured by the Impedance Tube Transfer Matrix Test ("ITTMT"). In some embodiments, the transmission loss of the assembly is substantially constant as a function of frequency, such that the transmission loss does not vary by more than 1.5 dB/octave over the frequency range of 100 to 20,000 Hz when measured by the Impedance Tube Transfer Matrix Test ("ITTMT"). In some embodiments, the transmission loss of the assembly is substantially constant as a function of frequency, such that the transmission loss does not vary by more than 1.5 dB/octave over the frequency range of 300 to 20,000 Hz when measured by the Impedance Tube Transfer Matrix Test ("ITTMT"). In some embodiments, the transmission loss of the assembly is substantially constant as a function of frequency, such that the transmission loss does not vary by more than 1.5 dB/octave over the frequency range of 400 to 20,000 Hz when measured by the Impedance Tube Transfer Matrix Test ("ITTMT"). In some embodiments, the transmission loss of the assembly is substantially constant as a function of frequency, such that the transmission loss does not vary by more than 1.5 dB/octave over the frequency range of 500 to 20,000 Hz when measured by the Impedance Tube Transfer Matrix Test ("ITTMT").

In some embodiments, the transmission loss does not vary by more than 1.25 dB/octave over the frequency range of 50 to 20,000 Hz when measured by the Impedance Tube Transfer Matrix Test ("ITTMT"). In some embodiments, the transmission loss does not vary by more than 1 dB/octave over the frequency range of 50 to 20,000 Hz when measured by the Impedance Tube Transfer Matrix Test ("ITTMT"). In some embodiments, the transmission loss does not vary by more than 0.75 dB/octave over the frequency range of 50 to 20,000 Hz when measured by the Impedance Tube Transfer Matrix Test ("ITTMT"). In some embodiments, the transmission loss does not vary by more than 0.5 dB/octave over the frequency range of 50 to 20,000 Hz when measured by the Impedance Tube Transfer Matrix Test ("ITTMT"). In some embodiments, the transmission loss does not vary by more than 0.25 dB/octave over the frequency range of 50 to 20,000 Hz when measured by the Impedance Tube Transfer Matrix Test ("ITTMT").

In some embodiments, the transmission loss varies by 0.25 dB/octave to 1.5 dB/octave over the frequency range of 50 to 20,000 Hz when measured by the Impedance Tube Transfer Matrix Test ("ITTMT"). In some embodiments, the transmission loss varies by 0.25 dB/octave to 1.25 dB/octave over the frequency range of 50 to 20,000 Hz when measured by the Impedance Tube Transfer Matrix Test ("ITTMT"). In some embodiments, the transmission loss varies by 0.25 dB/octave to 1 dB/octave over the frequency range of 50 to 20,000 Hz when measured by the Impedance Tube Transfer Matrix Test ("ITTMT"). In some embodiments, the transmission loss varies by 0.25 dB/octave to 0.75 dB/octave over the frequency range of 50 to 20,000 Hz when measured by the Impedance Tube Transfer Matrix Test ("ITTMT"). In some embodiments, the transmission loss varies by 0.25 dB/octave to 0.5 dB/octave over the frequency range of 50 to 20,000 Hz when measured by the Impedance Tube Transfer Matrix Test ("ITTMT").

FIG. 1 depicts an exemplary embodiment of the present disclosure. As shown, assembly 100 includes a porous polymer membrane 104 in contact with support layer 102. The support layer 102 includes a plurality of openings 106 and the porous polymer membrane 104 includes a plurality of pores (not shown).

Figure 2:
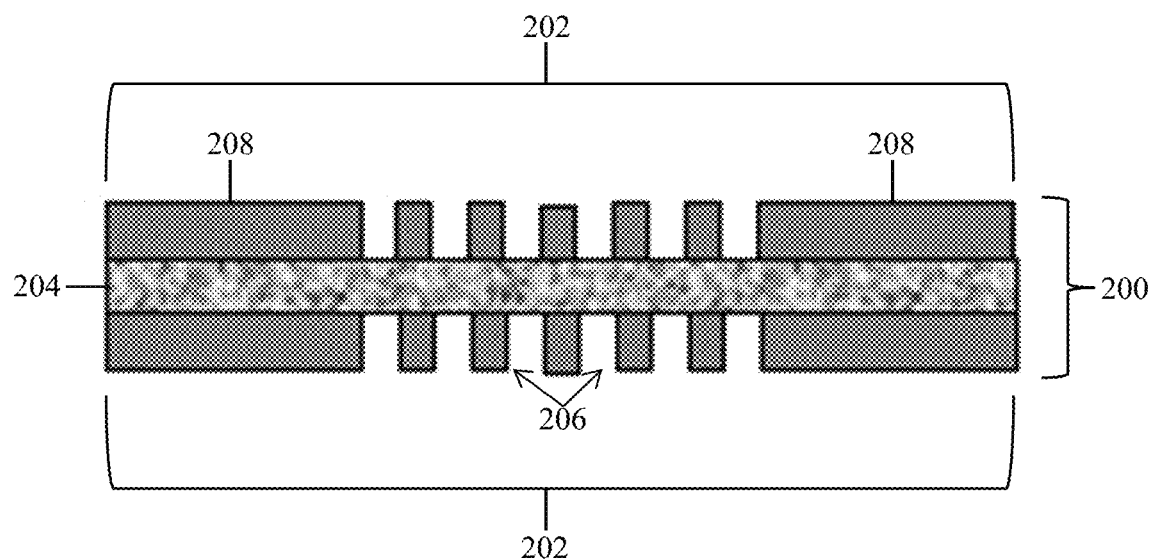
FIG. 2 depicts an additional exemplary assembly in accordance with the present disclosure having two support layers.

FIG. 2 also depicts an exemplary embodiment of the present disclosure. As shown, assembly 200 includes a porous polymer membrane 204 in direct contact with support layers 202. The support layers 202 include a plurality of openings 206 and the porous polymer membrane 204 includes a plurality of pores (not shown). As shown, the porous polymer membrane 204 is sandwiched between the support layers 202. The assembly 200 may contain portions (e.g., portions 208) where the polymer membrane 204 is in contact with the support layers 202. In some embodiments, the plurality of openings 206 are uniform. In some embodiments, the thickness (not shown) of the support layers 202 is uniform. In some embodiments, the plurality of openings 206 are non-uniform. In some embodiments, the thickness (not shown) of the support layers 202 is non-uniform.

Test Procedures

The following test procedures were used to generate the data in the examples section. The test procedures described herein are not intended to be limiting. The assembly, membrane, and support layer numbers described in this section refer to the assembly, membrane, and support layer numbers of the Examples section, infra.

Thickness:

Thicknesses of the polymer membranes were measured herein using a commercially available Keyence LS-7010 M. Some membranes were less than 1 um in thickness and could not be directly measured using the Keyence LS-7010 M. Instead, the membranes were layered to achieve a thickness greater than 1 um, which was the lower detection limit of the measurement system. The total thickness of the layered membranes were then measured using the Keyence LS-7010M. The thickness of a single layer was determined by dividing the total thickness of the layered samples by the number of layers.

Flow Resistance:

Airflow was measured using an ATEQ D520 Airflow Tester. The stack-up of the samples were described for each example. In all configurations, the active area was assumed to be 1.77e-6 m$^{-2}$. The pressure at which each assembly was tested and resultant airflow was described herein in the Examples section. The airflow was measured in units of L/hr. The measured airflow was converted to flow resistance (Pa*s/m) as per the equation below Flow Resistance $$(Pa*s/m) = 4.39 e^4 \frac{x(\text{psi})}{y\left(\frac{L}{hr}\right)}$$

where x (psi) represents the air pressure used during the ATEQ measurement, and y (L/hr) was the volume flow rate measured directly on the ATEQ tester.

Young's Modulus:

Herein, Young's Moduli of the polymer membranes were measured in accordance with ISO 527-1:2012.

Bubble Point:

Herein, bubble point was measured using the ASTM F316. 9599-1 method.

Mass Per Unit Area:

Herein, mass per unit area was measured in accordance with ASTM D3776/D3776M-09a.

Water Entry Pressure Testing (Capillary Piston Test ("CPT")):

Water Entry Pressure ("WEP") was measured using a capillary flow porometer, model number CFP-1500-AE, purchased commercially from Porous Materials Inc. The tested sample was clamped by two polycarbonate plates in the lower piston in the tester. The top plate has a central hole of 8 mm and an O-ring surrounding the hole for waterproofing. The bottom plate has a central hole of 1.5 mm. For certain sample assemblies (e.g., 12, 13, 15, 16, 17, 31, 32, 33, and 34), the samples were prepared as described in each example, and the sample will be clamped by the top and bottom polycarbonate plates. For other sample assemblies, the material, or layers of different materials were cut into pieces large enough to cover the whole O-ring on the top polycarbonate plate and clamped by the top and bottom polycarbonate plates. Before the test, deionized water was added to fill the 8 mm hole in the top plate. The compression pressure was set to be 300 psi in the test program. The ramp rate of the pressure was 0.16 psi per second. The tester automatically and instantaneously detects the pressure (WEP) when water enters into the sample.

Effective Stiffness Measurement:

Effective stiffness, $k_{eff}$ (Pa/nm), was measured using the Vibrational Displacement Test ("VDT"). The VDT includes the following: Samples were acoustically excited at 4 different sound pressures and the vibrational displacement at the center of the sample was measured. The excitation sound pressure was taken as the difference in sound pressure between the two microphones. The resulting data (i.e. the difference between the sound pressures in front of and behind the acoustic membrane assembly vs. displacement) was plotted and a linear regression performed. Effective stiffness was taken as the slope of the line passing through the measured data points and represents the extent to which a supported or unsupported sample assembly resists vibrational deformation in response to an applied acoustic plane wave. The vibrational displacement was measured using an MSA-500 micro system analyzer obtained commercially from Polytec Inc. The acoustic excitation was a sine wave centered at 200 Hz and generated by a JBL model 2426H compression driver. The output from the compression driver was necked down from 25.4 mm to 1.5 mm using an aluminum cone in order to match the diameter of the sample. The sound pressure of the wave was measured directly below and directly above the surface of the sample being tested using two probe microphones (model 377B26 microphones connected to a model 482C Series Sensor Signal Conditioner, obtained commercially from PCB Piezotronics Inc.). Polytec PSV 9.3 software was used to acquire the vibrational displacement data.

Figure 3:
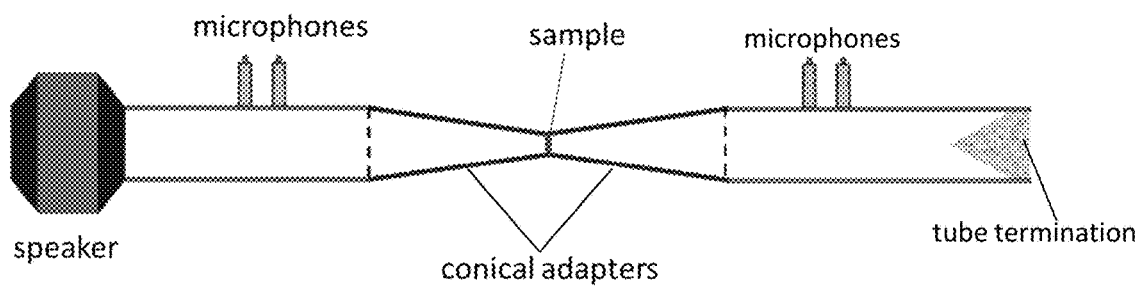
FIG. 3 is a schematic illustration of an exemplary 4-microphone impedance tube used for transmission loss and phase testing, as described in Test Procedures section.

Transmission Loss and Phase Testing:

Transmission loss and phase angle testing were performed by the Impedance Tube Transfer Matrix Test ("ITTMT"), which is a modified version of ASTM-E2611-09—the standard test method for measuring normal incidence sound transmission loss and phase based on the 4 microphone transfer matrix method. All modifications to ASTM-E2611-09 are set forth herein. An exemplary test set-up is shown in FIG. 3. The transfer matrix of the assembly was measured and we use T12 element of the transfer matrix as the acoustic impedance value for all the assemblies described in the examples.

An impedance tube was used to make measurements across a frequency range of 500 Hz to 20,000 Hz. The inner diameter of the tube was 8 mm. The impedance tube was designed in accordance with ASTM E1050-12 and ASTM E2611-09. A JBL 2426H compression driver was mounted at one end of the tube and powered by a Bruel and Kjaer Type 2735 amplifier connected to a 31-band ART 351 graphic equalizer. The measurement system used 4 Bruel and Kjaer Type 4138 microphones connected to a 4 channel Bruel and Kjaer Type 3160-A-042 LAN-XI Frontend with a generator output. Data was acquired and processed using Bruel and Kjaer PULSE Labshop with Type 7758 Acoustic Material Testing Software, version 21.

The sample assemblies that were tested had an inner diameter of 1.5 mm, which was smaller than the inner diameter of the impedance tube. A pair of conical adapters was therefore required in order to mount the sample assemblies. The convergent cone had an inlet diameter of 8 mm and an outlet diameter of 1.5 mm. The divergent cone had an inlet diameter of 1.5 mm and an outlet diameter of 8 mm.

When using conical adapters, additional processing of the data was required to account for the converging geometry of the cones. Theoretical equations were derived to calculate the transfer matrices of the conical adapters and can be found in the literature (Hua, X. and Herrin, D., "Practical Considerations when using the Two-Load Method to Determine the Transmission Loss of Mufflers and Silencers," *SAE Int. J. Passeng. Cars—Mech. Syst.* 6(2):1094-1101, 2013 & Mechel, F. P. (2008). Formulas of Acoustics. New York, N.Y.: Springer).

Transmission Loss Testing Before and after Pressure Testing:

Some sample assemblies were subjected to the following Air Pressure Test procedure. The purpose of this test was to replicate the pressure exerted on a membrane assembly in a device that was submerged in a given depth of water for a given duration of time. A transmission loss spectrum was measured before the pressure test and then remeasured immediately after the pressure test. The change in transmission loss, $\Delta TL$ (dB), due to the pressure test was calculated by subtracting the initial pre-test transmission loss from the post-test transmission loss.

Air Pressure Test:

Pressure testing was performed by placing a sample assembly onto a base plate. A top plate was then added and bolted down to hold the sample assemblies securely in place. The testing conditions (ramp rate, pressure, hold time) were all controlled using a calibrated, programmable pressure box that was built in-house. The pressure box was capable of generating pressures ranging from 1 psi to 145 psi in increments of 0.5 psi. The pressurized line of air was connected to the base plate such that the pressure test occurred at the bottom surface of the membrane. Unless otherwise noted, each sample assembly was oriented such that the membrane was positioned between the base plate of the test fixture and the support layer of the sample assembly. Pressure testing was performed by increasing the pressure from 0 psi to targeted pressure with a 2.5 psi/sec ramp rate. After the targeted pressure was reached, the pressure was held constant for 10-minutes hold. Once the test was complete, the sample assemblies were removed from the fixture and the transmission loss was remeasured.

Transmission Loss Testing with Compression:

Some transmission loss ("TL") measurements were performed as a function of compression force applied to the sample assemblies.

Figure 4:
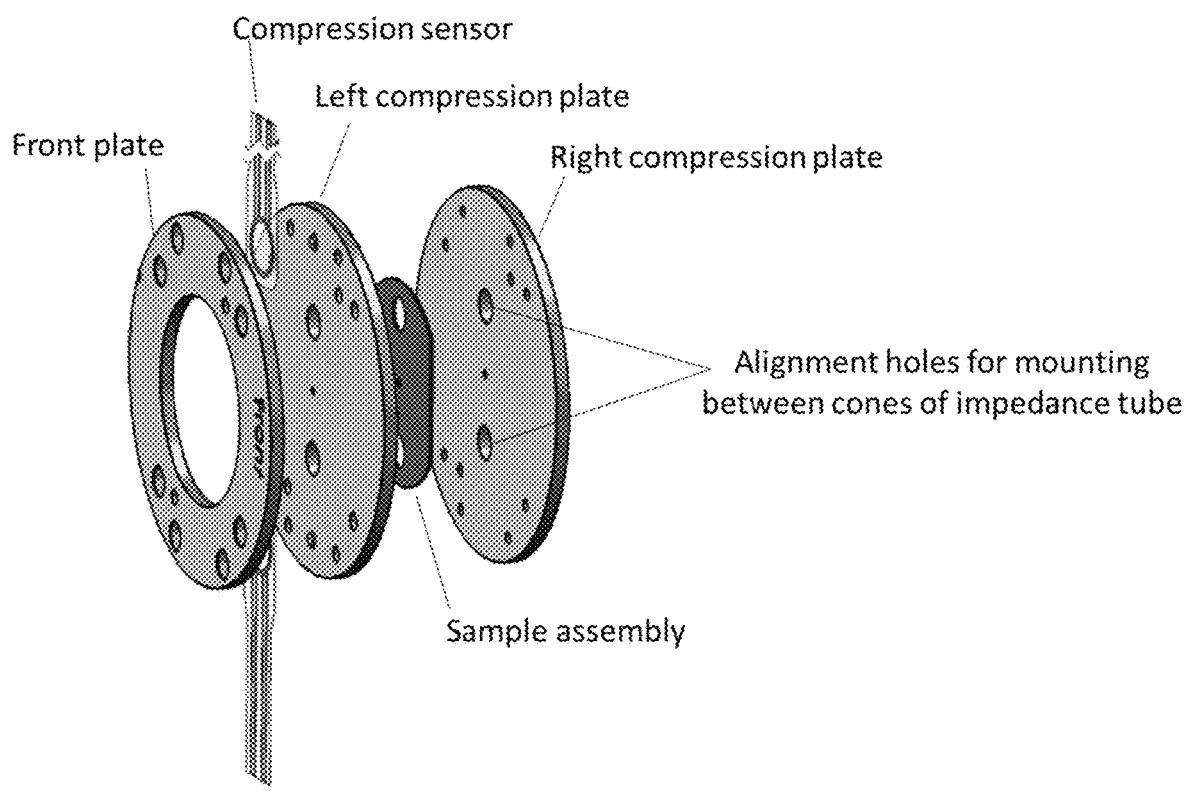
FIG. 4 depicts exemplary plates used for transmission loss testing with compression, as described in Test Procedures section.

Compression testing was performed using an Economical Load and Force (ELF) Measurement System (purchased commercially from Tekscan) with a FlexiForce A201 force sensor calibrated across a 0-111 Newton measurement range. A fixture was designed to apply controlled compression force to samples during transmission loss and phase testing. A schematic drawing of this fixture is shown in FIG. 4. The force sensors were attached to the front plate using 4983 double sided pressure sensitive adhesive (purchased commercially from Tesa Tape Inc.).

Once the sample assemblies to be tested was mounted between the left and right plates of the compression fixture on the impedance tube assembly, the front plate was attached via a set of 4-40 flat head screws. The compression force is increased or decreased by tightening or loosening these flat head screws, respectively. Once a target compression force was reached, a transmission loss measurement was performed. After the measurement the screws were loosened to return the compression force to 0 Newtons and the process was repeated at progressively higher compression levels.

Procedure for Calculating % Contact:

For support layers 1-6, 13, and 14, because of the periodicity or randomness of the support structure, the contact percentage can be determined from a representative area smaller than the total active area. A topography scan of a portion of support can be performed using an optical profilometer (Polytec TopMap µLab), from the membrane-contacting side. The scanned topography in the depth range of 20 um from the top was projected to a plane parallel to the support. The projected area will be larger than or equal to the area of physical contact between the membrane and support. The ratio between the projected area and the area of fieldof-view of the topography scan was calculated using software ImageJ and can be considered as upper bound of contact percentage.

For support layer 7-12, within the active area, the area of physical contact between the membrane and support will be smaller than or equal to the total active area minus the area of perforations. The upper bound of contact percentage can be calculated as $$\% \text{ contract area} = \frac{\text{Total area} - \text{Area of Perforations}}{\text{Total Area}} * 100 = \frac{D^2 - nd^2}{D^2} * 100$$

where n is the number of perforations, d is the diameter of each perforation and D is the diameter of the active area, which is 1.5 mm for all sample assemblies. The diameter of each perforation was measured using an optical microscope (model VHX-5000, purchased commercially from Keyence Corporation).

Figure 5:
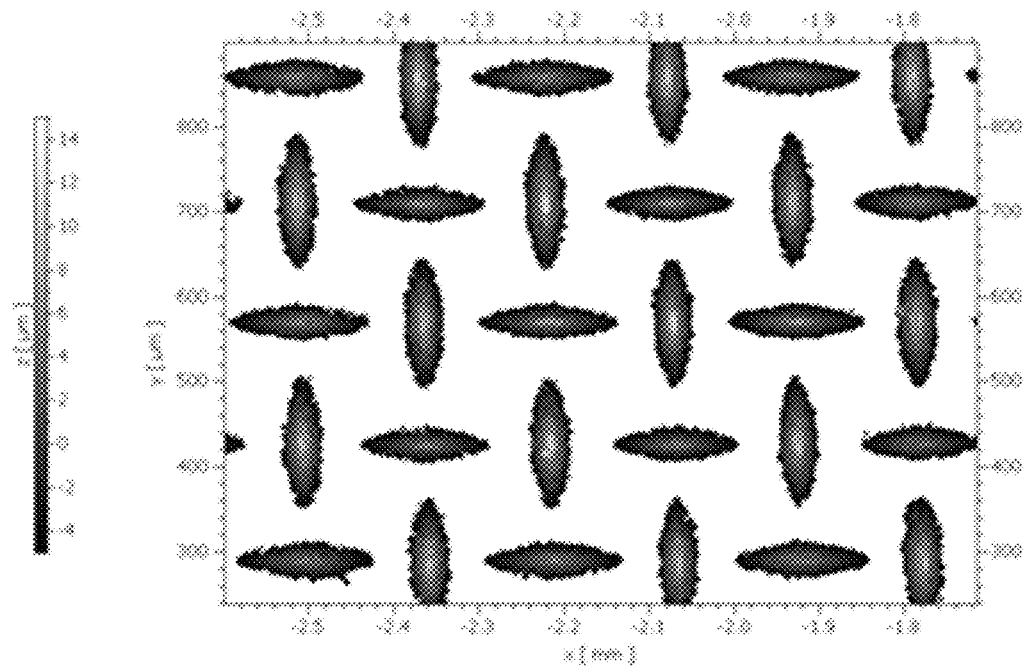
FIGS. 5 and 6 depict micrographs used to measure the % contact of exemplary assemblies.

FIG. 5 depicts a micrograph showing the top-most 20 um of support layer 1. The dark regions in the image correspond to the fibers of the woven mesh and represent the areas of the support layer that come into contact with the membrane. The white regions in the image correspond to open area.

Figure 6:
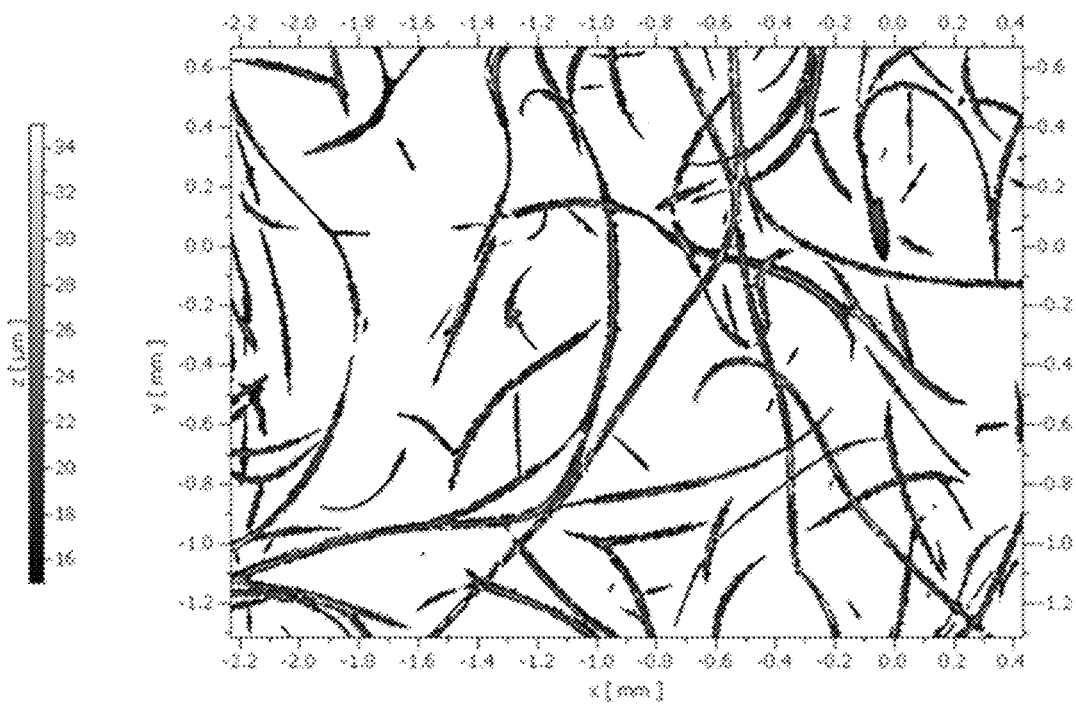
Figure 7:
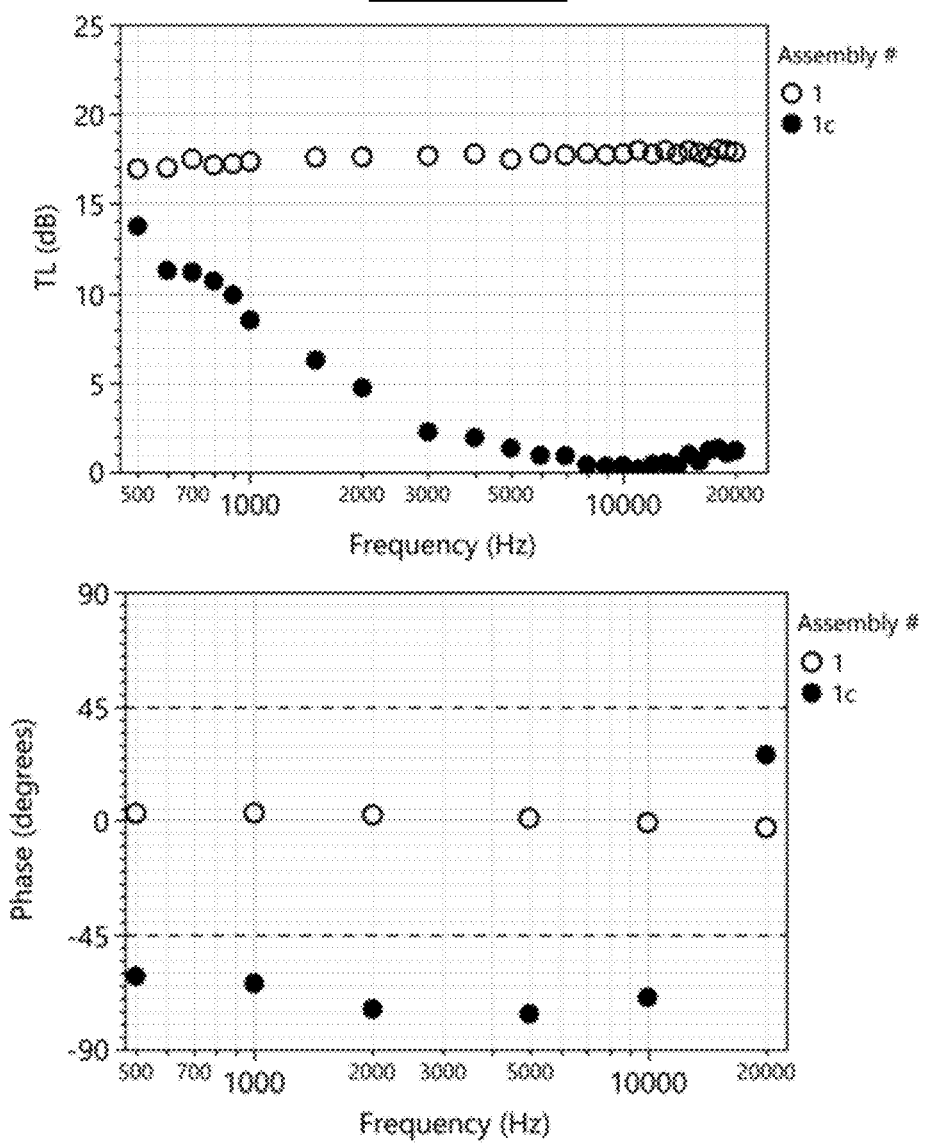
Figure 10:
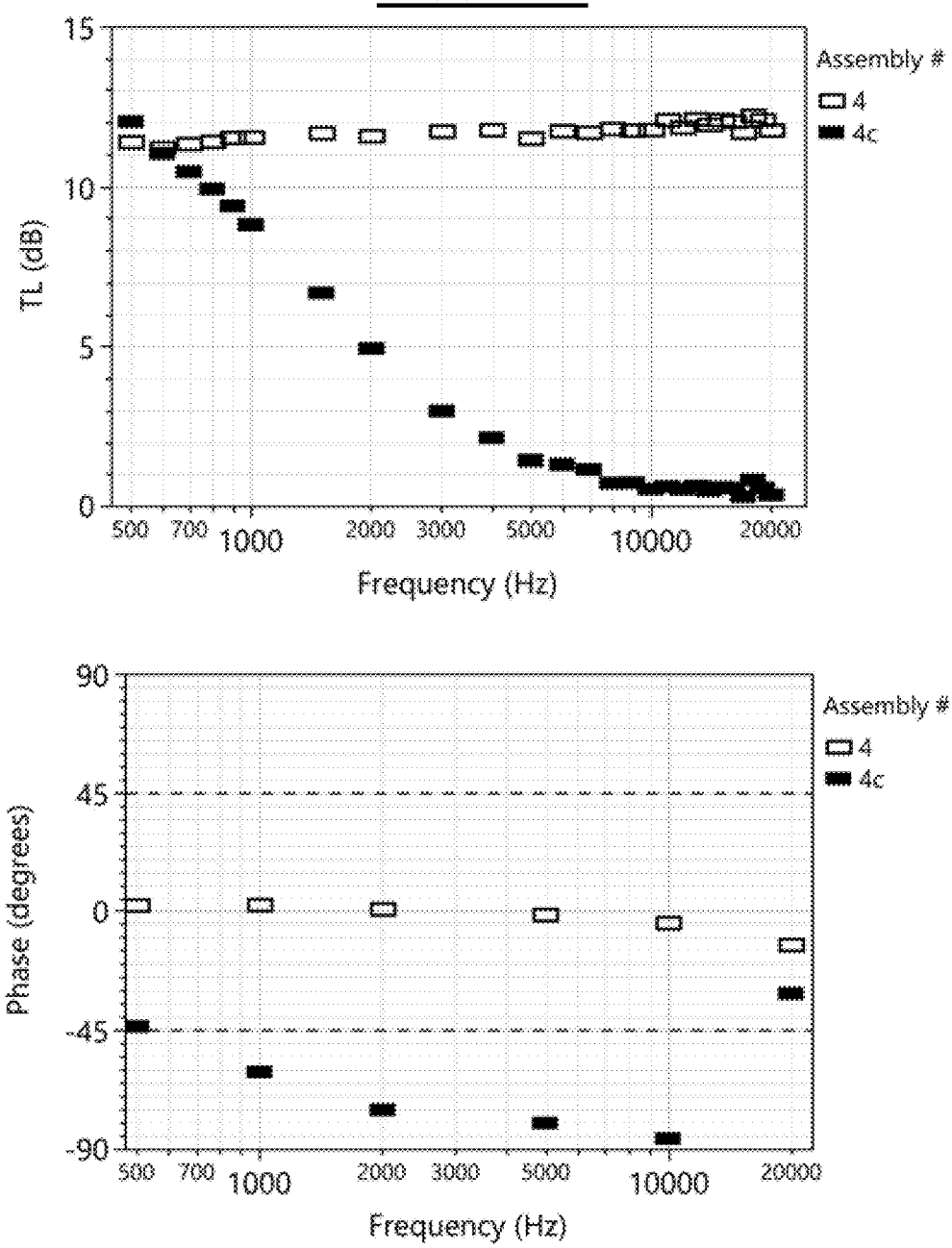
Figure 19:
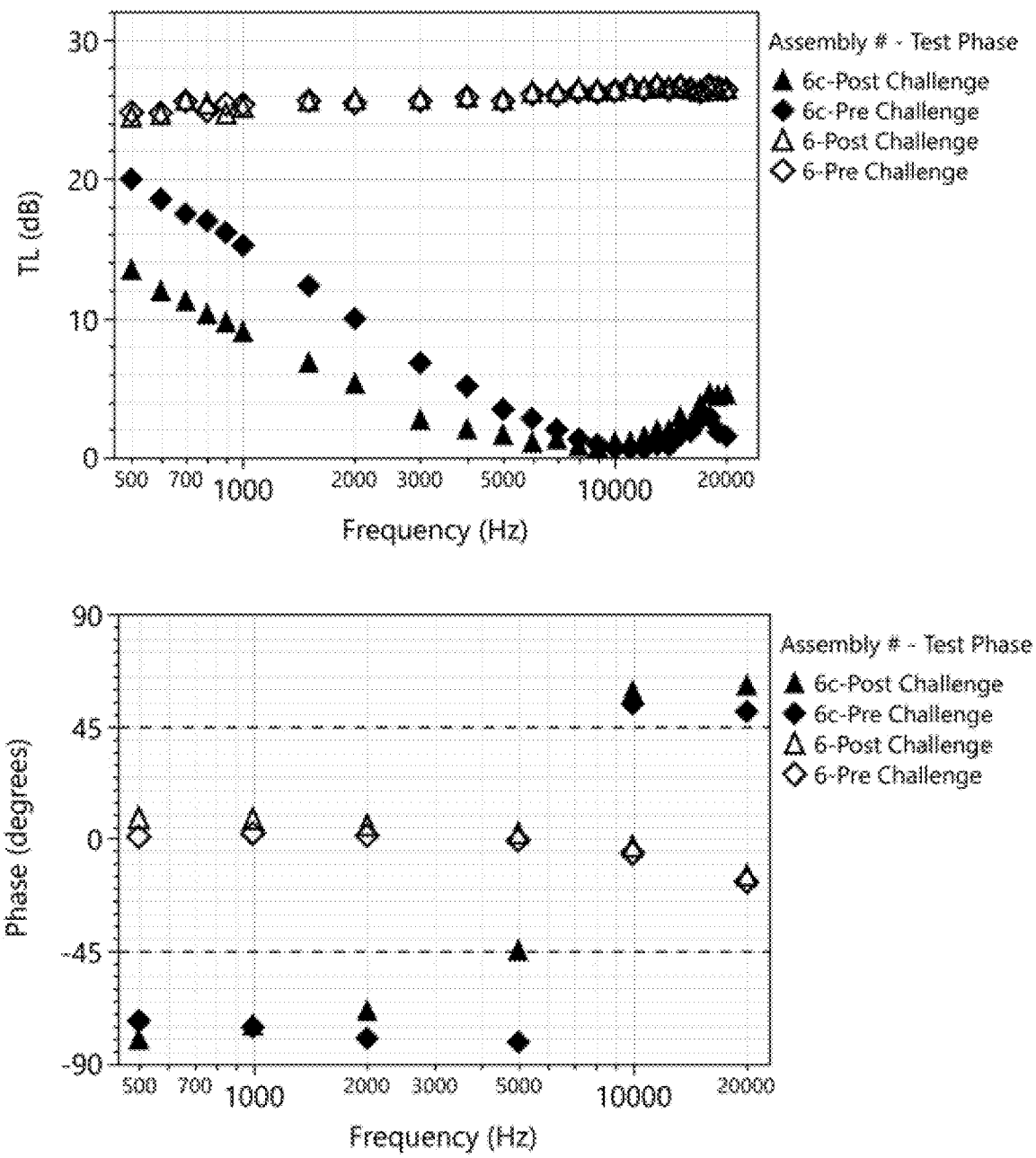
Figure 21:
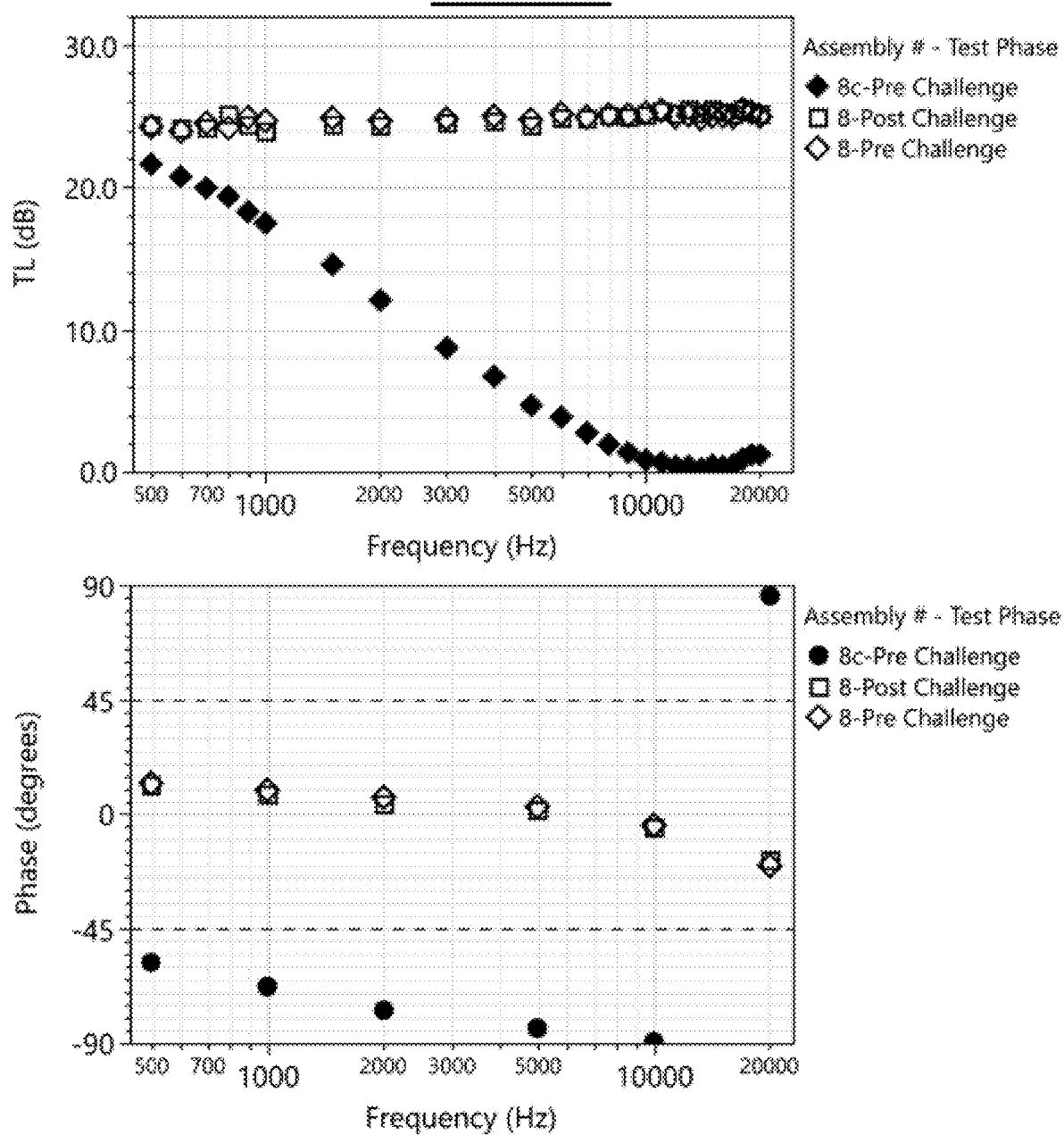
Figure 22:
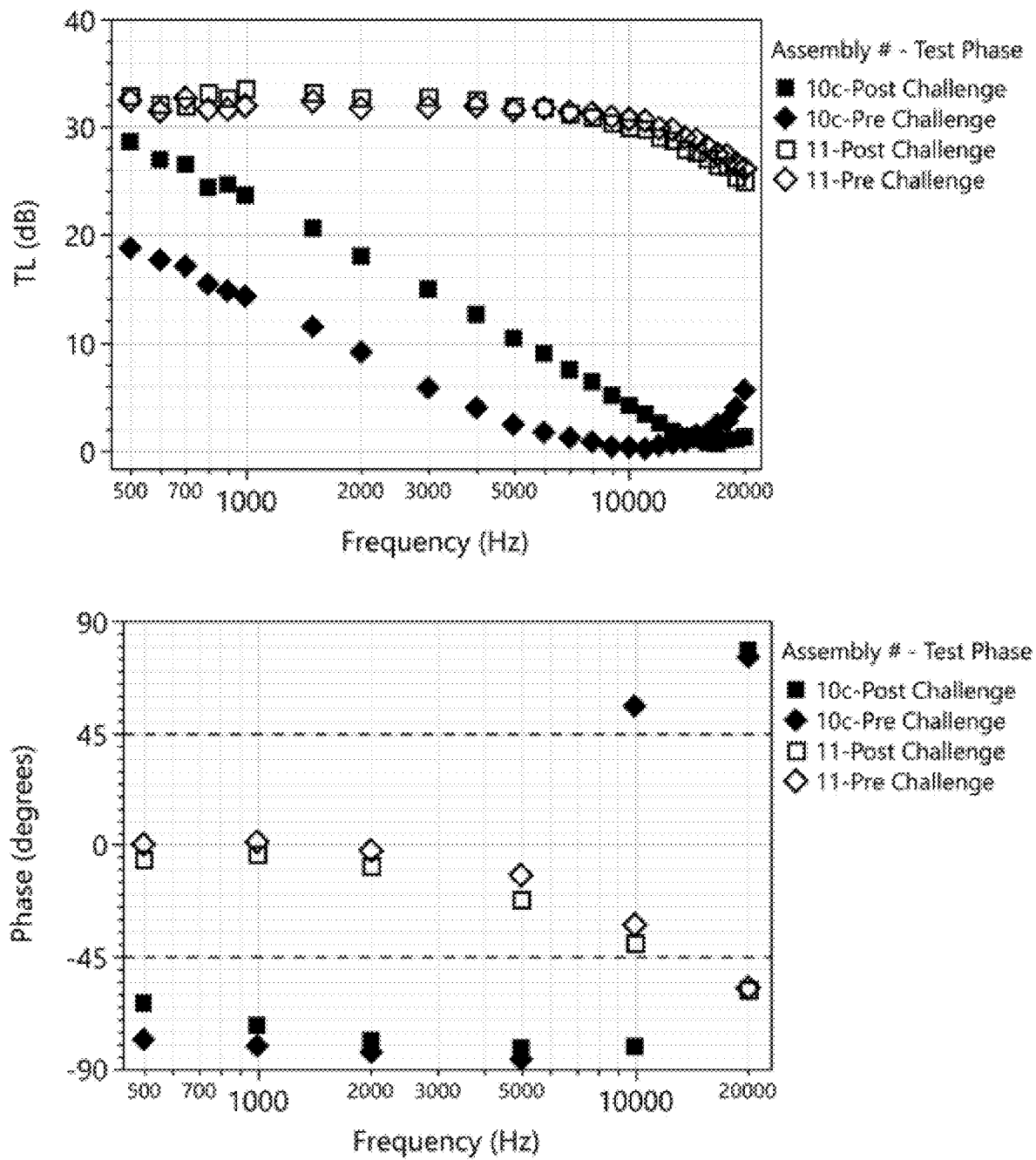
Figure 24:
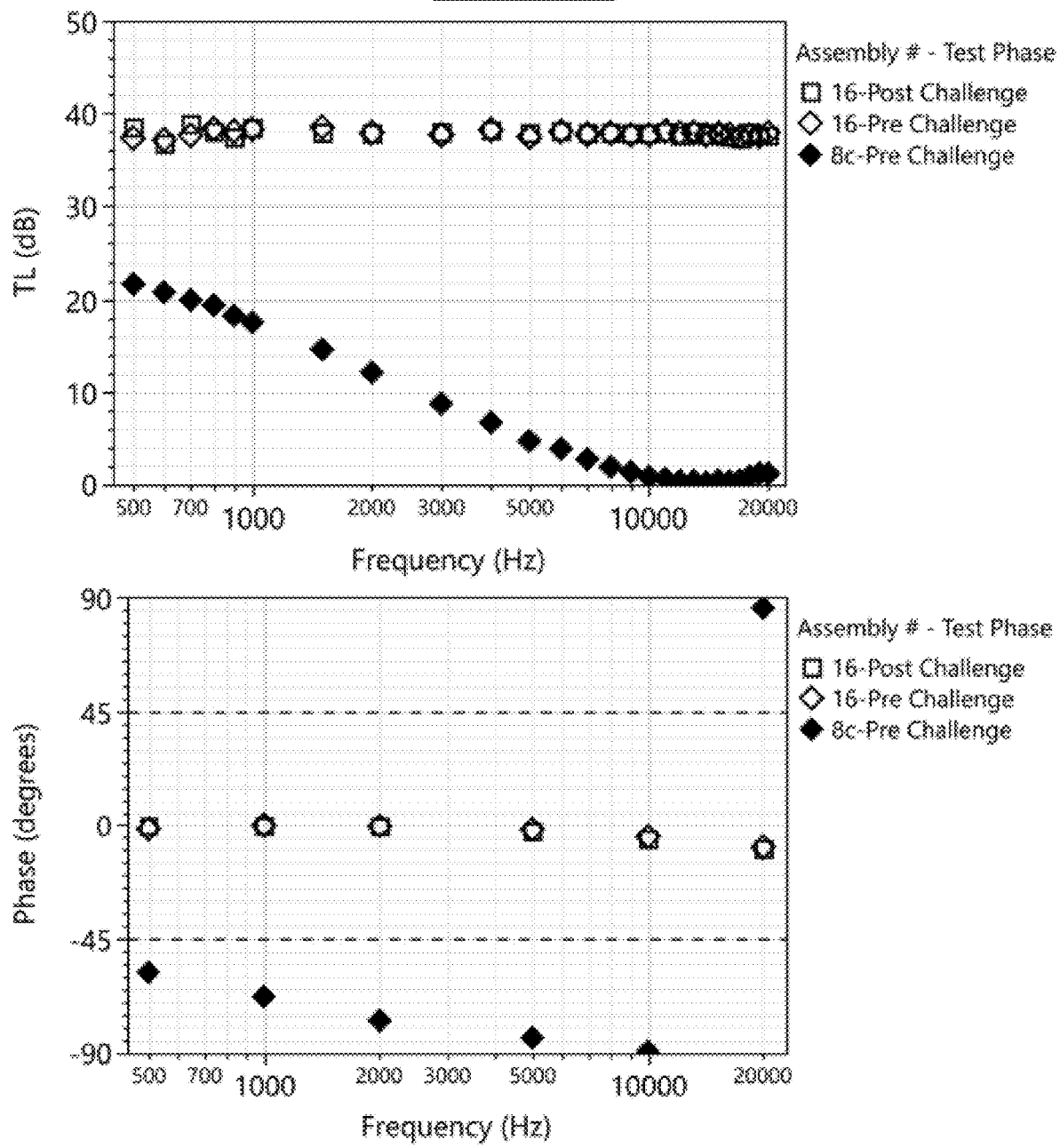
Figure 25:
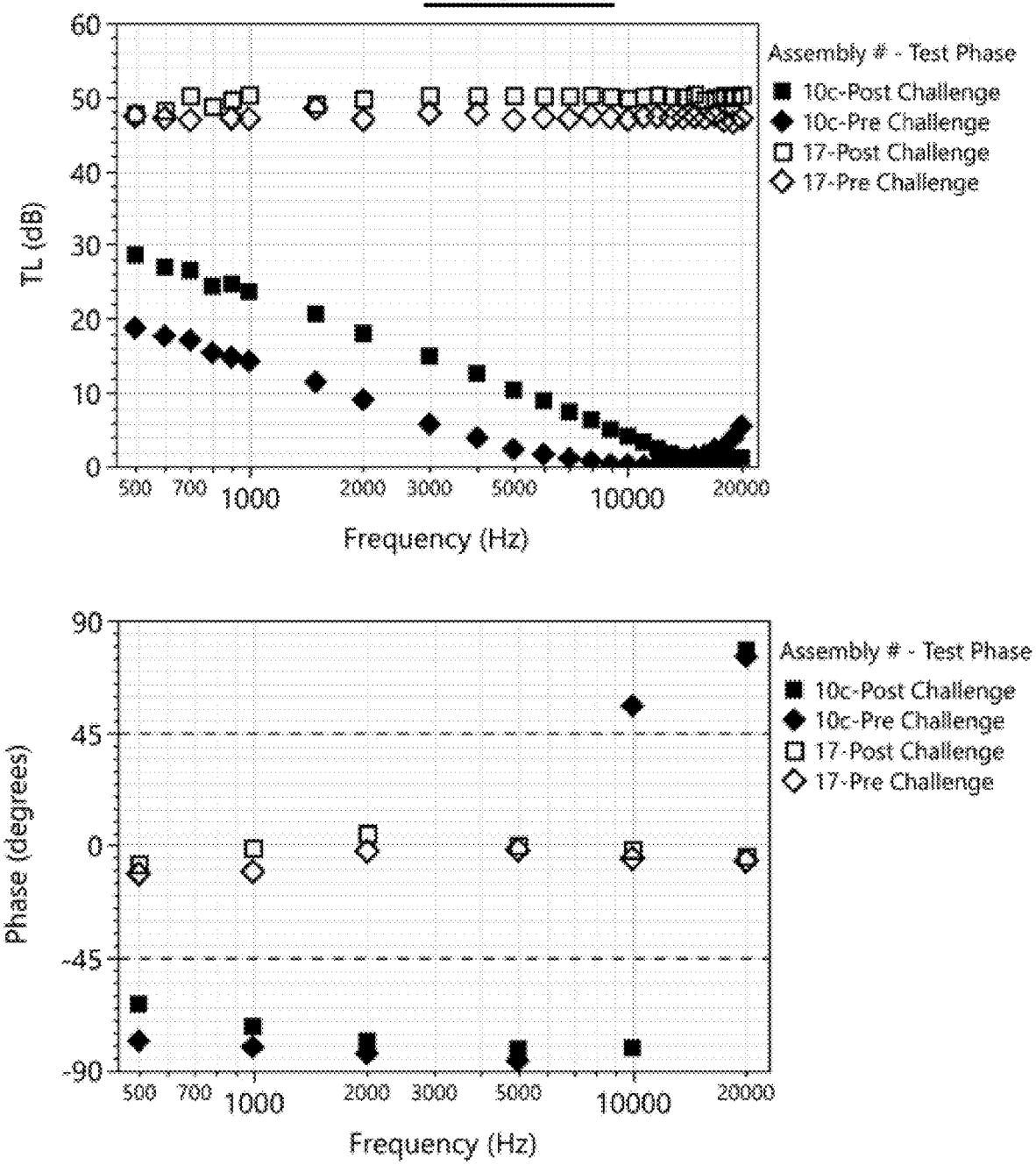

FIG. 6 depicts an optical micrograph showing the top-most 20 um of support layer 5. The dark areas correspond to the non-woven fibers. The dark regions in the image correspond to the fibers of the non-woven support and represent the areas of the support layer that come into contact with the membrane. The white regions in the image correspond to open area.

Procedure for Calculating % Open Area:

The % Open area can be calculated as

% open area=100−% contact area

EXAMPLES

Preparation of Sample Assemblies

The following table outlines properties of exemplary membranes that are used in the foregoing examples. These properties are merely exemplary and not intended to be limiting.

Polymer membranes # s 1-9 above were prepared according to the following methods.

TABLE 2

Membrane Preparation Methods

| Membrane # | Preparation Method |
|---|---|
| 1 | Prepared according to the general teachings of U.S. Pat. No. 3,953,566. |
| 2 | Prepared according to the general teachings of U.S. Pat. No. 3,953,566 |
| 3 | Prepared according to the general teachings of U.S. Pat. Nos. 3,953,566 and 6,541,589 |
| 4 | Prepared according to the general teachings of U.S. Pat. Nos. 3,953,566 and 9,775,933 |
| 5 | Prepared according to the general teachings of U.S. Pat. No. 3,953,566 Membrane thickness was measured as follows. 128 individual layers were stacked together and a thickness of 7.76 μm was measured as described herein. The thickness of a single layer was determined by dividing the total thickness by the number of layers. The thickness of this membrane was determined to be 60.6 nm |
| 6 | Prepared according to the general teachings of U.S. Pat. No. 3,953,566. Membrane thickness was measured as follows. 32 individual layers were stacked together and a thickness of 4.95 μm was measured as described herein. The thickness of a single layer was determined by dividing the total thickness by the number of layers. The thickness of this membrane was determined to be 154.5 nm |
| 7 | Prepared according to the general teachings of U.S. Pat. Nos. 3,953,566 and 5,814,405. |
| 8 | Prepared according to the general teachings of U.S. Pat. No. 3,953,566 |
| 9 | Prepared according to the general teachings of U.S. Pat. Nos. 3,953,566. Membrane thickness was measured as follows. 2 individual layers were carefully stacked together and a thickness of 1.66 μm was measured as described herein. The thickness of a single layer was determined by dividing the total thickness by the number of layers. The thickness of this membrane was determined to be 0.83 μm |

The following table outlines properties of exemplary support layers that are used in the foregoing examples. These properties are merely exemplary and not intended to be limiting.

TABLE 1

Properties of polymer membranes:

| Membrane # | Thickness (μm) | Air Flow Resistance (MKS Rayls) | Effective Stiffness (Pa/nm) | Young's Modulus (MPa) | Water Entry Pressure WEP (psi) | Mass per Area (g/m$^2$) | Bubble Point (psi) | Max Pore Size (μm) |
|---|---|---|---|---|---|---|---|---|
| 1 | 9.4 | 4825 | 0.0044 | 31.1 | 20.2 | 1.83 | 16.6 | 0.73 |
| 2 | 13.3 | 12626 | 0.0053 | 29.6 | 43.8 | 3.74 | 30.1 | 0.40 |
| 3 | 15 | 49428 | 0.0405 | 48.3 | 110.8 | 7.4 | 56 | 0.22 |
| 4 | 1.2 | 3304 | 0.0006 | 359 | 12.4 | 0.24 | 31.9 | 0.38 |
| 5 | 0.0606 | 226 | 0.0009 | Not measured | Not measured | 0.009 | Not measured | Not measured |
| 6 | 0.1545 | 218 | 0.0007 | Not measured | 2.5 | 0.029 | Not measured | Not measured |
| 7 | 125.5 | 1836 | 0.0587 | 4 | 10.8 | 5.34 | 1.514 | 7.96 |
| 8 | 1.75 | 1864 | 0.0036 | 72.63 | 11.6 | 0.1679 | 13.56 | 0.89 |
| 9 | 0.83 | 919 | 0.0022 | 100.52 | 5.8 | 0.0953 | 4.85 | 2.49 |

TABLE 3

Properties of support layers:

| Support Layer # | Support Layer Type | Material Composition | Air-Flow Resistance (MKS Rayl) | Effective % Open Area | % Contact | Largest Dimension of Single Opening (μm) | Thickness (μm) | Effective Stiffness (Pa/nm) |
|---|---|---|---|---|---|---|---|---|
| 1 | Woven | PET | 54 | 74.24 | 25.76 | 105 | 64 | 1.053 |
| 2 | Woven | PET | 79 | 52.32 | 47.68 | 33 | 40 | 0.243 |
| 3 | Woven | PET | 171 | 37.27 | 62.73 | 20 | 70 | 0.792 |
| 4 | Bi-Component Mesh | Co-PET Sheath w PET Core | 43 | 87.97 | 12.03 | 330 | 80 | 1.163 |
| 5 | Non Woven | Co-Polyester | 67 | 83.16 | 16.84 | 350 | 127 | 0.844 |
| 6 | Apertured Film | Polyethylene | 157 | 77.68 | 22.32 | 220 | 109 | 0.066 |
| 7 | Perforated Plate | Brass (Perforations: 19 × 100 μm) | 704 | 9 | 91 | 96 | 410 | 22.64 |
| 8 | Perforated Plate | Brass (Perforations: 56 × 100 μm) | 186 | 24 | 76 | 96 | 410 | 21.90 |
| 9 | Perforated Plate | Fiberglass (Perforations: 19 × 100 μm) | 753 | 9 | 91 | 100 | 381 | 4.38 |
| 10 | Perforated Plate | Fiberglass (Perforations: 19 × 175 μm) | 613 | 26 | 74 | 175 | 381 | 1.42 |
| 11 | Perforated Plate | PET (Perforations: 85 × 90 μm) | 1129 | 30.6 | 69.4 | 90 | 127 | 4.24 |
| 12 | Perforated Plate | PET (Perforations: 85 × 110 μm) | 352 | 45.7 | 54.3 | 110 | 130 | 2.9 |
| 13 | Woven | Nylon-6-6 | 1458 | 36.13 | 63.87 | 10 | 64 | 0.255 |
| 14 | Perforated Plate | Stainless Steel | 1212 | 15.17 | 84.83 | 85 | 89 | 6.94 |

Certain non-limiting sample assemblies and comparative sample assemblies described and tested herein were prepared as follows.

All example sample assemblies (with the exception of sample assembly 12 and 13) and comparative sample assemblies are comprised of at least one adhesive-backed fiberglass sample carrier, referred to simply as fiberglass sample carriers from this point forward. The fiberglass sample carriers were prepared by applying a double-sided pressure sensitive adhesive to one side of a fiberglass sheet (purchased commercially from McMaster-Carr, product #1331T37). The fiberglass/adhesive sheets were then laser cut into coupons. A 1.5 mm diameter hole was then fabricated in the center that aligned with the inner bore of the impedance tube and corresponds to the active area of the sample to be measured.

Comparative Sample Assemblies:

Certain non-limiting comparative sample assemblies were prepared as follows: A piece of membrane was positioned on a smooth and level surface so that the membrane was flat and free of any wrinkled. The adhesive release liner was removed from a pre-cut fiberglass sample carrier to expose the adhesive. With adhesive layer exposed, the sample carrier was gently placed onto the membrane and any excess membrane was cut away from the perimeter of the sample carrier. The sample carrier was then placed onto an alignment jig with membrane side facing up. The release liner was removed from a second fiberglass sample carrier and placed onto the alignment jig with adhesive side facing down, towards the membrane. Low pressure (manually applied and not measured) was applied to bring the bottom and top sample carriers together to form an assembly having the following stack up: fiberglass sample carrier/adhesive/membrane/adhesive/fiberglass sample carrier. The stack up for comparative sample assemblies are shown in Table 4.

Sample Assemblies

Certain non-limiting sample assemblies with perforated adhesive-backed fiberglass support layers (e.g., Assemblies 15-17, 33, 34) were prepared according the following procedure. Perforated adhesive-backed fiberglass support layers were fabricated in a similar manner as adhesive-backed fiberglass sample carriers (described above), with the exception that multiple small diameter perforations (openings) were made instead of a single large 1.5 mm diameter hole. The number of perforations and their diameters are shown in Table 3. Sample assemblies were then prepared as described herein with the exception that one of the fiberglass sample carriers was substituted with a pre-cut adhesive-backed perforated fiberglass support, referred to simply as a perforated fiberglass support layer from this point forward. The stack up for these assemblies are shown in Table 3.

Certain non-limiting sample assemblies with woven and/or non-woven support layers (e.g., Assemblies 1-11, 14, 18-30) were prepared as follows. Woven and non-woven support materials were cut from the roll into small (6 mm×6 mm) square pieces and set aside. The adhesive release liner was removed from a pre-cut fiberglass sample carrier and adhered to a pre-cut square of the support material such that the support covered the 1.5 mm diameter hole at the center of the fiberglass sample carrier. With a majority of the adhesive still exposed, the polymer membrane was then attached to the sample carrier. The fiberglass sample carrier with the support layer and membrane attached was then placed membrane side up on an alignment jig. The adhesive release liner from a second fiberglass sample carrier was removed and placed adhesive side down onto the alignment jig. Light pressure was applied to bring the bottom and top sample carriers together to form an assembly having the following stack up: fiberglass carrier/adhesive/support/ membrane/adhesive/fiberglass carrier. In some sample assemblies (e.g., assemblies 1-8, 10, 11, 14, 18, 20, 22, 23, 25-28)) a second fiberglass sample carrier with support layer was used to form an assembly having the following stack up: fiberglass carrier/adhesive/support/membrane/support/adhesive/fiberglass carrier. Sample assembly 29 was pressurized at 17 psi for 10 minutes using the same procedure described in the Test Procedures section to improve the attachment between the polymer membrane and the support layer. Refer to Table 3 for additional stack up information for assemblies with at least one woven or non-woven support.

Certain non-limiting assemblies with perforated PET support layer(s) (e.g., Assemblies 31, 32) were prepared as follows: First, double sided pressure sensitive adhesive was applied to one side of a PET sheet with thickness of 127-130 μm. The PET/adhesive sheets were then laser cut into coupons. Perforations (openings) were formed in the 1.5 mm diameter circular area at the center of the coupon. The number of perforations and their diameters are shown in Table 3. With the adhesive layer exposed, the coupon with perforations can be attached to a polymer membrane and act as a support layer. A fiberglass sample carrier was then attached to the opposite side of the membrane to form an assembly having the following stack up: fiberglass sample carrier/adhesive/membrane/adhesive/PET support.

Certain assemblies with brass support layers (e.g., Assemblies 12, 13) were prepared as follows. Brass coupons were prepared from sheet material. Perforations (openings) were formed in the 1.5 mm diameter circular area at the center of the coupons. The number of perforations and their diameters are shown in Table 3. The membrane was clamped between two brass support plates to form an adhesive-free assembly with the following stack up: brass support/membrane/brass support. In this procedure, the perforations on both coupons align with accuracy.

Exemplary Lamination Procedure:

In some embodiments, the polymer membrane is laminated to the at least one support layer. While lamination can be performed using any method, in some embodiments, the polymer membrane is laminated to the at least one support layer using a mini hot roll laminator (model HL-200, purchased commercially from ChemInstruments Inc.). To improve handleability, the support and membrane can be cut into 3-inch×6-inch strips and placed between two pieces of 25.4-um-thick kapton (purchased commercially from DuPont) cut into strips slightly larger than the membrane and support layer. The sample assemblies can then be inserted between two rollers (a hot roll and a nip roll) and laminated. The stack up can be as follows: kapton/ePTFE/support layer/kapton. When woven meshes (e.g., product #34-33 and 6-105, Sefar Inc. Holding AG) are used as a support layer, lamination can be performed at a temperature of 265 C, a pressure of 40 psi between the hot roll and the nip roll and a line speed of 45 cm/min. When bi-component mesh (e.g., product #28T1, Unitika Ltd.) is used as a support layer, lamination was performed at a temperature of 185° C., a pressure of 40 psi between the hot roll and nip roll and a line speed of 45 cm/min. When a non-woven material was used (product #133, HDK Industries) as the support layer, lamination was performed at a temperature of 180 C, a pressure of 25 psi between the hot roll and the nip roll and a line speed of 400 cm/min.

The orientation can be such that the polymer membrane is closest to the hot roll and the support is closest to the nip roll. In some embodiments, a mesh support layer (product #28T1, Unitika) can be laminated onto the top and bottom surface of the membrane. The stack up for these sample assemblies can be as follows: kapton/mesh support layer/ePTFE/mesh support layer/kapton. The sample assemblies were inserted between the rollers a first time to laminate the mesh support layer to the top surface of the membrane. The sample assemblies can then be flipped over and inserted a second time to laminate the mesh support layer to the bottom surface of the membrane. After lamination, the top and bottom kapton layers can be removed.

TABLE 4

Exemplary configurations of Sample Assemblies:
The following table lists the configuration of the assemblies used in the foregoing Examples. The "membrane #" and "support layer #" designated herein refer to Tables 1 and 2 respectively.

| Assembly # | Support layer # | Membrane # | No. of support layers | Attachment method | Stackup |
|---|---|---|---|---|---|
| 1 | 1 | 1 | 2 | Layered | Fiberglass/adhesive/support/polymer membrane/support/adhesive/fiberglass |
| 2 | 1 | 2 | 2 | Layered | Fiberglass/adhesive/support/polymer membrane/support/adhesive/fiberglass |
| 3 | 1 | 3 | 2 | Layered | Fiberglass/adhesive/support/polymer membrane/support/adhesive/fiberglass |
| 4 | 1 | 4 | 2 | Layered | Fiberglass/adhesive/support/polymer membrane/support/adhesive/fiberglass |
| 5 | 1 | 5 | 2 | Layered | Fiberglass/adhesive/support/polymer membrane/support/adhesive/fiberglass |
| 6 | 1 | 2 | 2 | Layered | Fiberglass/adhesive/support/polymer membrane/support/adhesive/fiberglass |
| 7 | 1 | 2 | 2 | Layered | Fiberglass/adhesive/support/polymer membrane/support/adhesive/fiberglass |
| 8 | 1 | 2 | 2 | Layered | Fiberglass/adhesive/support/polymer membrane/support/adhesive/fiberglass |
| 9 | 1 | 2 | 1 | Layered | Fiberglass/adhesive/polymer membrane /support/adhesive/fiberglass |
| 10 | 1 | 2 | 2 | Layered | Fiberglass/adhesive/support/polymer membrane/support/adhesive/fiberglass |

TABLE 4-continued

Exemplary configurations of Sample Assemblies:
The following table lists the configuration of the assemblies used in the foregoing Examples. The "membrane #" and "support layer #" designated herein refer to Tables 1 and 2 respectively.

| Assembly # | Support layer # | Membrane # | No. of support layers | Attachment method | Stackup |
|---|---|---|---|---|---|
| 11 | 1 | 3 | 2 | Layered | Fiberglass/adhesive/support/polymer membrane/support/adhesive/fiberglass |
| 12 | 8 | 2 | 2 | Layered | Support/polymer membrane/support |
| 13 | 7 | 2 | 2 | Layered | Support/polymer membrane/support |
| 14 | 1 | 3 | 2 | Layered | Fiberglass/adhesive/support/polymer membrane/support/adhesive/fiberglass |
| 15 | 9 | 2 | 1 | Adhesive | Fiberglass/adhesive/polymer membrane/adhesive/support |
| 16 | 9 | 2 | 1 | Adhesive | Fiberglass/adhesive/polymer membrane/adhesive/support |
| 17 | 9 | 3 | 1 | Adhesive | Fiberglass/adhesive/polymer membrane/adhesive/support |
| 18 | 3 | 2 | 2 | Layered | Fiberglass/adhesive/support/polymer membrane/support/adhesive/fiberglass |
| 19 | 2 | 3 | 1 | Laminated | Fiberglass/adhesive/polymer membrane/adhesive/fiberglass |
| 20 | 3 | 1 | 2 | Layered | Fiberglass/adhesive/support/polymer membrane/support/adhesive/fiberglass |
| 21 | 4 | 3 | 1 | Laminated | Fiberglass/adhesive/polymer membrane/adhesive/fiberglass |
| 22 | 4 | 3 | 2 | Laminated | Fiberglass/adhesive/support/polymer membrane/support/adhesive/fiberglass |
| 23 | 5 | 2 | 2 | Layered | Fiberglass/adhesive/support/polymer membrane/support/adhesive/fiberglass |
| 24 | 5 | 7 | 1 | Laminated | Fiberglass/adhesive/polymer membrane/adhesive/fiberglass |
| 25 | 1 | 2 | 2 | Layered | Fiberglass/adhesive/support/polymer membrane/support/adhesive/fiberglass |
| 26 | 6 | 2 | 2 | Layered | Fiberglass/adhesive/support/polymer membrane/support/adhesive/fiberglass |
| 27 | 13 | 8 | 2 | Layered | Fiberglass/adhesive/support/polymer membrane/support/adhesive/fiberglass |
| 28 | 13 | 9 | 2 | Layered | Fiberglass/adhesive/support/polymer membrane/support/adhesive/fiberglass |
| 29 | 14 | 8 | 1 | Layered | Fiberglass/adhesive/polymer membrane/support/adhesive/fiberglass |
| 30 | 4 | 4 | 1 | Laminated | Fiberglass/adhesive/polymer membrane/support/adhesive/fiberglass |
| 31 | 11 | 4 | 1 | Adhesive | Fiberglass/adhesive/polymer membrane/adhesive/support |
| 32 | 12 | 4 | 1 | Adhesive | Fiberglass/adhesive/polymer membrane/adhesive/support |
| 33 | 10 | 4 | 1 | Adhesive | Fiberglass/adhesive/polymer membrane/adhesive/support |
| 34 | 9 | 6 | 1 | Adhesive | Fiberglass/adhesive/polymer membrane/adhesive/support |

TABLE 5

Comparative Sample Assemblies: The following table lists the configuration of the comparative sample assemblies used in the foregoing Examples.

| Comparative Sample Assembly # | Support layer # | Membrane # | No. of support layers | Attachment method | Stackup |
|---|---|---|---|---|---|
| 1c | None | 1 | 0 | Unsupported | Fiberglass/adhesive/polymer membrane/adhesive/fiberglass |
| 2c | None | 2 | 0 | Unsupported | Fiberglass/adhesive/polymer membrane/adhesive/fiberglass |
| 3c | None | 3 | 0 | Unsupported | Fiberglass/adhesive/polymer membrane/adhesive/fiberglass |
| 4c | None | 4 | 0 | Unsupported | Fiberglass/adhesive/polymer membrane/adhesive/fiberglass |
| 5c | None | 5 | 0 | Unsupported | Fiberglass/adhesive/polymer membrane/adhesive/fiberglass |
| 6c | None | 2 | 0 | Unsupported | Fiberglass/adhesive/polymer membrane/adhesive/fiberglass |
| 7c | None | 2 | 0 | Unsupported | Fiberglass/adhesive/polymer membrane/adhesive/fiberglass |
| 8c | None | 2 | 0 | Unsupported | Fiberglass/adhesive/polymer membrane/adhesive/fiberglass |
| 9c | None | 2 | 0 | Unsupported | Fiberglass/adhesive/polymer membrane/adhesive/fiberglass |
| 10c | None | 3 | 0 | Unsupported | Fiberglass/adhesive/polymer membrane/adhesive/fiberglass |

TABLE 5-continued

Comparative Sample Assemblies: The following table lists the configuration of the comparative sample assemblies used in the foregoing Examples.

| Comparative Sample Assembly # | Support layer # | Membrane # | No. of support layers | Attachment method | Stackup |
|---|---|---|---|---|---|
| 11c | None | 3 | 0 | Unsupported | Fiberglass/adhesive/polymer membrane/adhesive/fiberglass |
| 12c | None | 3 | 0 | Unsupported | Fiberglass/adhesive/polymer membrane/adhesive/fiberglass |
| 13c | None | 2 | 0 | Unsupported | Fiberglass/adhesive/polymer membrane/adhesive/fiberglass |
| 14c | None | 8 | 0 | Unsupported | Fiberglass/adhesive/polymer membrane/adhesive/fiberglass |
| 15c | None | 9 | 0 | Unsupported | Fiberglass/adhesive/polymer membrane/adhesive/fiberglass |
| 16c | None | 4 | 0 | Unsupported | Fiberglass/adhesive/polymer membrane/adhesive/fiberglass |
| 17c | None | 6 | 0 | Unsupported | Fiberglass/adhesive/polymer membrane/adhesive/fiberglass |

Properties of Sample Assemblies and Comparative Sample Assemblies

The following table lists exemplary properties of certain sample and comparative sample assemblies. All properties are measured as described herein.

TABLE 6

Properties of certain Sample Assemblies:

| Sample Assembly # | Water Entry pressure WEP (psi) | Airflow Resistance (Rayls) | Pressure difference for airflow resistance test (psi) | Effective Stiffness (Pa/nm) |
|---|---|---|---|---|
| 1 | 59.940 | 4843 | 0.17 | 1.42 |
| 2, 6, 7, 8, 10, 25 | 120.318 | 15555 | 0.17 | 2.29 |
| 3, 11, 14 | 199.4 | 62275 | 0.50 | 4.25 |
| 4 | 71.76 | 3227 | 0.17 | 25.5 |
| 5 | Not measured | 204 | 0.17 | 1.623 |
| 9 | 124.088 | 13845 | 0.17 | 2.2872 |
| 12 | 173.485 | 84014 | 0.7 | 29.8 |
| 13 | 209.813 | 357416 | 0.7 | 29.8 |
| 15, 16 | 224.790 | 67642 | 0.17 | 3.81 |
| 17 | 336.360 | 434405 | 1 | 2.9 |
| 18 | 92.290 | 15760 | 0.17 | 0.739 |
| 19 | 156.745 | 125508 | 0.5 | 0.4524 |
| 20 | 57.123 | 5732 | 0.17 | 1.46 |
| 21 | 202.462 | 31058 | 0.5 | 0.6971 |
| 22 | 172.499 | 49200 | 0.5 | 2.04 |
| 23 | 107.594 | 12050 | 0.17 | 1.52 |
| 24 | 10.908 | 2522 | 0.17 | 2.41 |
| 25 | 120.318 | 15555 | 0.17 | 2.2872 |
| 26 | 149.459 | 14822 | 0.17 | 1.19 |
| 27 | 36.12 | 4705 | 0.17 | 0.657 |
| 28 | 12.732 | 3984 | 0.17 | .657 |
| 29 | 80.114 | 2939 | 0.17 | 2.47 |
| 30 | 15.015 | 3792 | 0.17 | .198 |
| 31 | 225.789 | 24012 | 0.17 | 2.32 |
| 32 | 211.157 | 12437 | 0.17 | 1.66 |
| 33 | 162.933 | 31198 | 0.17 | 2.75 |
| 34 | 12.1 | 948 | 0.17 | 1.87 |

TABLE 7

Properties of certain Comparative Assemblies:

| Comparative Sample Assembly # | Water Entry Pressure ("WEP") (psi) | Airflow Resistance (Rayls) | Pressure difference used for airflow resistance test (psi) | Effective Stiffness (Pa/nm) |
|---|---|---|---|---|
| 1c | 20.185 | 4825 | 0.17 | 0.0044 |
| 2c, 6c, 7c, 8c, 9c, 13c | 43.526 | 12626 | 0.17 | 0.0053 |
| 3c, 10c, 11c, 12c | 110.787 | 49428 | 0.5 | 0.0405 |
| 4c, 16c | 12.413 | 3304 | 0.17 | 0.0006 |
| 5c | Not measured | 226 | 0.17 | .0009 |
| 14c | 11.576 | 1864 | 0.17 | 0.0036 |
| 15c | 5.788 | 919 | 0.17 | 0.0022 |
| 17c | 2.5 | 218 | 0.17 | 0.0007 |

Example 1—Non-Limiting Embodiments Exhibiting Constant Acoustic Transmission and Resistive Behavior For all the sample assemblies including the comparative sample assemblies, transmission loss and phase angle testing was performed as described in Test Procedures section.

The transmission loss data of the sample assemblies and comparative sample assemblies are shown in Table 8 at six discrete frequencies (500 Hz, 1,000 Hz, 2,000 Hz, 5,000 Hz, 10,000 Hz, 20,000 Hz). The transmission loss vs. frequency spectra are shown in FIGS. 7 to 18.

TABLE 8

Transmission loss of sample assemblies and comparative sample assemblies

| | | Transmission Loss (dB) | | | | | |
|---|---|---|---|---|---|---|---|
| Example # | Assembly # | 500 Hz | 1,000 Hz | 2,000 Hz | 5,000 Hz | 10,000 Hz | 20,000 Hz |
| 1a | 1 | 16.94 | 17.36 | 17.61 | 17.47 | 17.78 | 17.89 |
| | 1c | 13.75 | 8.50 | 4.72 | 1.34 | 0.38 | 1.20 |
| 1b | 2 | 23.13 | 24.16 | 24.27 | 24.28 | 24.57 | 23.92 |
| | 2c | 18.91 | 15.17 | 10.35 | 3.83 | 1.09 | 2.27 |
| 1c | 3 | 31.81 | 31.33 | 31.80 | 31.83 | 32.03 | 27.75 |
| | 3c | 29.65 | 24.44 | 18.83 | 10.45 | 3.51 | 2.10 |
| 1d | 4 | 11.39 | 11.55 | 11.59 | 11.51 | 11.78 | 11.77 |
| | 4c | 12.02 | 8.79 | 4.93 | 1.42 | 0.53 | 0.34 |
| 1e | 5 | 3.48 | 2.96 | 2.99 | 2.95 | 3.00 | 3.10 |
| | 5c | 1.81 | 1.79 | 1.74 | 0.77 | 0.20 | 0.25 |
| 1f | 9 | 29.16 | 29.36 | 29.21 | 28.60 | 27.67 | 23.93 |
| | 9c | 13.35 | 9.60 | 5.52 | 1.72 | 0.50 | 2.37 |
| | 10 | 25.15 | 24.71 | 25.00 | 25.23 | 25.87 | 25.80 |
| 1g | 12 | 41.31 | 41.38 | 41.25 | 40.98 | 41.27 | 40.44 |
| 1g | 13 | 49.18 | 50.27 | 49.90 | 49.27 | 50.02 | 48.81 |
| 1h | 18 | 25.81 | 25.80 | 26.00 | 26.10 | 26.80 | 27.30 |
| | 2c | 18.91 | 15.17 | 10.35 | 3.83 | 1.09 | 2.27 |
| 1g | 19 | 47.20 | 47.80 | 47.20 | 45.90 | 42.40 | 36.90 |
| 1g | 20 | 18.10 | 18.30 | 18.50 | 18.40 | 18.70 | 18.70 |
| 1g | 21 | 37.70 | 37.80 | 38.20 | 37.60 | 37.00 | 34.30 |
| 1g | 23 | 23.30 | 23.00 | 23.70 | 23.60 | 23.50 | 22.30 |
| 1g | 24 | 15.20 | 15.30 | 15.50 | 15.50 | 15.60 | 14.20 |
| 1i | 25 | 25.90 | 26.80 | 26.90 | 26.70 | 26.90 | 27.20 |
| | 13c | 21.40 | 16.80 | 13.60 | 6.50 | 2.30 | 7.80 |
| 1g | 26 | 25.19 | 25.76 | 25.69 | 25.05 | 23.83 | 18.13 |
| 1j | 27 | 15.92 | 16.42 | 16.32 | 15.91 | 15.53 | 12.62 |
| | 14c | 10.14 | 7.43 | 4.14 | 1.16 | 0.55 | 0.38 |
| 1k | 28 | 14.27 | 14.39 | 14.23 | 13.92 | 13.75 | 12.27 |
| | 15c | 6.16 | 5.27 | 3.33 | 0.91 | 0.25 | 0.47 |
| 1g | 29 | 15.44 | 15.78 | 15.81 | 15.52 | 15.52 | 15.31 |
| 1g | 30 | 17.80 | 18.16 | 18.04 | 17.46 | 16.36 | 13.80 |
| 1l | 34 | 6.32 | 6.49 | 6.48 | 6.37 | 6.43 | 6.36 |
| | 17c | 1.78 | 1.63 | 1.03 | 0.26 | 0.10 | 0.52 |

The phase angle data of the sample assemblies are shown in Table 10 at six discrete frequencies (500 Hz, 1,000 Hz, 2,000 Hz, 5,000 Hz, 10,000 Hz, 20,000 Hz). The raw phase angle vs. frequency spectra of the tested sample assemblies are shown in FIGS. 1 to 18.

TABLE 9

Phase angle of sample assemblies & comparative sample assemblies:

| | | Phase Angle (degrees) | | | | | |
|---|---|---|---|---|---|---|---|
| Example # | Assembly # | 500 Hz | 1,000 Hz | 2,000 Hz | 5,000 Hz | 10,000 Hz | 20,000 Hz |
| 1a | 1 | 2.91 | 3.03 | 2.24 | 0.96 | −0.78 | −2.74 |
| | 1c | −61.20 | −64.00 | −74.10 | −76.00 | −69.50 | 25.90 |
| 1b | 2 | 6.50 | 3.69 | 1.56 | −2.71 | −10.20 | −23.50 |
| | 2c | −58.20 | −68.40 | −71.60 | −75.10 | −31.60 | 79.70 |
| 1c | 3 | 3.82 | 0.74 | −0.72 | −7.73 | −21.20 | −42.90 |
| | 3c | −64.90 | −74.30 | −79.80 | −84.10 | −86.10 | 82.90 |
| 1d | 4 | 2.35 | 2.50 | 0.89 | −1.23 | −4.32 | −12.60 |
| | 4c | −43.60 | −60.80 | −75.20 | −80.20 | −86.07 | −31.10 |
| 1e | 5 | −4.18 | −1.72 | 0.73 | −1.43 | −2.86 | −3.35 |
| | 5c | 1.79 | −10.40 | −24.50 | −60.60 | −76.70 | −28.50 |
| 1f | 9 | −0.36 | −2.17 | −6.46 | −16.92 | −32.47 | −51.92 |
| | 9c | −69.1 | −68.8 | −71.72 | −68.65 | 56.05 | 75.94 |
| | 10 | 9.39 | 7.79 | 4.65 | 1.22 | −3.92 | −15.72 |
| 1g | 12 | 1.82 | 0.75 | 1.60 | 1.38 | 0.40 | 1.40 |
| 1g | 13 | 3.33 | 2.18 | −0.20 | 0.87 | 1.59 | 3.52 |
| 1h | 18 | 2.78 | 2.96 | 2.82 | 2.09 | −1.48 | −10.48 |
| | 2c | −58.20 | −68.40 | −71.60 | −75.10 | −31.60 | 79.70 |
| 1g | 19 | −3.35 | −5.98 | −5.79 | −23.22 | −49.84 | −65.23 |
| 1g | 20 | 0.71 | 2.56 | 1.58 | 0.07 | −2.62 | −6.27 |
| 1g | 21 | −2.07 | −0.74 | −3.30 | −10.81 | −22.17 | −37.77 |
| 1g | 23 | 8.12 | 4.98 | 2.24 | −6.42 | −15.44 | −38.18 |
| 1g | 24 | 0.25 | 2.47 | 2.49 | 2.20 | 2.07 | 3.53 |

TABLE 9-continued

Phase angle of sample assemblies & comparative sample assemblies:

| | | Phase Angle (degrees) | | | | | |
|---|---|---|---|---|---|---|---|
| Example # | Assembly # | 500 Hz | 1,000 Hz | 2,000 Hz | 5,000 Hz | 10,000 Hz | 20,000 Hz |
| 1i | 25 | 1.16 | 1.99 | 1.13 | −2.62 | −7.19 | −14.31 |
| | 13c | −44.64 | −64.00 | −75.08 | −83.62 | −86.59 | 81.72 |
| 1g | 26 | −3.14 | −1.8 | −6.67 | −18.64 | −36.32 | −58.63 |
| 1j | 27 | 3.20 | 1.56 | −1.22 | −4.24 | −10.59 | −23.77 |
| | 14c | −36.35 | −52.86 | −69.86 | −79 | −81.74 | 4.4508 |
| 1k | 28 | 1.06 | 1.74 | −0.15 | −1.42 | −5.00 | −14.30 |
| | 15c | −17.50 | −32.67 | −55.12 | −72.93 | −83.36 | 52.56 |
| 1g | 29 | 2.94 | 2.60 | 1.31 | 1.81 | −1.27 | 3.87 |
| 1g | 30 | 1.93 | −0.35 | −5.02 | −14.89 | −30.26 | −42.71 |
| 1l | 34 | 2.88 | 3.39 | 2.29 | 2.26 | 3.77 | 5.44 |
| | 17c | −14.70 | −33.50 | −52.50 | −85.10 | −84.80 | −36.03 |

As shown, the sample assemblies exhibit phase angles falling within the range of +45 degrees to −45 at the tested frequencies, while the comparative sample assemblies exhibit phase angles falling outside of the ranges of +45 degrees to −45 at some of the tested frequencies.

The slope of the transmission loss (in dB/Octave) for each sample assembly and for each comparative sample assembly was measured through a linear regression over the discrete frequencies (500 Hz, 1,000 Hz, 2,000 Hz, 5,000 Hz, 10,000 Hz, 20,000 Hz).

The frequencies were scaled to octaves using the following procedure:

The number of octaves between 500 Hz and 500 Hz is $$\log_2\left(\frac{500}{500}\right) = 0$$

The number of octaves between 500 Hz and 1000 Hz is $$\log_2\left(\frac{1000}{500}\right) = 1$$

The number of octaves between 500 Hz and 2000 Hz is $$\log_2\left(\frac{2000}{500}\right) = 2$$

The number of octaves between 500 Hz and 5000 Hz is $$\log_2\left(\frac{5000}{500}\right) = 3.32$$

The number of octaves between 500 Hz and 10,000 Hz is $$\log_2\left(\frac{10000}{500}\right) = 4.32$$

The number of octaves between 500 Hz and 20,000 Hz is $$\log_2\left(\frac{20000}{500}\right) = 5.32$$

The slope of the transmission loss spectrum can then be determined by performing a linear regression on the transmission loss data over the above-calculated octaves.

For comparative sample assemblies, the transmission loss value will decrease with frequency in low frequency range and then increase with frequency in high frequency range. The linear regression is performed in the low frequency range for comparative sample assemblies. As shown below in Tables 10-11, for a given membrane, the slope of the transmission loss of sample assemblies was closer to zero than the slope the transmission loss of the comparative sample assemblies, indicating that the sample assemblies provided a more predominantly constant sound transmission profile. Specifically, as illustrated by the non-limiting examples below, in some embodiments of the present disclosure, the absolute value of the slope of transmission loss is 1.5 dB/octave or less (i.e., the transmission loss ranges from is −1.5 dB/octave to 1.5 dB/octave) over a 500 Hz to 20,000 Hz range. Put differently, in the non-limiting examples of Table 10, transmission loss does not vary by more than 1.5 dB/octave over the frequency range of 500 to 20,000 Hz.

TABLE 10

Slope of the transmission loss of sample assemblies and comparative sample assemblies:

| Example # | Assembly # | Slope of TL (dB/Octave) over 500 Hz-20,000 Hz range |
|---|---|---|
| 1a | 1 | 0.152 |
| | 1c | −3.072 |
| 1b | 2 | .136 |
| | 2c | −4.293 |
| 1c | 3 | −.469 |
| | 3c | −5.528 |
| 1d | 4 | −0.127 |
| | 4c | −2.293 |
| 1e | 5 | −0.0473 |
| | 5c | −0.3932 |
| 1f | 9 | −0.833 |
| | 9c | −3.054 |
| | 10 | 0.185 |
| 1g | 12 | −0.130 |
| 1g | 13 | −0.088 |
| 1h | 18 | 0.277 |
| | 2c | −4.293 |
| 1g | 19 | −1.812 |
| 1g | 20 | 0.107 |
| 1g | 21 | −0.524 |
| 1g | 23 | −0.092 |
| 1g | 24 | −0.105 |

TABLE 10-continued

Slope of the transmission loss of sample assemblies and comparative sample assemblies:

| Example # | Assembly # | Slope of TL (dB/Octave) over 500 Hz-20,000 Hz range |
|---|---|---|
| 1i | 25 | 0.170 |
|  | 13c | −4.435 |
| 1g | 26 | −1.091 |
| 1j | 27 | −.512 |
|  | 14c | −1.916 |
| 1k | 28 | −0.321 |
|  | 15c | −1.481 |
| 1g | 29 | −0.047 |
| 1g | 30 | −0.682 |
| 1l | 34 | −0.003 |
|  | 17c | −0.435 |

Example 2—Non-Limiting Embodiments Exhibiting Improved Pressure Challenge Resistance For all the sample assemblies including the comparative sample assemblies, transmission loss and phase angle testing was performed as described in Test Procedures section. Sample assemblies were subjected to a pressure test described in Table 11 below with a ten-minute hold time.

TABLE 11

Test Pressures of sample assemblies and comparative sample assemblies

| Example # | Assembly # | Challenge Pressure (psi) |
|---|---|---|
| 2a | 6 | 2.2 |
|  | 6c | 2.2 |
| 2b | 7 | 14.5 |
|  | 7c | 14.5 |
| 2c | 8 | 43.5 |
|  | 8c | 43.5 |
| 2d | 11 | 43.5 |
|  | 10c | 43.5 |
| 2e | 15 | 14.5 |
|  | 7c | 14.5 |
| 2f | 16 | 43.5 |
|  | 8c | 43.5 |
| 2g | 17 | 43.5 |
|  | 10c | 43.5 |
| 2h | 22 | 116 |
|  | 12c | 116 |
| 2i | 27 | 17 |
|  | 29 | 17 |
| 2j | 28 | 10 |
| 2k | 31 | 10 |
|  | 32 | 10 |
|  | 33 | 10 |
|  | 16c | 10 |

The pre vs. post test transmission loss and phase data was measured as described in the Test Procedures Section. For the sample assemblies and the comparative sample assemblies, the transmission loss before and after the pressure test, as well as the relative change in transmission loss, are shown in below in Tables 12 to 14 at six discrete frequencies (500 Hz, 1,000 Hz, 2,000 Hz, 5,000 Hz, 10,000 Hz, and 20,000 Hz). The raw transmission loss and phase angle vs. frequency spectra are shown in FIGS. 19 to 29. As shown, for a given membrane, the change of transmission loss before and after the pressure test is smaller than that for comparative sample assemblies, indicating that the sample assemblies provided a more robust acoustic performance and improved burst strength against pressure challenge.

TABLE 12

Transmission loss of sample assemblies and comparative sample assemblies before pressure challenge

| Example # | Assembly # | Challenge Pressure (psi) | Transmission Loss Before Pressure Challenge (dB) | | | | | |
|---|---|---|---|---|---|---|---|---|
| | | | 500 Hz | 1,000 Hz | 2,000 Hz | 5,000 Hz | 10,000 Hz | 20,000 Hz |
| 2a | 6 | 2.2 | 24.67 | 25.16 | 25.31 | 25.32 | 25.91 | 26.00 |
|  | 6c | 2.2 | 20.40 | 15.91 | 10.58 | 3.75 | 0.59 | 1.50 |
| 2b | 7 | 14.5 | 24.73 | 25.23 | 25.49 | 25.39 | 26.10 | 25.79 |
|  | 7c | 14.5 | 23.23 | 18.32 | 13.81 | 6.25 | 1.89 | 2.36 |
| 2c | 8 | 43.5 | 24.30 | 24.66 | 24.67 | 24.72 | 25.21 | 24.98 |
|  | 8c | 43.5 | 21.64 | 17.47 | 12.06 | 4.69 | 0.83 | 1.19 |
| 2d | 11 | 43.5 | 32.44 | 31.92 | 31.72 | 31.53 | 30.69 | 26.10 |
|  | 10c | 43.5 | 18.78 | 14.29 | 9.09 | 2.38 | 0.31 | 5.55 |
| 2e | 15 | 14.5 | 37.83 | 38.29 | 38.17 | 37.50 | 37.67 | 37.88 |
|  | 7c | 14.5 | 23.23 | 18.32 | 13.81 | 6.25 | 1.89 | 2.36 |
| 2f | 16 | 43.5 | 36.88 | 37.30 | 37.08 | 36.69 | 36.90 | 37.05 |
|  | 8c | 43.5 | 21.64 | 17.47 | 12.06 | 4.69 | 0.83 | 1.19 |
| 2g | 17 | 43.5 | 47.42 | 47.07 | 46.94 | 46.93 | 46.95 | 47.09 |
|  | 10c | 43.5 | 18.78 | 14.29 | 9.09 | 2.38 | 0.31 | 5.55 |
| 2h | 22 | 116 | 33.30 | 33.50 | 33.50 | 32.90 | 32.70 | 29.90 |
|  | 12c | 116 | 29.65 | 24.44 | 18.83 | 10.45 | 3.51 | 2.10 |
| 2i | 27 | 17 | 15.92 | 16.42 | 16.32 | 15.91 | 15.53 | 12.62 |
|  | 29 | 17 | 15.44 | 15.78 | 15.81 | 15.52 | 15.52 | 15.31 |
| 2j | 28 | 10 | 14.27 | 14.39 | 14.23 | 13.92 | 13.75 | 12.27 |
| 2k | 31 | 10 | 30.42 | 30.10 | 29.60 | 29.20 | 29.30 | 28.40 |
|  | 32 | 10 | 24.60 | 24.70 | 24.40 | 24.20 | 24.10 | 23.40 |
|  | 33 | 10 | 27.10 | 27.40 | 26.20 | 25.00 | 24.20 | 23.10 |
|  | 16c | 10 | 12.37 | 9.16 | 5.12 | 1.47 | 0.54 | 0.33 |

TABLE 13

Transmission loss of sample assemblies and comparative sample assemblies after pressure challenge

| Example # | Assembly # | Challenge Pressure (psi) | Transmission Loss After Pressure Challenge (dB) | | | | | |
|---|---|---|---|---|---|---|---|---|
| | | | 500 Hz | 1,000 Hz | 2,000 Hz | 5,000 Hz | 10,000 Hz | 20,000 Hz |
| 2a | 6 | 2.2 | 23.59 | 24.96 | 25.52 | 25.61 | 26.63 | 26.36 |
| 2b | 6c | 2.2 | 13.48 | 9.00 | 5.33 | 1.64 | 1.12 | 4.56 |
| | 7 | 14.5 | 24.15 | 24.71 | 25.00 | 25.23 | 25.86 | 25.80 |
| | 7c | 14.5 | 13.35 | 9.60 | 5.52 | 1.72 | 0.50 | 2.31 |
| 2c | 8 | 43.5 | 24.40 | 23.94 | 24.30 | 24.40 | 25.10 | 25.14 |
| | 8c | 43.5 | Burst | Burst | Burst | Burst | Burst | Burst |
| 2d | 11 | 43.5 | 33.21 | 33.35 | 32.67 | 31.66 | 29.48 | 24.15 |
| | 10c | 43.5 | 28.60 | 23.66 | 18.01 | 10.39 | 4.13 | 1.22 |
| 2e | 15 | 14.5 | 38.77 | 39.80 | 38.84 | 38.67 | 38.63 | 38.20 |
| | 7c | 14.5 | 13.35 | 9.60 | 5.52 | 1.72 | 0.50 | 2.31 |
| 2f | 16 | 43.5 | 38.49 | 38.43 | 37.85 | 37.88 | 37.86 | 37.64 |
| | 8c | 43.5 | Burst | Burst | Burst | Burst | Burst | Burst |
| 2g | 17 | 43.5 | 49.50 | 49.51 | 49.75 | 50.14 | 49.66 | 49.19 |
| | 10c | 43.5 | 28.60 | 23.66 | 18.01 | 10.39 | 4.13 | 1.22 |
| 2h | 22 | 116 | 31.70 | 31.80 | 32.30 | 33.70 | 35.10 | 34.70 |
| | 12c | 116 | Burst | Burst | Burst | Burst | Burst | Burst |
| 2i | 27 | 17 | 16.60 | 17.05 | 16.94 | 16.75 | 16.56 | 14.49 |
| | 29 | 17 | 2.75 | 2.56 | 0.82 | −0.83 | −2.82 | −0.06 |
| 2j | 28 | 10 | 14.28 | 14.65 | 14.54 | 14.35 | 14.24 | 13.27 |
| 2k | 31 | 10 | 30.00 | 29.20 | 28.80 | 28.50 | 28.20 | 27.50 |
| | 32 | 10 | 25.30 | 25.70 | 25.50 | 25.10 | 24.50 | 23.10 |
| | 33 | 10 | 25.50 | 24.50 | 23.00 | 21.90 | 21.10 | 20.10 |
| | 16c | 10 | 3.04 | 1.11 | 1.32 | 0.64 | 0.34 | 0.51 |

TABLE 14

Change in transmission loss of sample assemblies and comparative sample assemblies

| Example # | Assembly # | Challenue Pressure (psi) | Change in Transmission Loss, ΔTL (dB) | | | | | |
|---|---|---|---|---|---|---|---|---|
| | | | 500 Hz | 1,000 Hz | 2,000 Hz | 5,000 Hz | 10,000 Hz | 20,000 Hz |
| 2a | 6 | 2.2 | −1.08 | −0.20 | 0.21 | 0.29 | 0.72 | 0.36 |
| | 6c | 2.2 | −6.92 | −6.91 | −5.25 | −2.11 | 0.53 | 3.06 |
| 2b | 7 | 14.5 | −0.58 | −0.52 | −0.49 | −0.16 | −0.24 | 0.01 |
| | 7c | 14.5 | −9.88 | −8.72 | −8.29 | −4.53 | −1.40 | −0.05 |
| 2c | 8 | 43.5 | 0.10 | −0.72 | −0.37 | −0.32 | −0.11 | 0.16 |
| | 8c | 43.5 | Burst | Burst | Burst | Burst | Burst | Burst |
| 2d | 11 | 43.5 | 0.77 | 1.43 | 0.95 | 0.13 | −1.21 | −1.95 |
| | 10c | 43.5 | 9.82 | 9.37 | 8.92 | 8.01 | 3.82 | −4.33 |
| 2e | 15 | 14.5 | 0.94 | 1.51 | 0.67 | 1.16 | 0.96 | 0.32 |
| | 7c | 14.5 | −9.88 | −8.72 | −8.29 | −4.53 | −1.40 | −0.05 |
| 2f | 16 | 43.5 | 1.61 | 1.13 | 0.77 | 1.19 | 0.96 | 0.59 |
| | 8c | 43.5 | Burst | Burst | Burst | Burst | Burst | Burst |
| 2g | 17 | 43.5 | 2.08 | 2.45 | 2.81 | 3.21 | 2.71 | 2.11 |
| | 10c | 43.5 | 9.82 | 9.37 | 8.92 | 8.01 | 3.82 | −4.33 |
| 2h | 22 | 116 | −1.60 | −1.70 | −1.20 | 0.80 | 2.40 | 4.80 |
| | 12c | 116 | Burst | Burst | Burst | Burst | Burst | Burst |
| 2i | 27 | 17 | 0.68 | 0.63 | 0.62 | 0.84 | 1.03 | 1.87 |
| | 29 | 17 | 0.21 | 0.17 | 0.09 | 0.07 | −0.08 | −0.31 |
| 2j | 28 | 10 | 0.01 | 0.26 | 0.31 | 0.43 | 0.49 | 1.00 |
| 2k | 31 | 10 | −0.42 | −0.90 | −0.80 | −0.70 | −1.10 | −0.90 |
| | 32 | 10 | 0.70 | 1.00 | 1.10 | 0.90 | 0.40 | −0.30 |
| | 33 | 10 | −1.60 | −2.90 | −3.20 | −3.10 | −3.10 | −3.00 |
| | 16c | 10 | −9.33 | −8.05 | −3.80 | −0.83 | −0.20 | 0.18 |

Example 3—Non-Limiting Embodiments Exhibiting Improved Compression Resistance

Transmission loss and phase angle testing on assemblies under compression was performed as described in section Test Procedures section. Three different forces (5 N, 10 N, 20 N) were applied to the sample assembly 14 and comparative assembly 11c and the transmission loss and phase angle are measured with the assemblies under compression. The transmission loss without compression force is also measured.

The raw transmission loss and phase angle vs. frequency spectra as a function of compression force is shown in FIG. 30. The transmission loss and phase data are shown in Tables 15 and 16 at six discrete frequencies (500 Hz, 1,000 Hz, 2,000 Hz, 5,000 Hz, 10,000 Hz, and 20,000 Hz).

TABLE 15

Compressive forces applied to sample assemblies and comparative sample assemblies during transmission loss measurements

| Example # | Assembly # | Compressive Force (N) |
|---|---|---|
| 3a | 14 | 0, 5, 10, 20 |
|  | 11c | 0, 5, 10, 20 |

TABLE 16

Transmission loss of sample assemblies and comparative sample assemblies as a function of compressive force applied to each assembly during the measurement.

| | | | Transmission Loss (dB) | | | | | |
|---|---|---|---|---|---|---|---|---|
| Example # | Assembly # | Compression Force (N) | 500 Hz | 1,000 Hz | 2,000 Hz | 5,000 Hz | 10,000 Hz | 20,000 Hz |
| 3a | 14 | 0 | 39.49 | 37.07 | 37.62 | 37.12 | 36.47 | 33.77 |
|  |  | 5 | 36.37 | 38.26 | 38.04 | 37.82 | 36.78 | 33.44 |
|  |  | 10 | 37.02 | 39.02 | 38.62 | 38.06 | 37.16 | 33.32 |
|  |  | 20 | 39.16 | 40.57 | 39.32 | 38.62 | 37.63 | 32.94 |
|  | 11c | 0 | 26.14 | 23.17 | 17.51 | 9.06 | 1.98 | 4.39 |
|  |  | 5 | 30.67 | 26.77 | 21.30 | 13.24 | 5.19 | 3.27 |
|  |  | 10 | 39.10 | 32.39 | 26.40 | 18.39 | 11.59 | 3.02 |
|  |  | 20 | 43.70 | 37.44 | 31.65 | 24.10 | 16.44 | 5.91 |

TABLE 17

Change in transmission loss of sample assemblies and comparative sample assemblies due to compression testing. Note that the change in TL is relative to 0 N (no compression).

| | | | Change in transmission Loss (dB) | | | | | |
|---|---|---|---|---|---|---|---|---|
| Example # | Assembly # | Compression Force (N) | 500 Hz | 1,000 Hz | 2,000 Hz | 5,000 Hz | 10,000 Hz | 20,000 Hz |
| 3a | 14 | 5 | −3.12 | 1.19 | 0.42 | 0.70 | 0.31 | −0.33 |
|  |  | 10 | −2.47 | 1.95 | 1.00 | 0.94 | 0.69 | −0.45 |
|  |  | 20 | −0.33 | 3.50 | 1.70 | 1.50 | 1.16 | −0.83 |
|  | 11c | 5 | 4.53 | 3.60 | 3.79 | 4.18 | 3.21 | −1.12 |
|  |  | 10 | 12.96 | 9.22 | 8.89 | 9.33 | 9.61 | −1.37 |
|  |  | 20 | 17.56 | 14.27 | 14.14 | 15.04 | 14.46 | 1.52 |

TABLE 18

Phase angle of sample assemblies and comparative sample assemblies as a function of compressive force applied to each assembly during the measurement.

Figure 31:
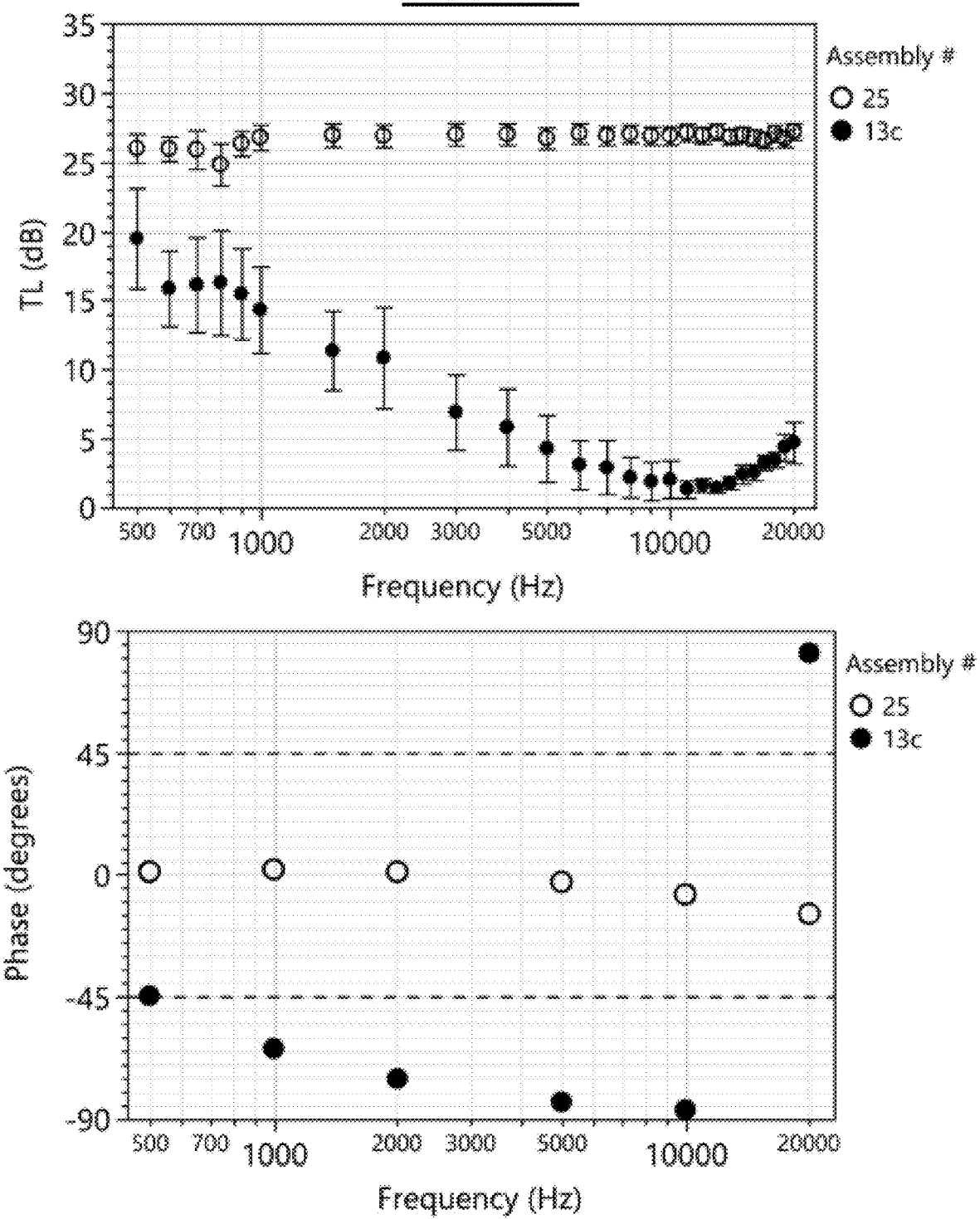
FIGS. 31-32 depict non-limiting examples of consistency of acoustic characteristics of exemplary assemblies.
Figure 32:
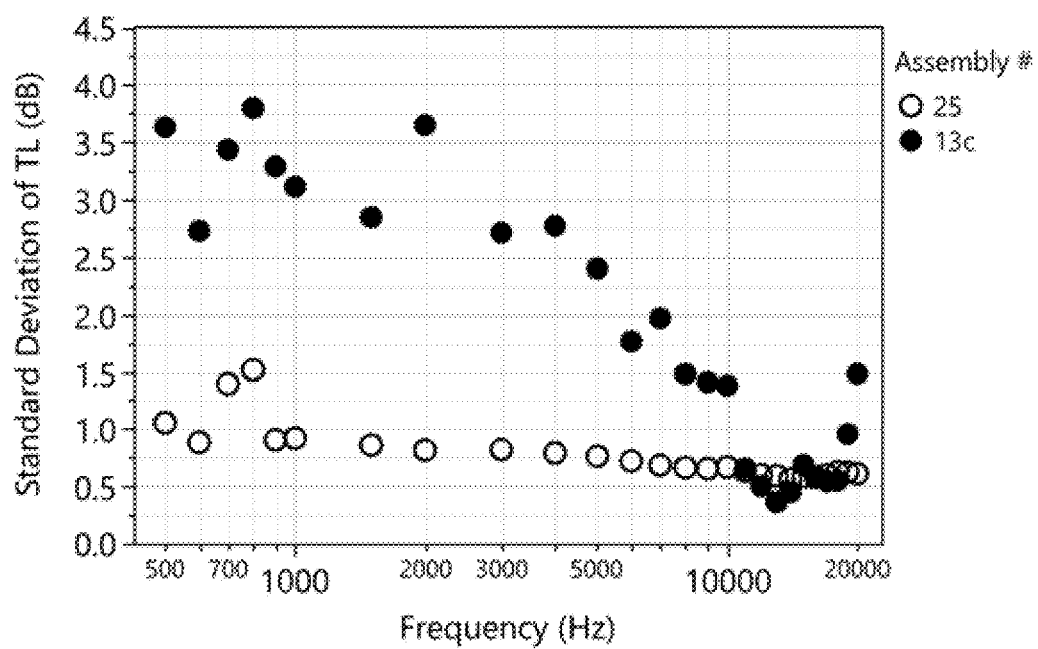

| | | | Phase (degrees) | | | | | |
|---|---|---|---|---|---|---|---|---|
| Example # | Assembly # | Compression Force (N) | 500 Hz | 1,000 Hz | 2,000 Hz | 5,000 Hz | 10,000 Hz | 20,000 Hz |
| 3a | 14 | 0 | −4.74 | −1.71 | −3.24 | −14.67 | −29.72 | −45.72 |
|  |  | 5 | −0.30 | −2.52 | −4.89 | −17.18 | −36.49 | −52.36 |
|  |  | 10 | −7.69 | −2.43 | −7.00 | −16.44 | −38.34 | −54.07 |
|  |  | 20 | −9.60 | −2.21 | −8.55 | −20.11 | −44.67 | −59.85 |
|  | 11c | 0 | −76.73 | −63.09 | −75.11 | −83.26 | −83.96 | 60.76 |
|  |  | 5 | −59.60 | −71.20 | −78.08 | −87.61 | −89.63 | 57.15 |
|  |  | 10 | −74.36 | −86.90 | −85.03 | −89.88 | −94.03 | −35.94 |
|  |  | 20 | −67.21 | −74.90 | −76.38 | −87.01 | −86.18 | −52.70 | and phase angle. The variability between parts is evaluated by the standard deviation of transmission loss between samples at each of frequencies (500 Hz, 1,000 Hz, 2,000 Hz, 5,000 Hz, 10,000 Hz, and 20,000 Hz). The mean transmission loss and phase angle among the 5 samples are tabulated in Table 19 and Table 20. The standard deviation of transmission loss is tabulated in Table 21 and shown in FIG. 32. The raw transmission loss and phase angle is shown in FIG. 31, and the error bars in these figures are the distribution of the measured values. As shown the sample assemblies exhibited a lower standard deviation than the comparative sample assemblies, indicating that the sample assemblies provided better consistency from part to part.

Example 4—Non-Limiting Embodiments Exhibiting Improved Acoustic Consistency

For sample assembly 25 and comparative sample assembly 13c, 5 samples are made and tested for transmission loss

TABLE 19

Transmission loss of sample assemblies and comparative sample assemblies

| | | Transmission Loss (dB) | | | | | |
|---|---|---|---|---|---|---|---|
| Example | Assembly # | 500 Hz | 1,000 Hz | 2,000 Hz | 5,000 Hz | 10,000 Hz | 20,000 Hz |
| 4a | 25 | 25.90 | 26.80 | 26.90 | 26.70 | 26.90 | 27.20 |
| | 13c | 19.494 | 14.3307 | 10.87 | 4.33 | 2.0955 | 4.7469 |

TABLE 20

Phase of sample assemblies and comparative sample assemblies

| | | Phase (degrees) | | | | | |
|---|---|---|---|---|---|---|---|
| Example | Assembly # | 500 Hz | 1,000 Hz | 2,000 Hz | 5,000 Hz | 10,000 Hz | 20,000 Hz |
| 4a | 25 | 1.16 | 1.99 | 1.13 | −2.62 | −7.19 | −14.31 |
| | 13c | −44.64 | −64.00 | −75.08 | −83.62 | −86.59 | 81.72 |

TABLE 21

Standard deviation of transmission loss of sample assemblies (n = 5) and comparative sample assemblies (n = 5)

| | | Standard Deviation of Transmission Loss (dB) | | | | | |
|---|---|---|---|---|---|---|---|
| Example | Assembly # | 500 Hz | 1,000 Hz | 2,000 Hz | 5,000 Hz | 10,000 Hz | 20,000 Hz |
| 4a | 25 | 1.05 | 0.92 | 0.82 | 0.76 | 0.67 | 0.61 |
| | 13c | 3.63 | 3.11 | 3.65 | 2.40 | 1.38 | 1.48 |

Example 5: Tunable Transmission Loss

For a given membrane, the transmission loss can be tuned via the support layer. You can use a support layer with a higher airflow to reduce TL and vice versa.

TABLE 22

Transmission loss of sample assemblies

| | | Transmission Loss (dB) | | | | | |
|---|---|---|---|---|---|---|---|
| Example | Assembly # | 500 Hz | 1,000 Hz | 2,000 Hz | 5,000 Hz | 10,000 Hz | 20,000 Hz |
| 5a | 12 | 41.31 | 41.38 | 41.25 | 40.98 | 41.27 | 40.44 |
| | 13 | 49.18 | 50.27 | 49.90 | 49.27 | 50.02 | 48.81 |

TABLE 23

Phase of sample assemblies

| | | Phase (degrees) | | | | | |
|---|---|---|---|---|---|---|---|
| Example | Assembly # | 500 Hz | 1,000 Hz | 2,000 Hz | 5,000 Hz | 10,000 Hz | 20,000 Hz |
| 5a | 12 | 1.82 | 0.75 | 1.60 | 1.38 | 0.40 | 1.40 |
| | 13 | 3.33 | 2.18 | −0.20 | 0.87 | 1.59 | 3.52 |

While several embodiments of the present disclosure have been described, these embodiments are illustrative only, and not restrictive, and that many modifications may become apparent to those of ordinary skill in the art. For example, all dimensions discussed herein are provided as examples only, and are intended to be illustrative and not restrictive.

The invention claimed is:

1. An assembly comprising:
   a polymer membrane having an air flow resistance ranging from 75 to 50,000 Rayls; and
   at least one support layer;
   wherein at least a portion of the at least one support layer is in contact with the polymer membrane,
   wherein the at least one support layer has an airflow resistance of from 10 to 5000 Rayls;
   wherein the assembly has an effective stiffness that ranges from 0.0002 Pa/nm to 3,000 Pa/nm when measured using the Vibrational Displacement Test ("VDT"); and
   wherein the assembly has an acoustic impedance with a phase angle of +45 degrees to −45 degrees over a frequency range of 50 to 20,000 Hz as measured by the Impedance Tube Transfer Matrix Test ("ITTMT").

2. An assembly comprising:
   a polymer membrane having an air flow resistance ranging from 75 Rayls to 50,000 Rayls;
   at least one support layer;

wherein at least a portion of the at least one support layer is in contact with the at least one polymer membrane, wherein the at least one support layer has an airflow resistance ranging from 10 Rayls to 5000 Rayls; and wherein the at least one support layer has an effective stiffness that:

ranges from 0.05 Pa/nm to 25 Pa/nm measured using the Vibrational Displacement Test ("VDT"); and wherein the assembly has an acoustic impedance with a phase angle of +45 degrees to −45 degrees over a frequency range of 50 to 20,000 Hz as measured by the Impedance Tube Transfer Matrix Test ("ITTMT").

3. An assembly comprising:

an airflow resistance of from 100 to 50,000 Rayls;

an effective stiffness from 0.0002 Pa/nm to 3,000 Pa/nm when measured using the Vibrational Displacement Test ("VDT"); and an acoustic impedance with a phase angle of +45 degrees to −45 degrees over a frequency range of 50 to 20,000 Hz as measured by the Impedance Tube Transfer Matrix Test ("ITTMT").

4. The assembly of claim 1, wherein the assembly has a water entry pressure ranging from 10 psi to 350 psi ("WEP") measured in accordance with the Capillary Piston Test ("CPT").

5. The assembly of claim 1, wherein the assembly exhibits a transmission loss of from 3 dB to 48 dB when measured by the Impedance Tube Transfer Matrix Test ("ITTMT") over the frequency range of 50 to 20,000 Hz.

6. An assembly comprising:

an airflow resistance of from 100 to 50,000 Rayls;

an effective stiffness from 0.0002 Pa/nm to 3,000 Pa/nm when measured using the Vibrational Displacement Test ("VDT"); and a transmission loss that does not vary by more than 1.5 dB/octave over the frequency range of 50 to 20,000 Hz when measured by the Impedance Tube Transfer Matrix Test ("ITTMT").

7. The assembly of claim 1, wherein the polymer membrane has a thickness ranging from 0.025 microns to 300 microns.

8. The assembly of claim 1, wherein the polymer membrane comprises a plurality of pores with different pore sizes.

9. The assembly of claim 1, wherein the plurality of pores has a maximum pore size ranging from 0.1 to 30 microns.

10. The assembly of claim 1, wherein the polymer membrane has a bubble point ranging from 0.4 psi to 120 psi.

11. The assembly of claim 1, wherein the at least one support layer comprises a plurality of openings.

12. The assembly of claim 1, wherein the largest dimension of a single opening of the plurality of openings is 1 to 500 microns.

13. The assembly of claim 1, wherein the at least one support layer has a thickness of 10 to 1000 microns.

14. The assembly of claim 1, wherein the at least one support layer has an effective open area of from 5% to 98%.

15. The assembly of claim 1, wherein the polymer membrane comprises expanded polytetrafluoroethylene (ePTFE).

16. The assembly of claim 1, wherein the polymer membrane has a Young's Modulus ranging from 1 MPa to 1000 MPa.

17. The assembly of claim 1, wherein the assembly comprises a single support layer.

18. The assembly of claim 1, wherein the assembly comprises at least two support layers.

19. The assembly of claim 18, wherein the assembly comprises a first support layer and a second support layer, and wherein the polymer membrane is sandwiched between the first support layer the second support layer.

20. The assembly of claim 18, wherein the first and second support layers comprise the same material.

21. The assembly of claim 18, wherein the first and second support layers comprise a different material.

22. The assembly of claim 1, comprising an adhesive between the polymer membrane and the at least one support layer.

23. The assembly of claim 1, wherein the at least one support layer comprises fiberglass.

24. The assembly of claim 1, wherein the at least one support layer comprises a metal.

25. The assembly of claim 24, wherein the metal is brass.

26. The assembly of claim 1, wherein the one or more support layers comprises a mesh.

27. The assembly of claim 26, wherein the mesh is woven polyethylene terephthalate (PET) mesh.

28. The assembly of claim 26, wherein the mesh is extruded plastic non-woven mesh.

* * * * *